United States Patent
Takashima et al.

(10) Patent No.: US 9,385,867 B2
(45) Date of Patent: Jul. 5, 2016

(54) CRYPTOGRAPHIC PROCESSING SYSTEM, KEY GENERATION DEVICE, ENCRYPTION DEVICE, DECRYPTION DEVICE, KEY DELEGATION DEVICE, CRYPTOGRAPHIC PROCESSING METHOD, AND CRYPTOGRAPHIC PROCESSING PROGRAM

(75) Inventors: Katsuyuki Takashima, Tokyo (JP); Tatsuaki Okamoto, Tokyo (JP)

(73) Assignees: Mitsubishi Electric Corporation, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 247 days.

(21) Appl. No.: 13/982,778

(22) PCT Filed: Dec. 12, 2011

(86) PCT No.: PCT/JP2011/078668
§ 371 (c)(1),
(2), (4) Date: Jul. 31, 2013

(87) PCT Pub. No.: WO2012/108100
PCT Pub. Date: Aug. 16, 2012

(65) Prior Publication Data
US 2013/0336474 A1 Dec. 19, 2013

(30) Foreign Application Priority Data
Feb. 9, 2011 (JP) .................... 2011-026216

(51) Int. Cl.
*H04K 1/00* (2006.01)
*H04L 9/28* (2006.01)
(Continued)

(52) U.S. Cl.
CPC ............... *H04L 9/28* (2013.01); *H04L 9/0836* (2013.01); *H04L 9/3073* (2013.01)

(58) Field of Classification Search
CPC ................ H04L 9/06; H04L 9/00; H04L 9/08
USPC .................................................. 380/28, 277
See application file for complete search history.

(56) References Cited

U.S. PATENT DOCUMENTS

| 5,214,698 A * | 5/1993 | Smith et al. ................... 380/280 |
| 2003/0179885 A1 | 9/2003 | Gentry et al. |

(Continued)

FOREIGN PATENT DOCUMENTS

| WO | 03 081780 | 10/2003 |
| WO | 2008 099831 | 8/2008 |
| WO | 2010 122926 | 10/2010 |

OTHER PUBLICATIONS

Shi, E. et al., "Delegating Capabilities in Predicate Encryption Systems," Lecture Notes in Computer Science, vol. 5126, pp. 1 to 35, especially 5.1 Construction, (Jul. 5, 2008).

(Continued)

*Primary Examiner* — Ali Abyaneh
(74) *Attorney, Agent, or Firm* — Oblon, McClelland, Maier & Neustadt, L.L.P.

(57) ABSTRACT

Hierarchical predicate encryption (HPE) for inner products with enhanced efficiency of operations. A cryptographic processing system includes a key generation device, an encryption device, and a decryption device. The key generation device generates, as a decryption key $sk_L$, a vector in which predicate information $v_t$ is embedded in a basis vector of a basis $B^*_t$ for each integer t of t=1, ..., L. The encryption device generates, as a ciphertext ct, a vector in which attribute information $x_t$ is embedded in a basis vector of a basis $B_t$ for at least some integer t of t=1, ..., L. The decryption device performs a pairing operation on the decryption key $sk_L$ generated by the key generation device and the ciphertext ct generated by the encryption device, and decrypts the ciphertext ct.

12 Claims, 20 Drawing Sheets

(51) Int. Cl.
*H04L 9/08* (2006.01)
*H04L 9/30* (2006.01)

(56) References Cited

U.S. PATENT DOCUMENTS

| | | |
|---|---|---|
| 2009/0080658 A1* | 3/2009 | Waters et al. ............... 380/277 |
| 2009/0225986 A1 | 9/2009 | Gennaro et al. |
| 2010/0020977 A1 | 1/2010 | Furukawa |
| 2012/0045056 A1 | 2/2012 | Takashima et al. |

OTHER PUBLICATIONS

Okamoto, T. et al., "Hierarchical Predicate Encryption for Inner-Products," Lecture Notes in Computer Science, especially 5.2 HPE Scheme, vol. 5912, pp. 214 to 231, (Dec. 1, 2009).
Lewko, A. et al., "Fully Secure Functional Encryption: Attribute-Based Encryption and (Hierarchical) Inner Product Encryption," Lecture Notes in Computer Science, especially 3.5 The Proposed PE Scheme, vol. 6110, pp. 62 to 91, (May 29, 2010).
Beimel, A., "Secure Schemes for Secret Sharing and Key Distribution," Research PhD Thesis, Israel Institute of Technology, Total pp. 115, (Jun. 1996).
Bethencourt, J., et al. "Ciphertext-Policy Attribute-Based Encryption," IEEE Symposium on Security and Privacy, IEEE Press, Total pp. 15, (2007).
Boneh, D. et al., "Efficient Selective-ID Secure Identity Based Encryption Without Random Oracles," Cachin, C., Camenisch, J. , editors, Advances in Cryptology—EUROCRYPT, vol. 3027 of Lecture Notes in Computer Science, pp. 1 to 20, (2004).
Boneh, D. et al., "Secure Identity Based Encryption Without Random Oracles," Advances in Cryptology, CRYPTO, LNCS, vol. 3152, pp. 1 to 24, (2004).
Boneh, D. et al., "Hierarchical Identity Based Encryption with Constant Size Ciphertext," Cramer, R. (ed.) EUROCRYPT, LNCS, vol. 3494, pp. 1 to 27, (2005).
Boneh, D. et al., "Identity-Based Encryption from the Weil Pairing," Kilian, J. (ed.) CRYPTO, LNCS, vol. 2139, pp. 1 to 21, (2001).
Boneh, D. et al., "Generalized Identity Based and Broadcast Encryption Schemes," Pieprzyk, J. (Ed.): ASIACRYPT, LNCS, vol. 5350, pp. 445 to 470, (2008).
Boneh, D. et al., "Improved Efficiency for CCA-Secure Cryptosystems Built Using Identity-Based Encryption," RSA-CT, LNCS, pp. 1 to 16, (2005).
Boner, D. et al., "Conjunctive, Subset, and Range Queries on Encrypted Data," Vadhan S.P. (Ed.): TCC, LNCS, vol. 4392, pp. 535 to 554, (2007).
Boyen, X. et al., "Anonymous Hierarchical Identity-Based Encryption (Without Random Oracles)," Advances in Cryptology, CRYPTO, LNCS, vol. 4117, pp. 1 to 30, (2006).
Canetti, R. et al., "Chosen-Ciphertext Security from Identity-Based Encryption," EUROCRYPT, LNCS, pp. 1 to 15, Springer-Verlag (2004).
Cocks, C., "An Identity Based Encryption Scheme Based on Quadratic Residues," Honary B. (Ed.): Cryptography and Coding, LNCS, vol. 2260, pp. 360 to 363, Springer Heidelberg (2001).
Gentry, C., "Practical Identity-Based Encryption Without Random Oracles," Vaudenay S. (Ed.): EUROCRYPT, LNCS, vol. 4004, pp. 445 to 464, Springer Heidelberg (2006).
Gentry, C. et al., "Hierarchical Identity Based Encryption with Polynomially Many Levels," Reingold, OI. (ed.) TCC, LNCS, vol. 5444, pp. 1 to 29, Springer Heidelberg (2009).
Gentry, C. et al., "Hierarchical ID-Based Cryptography," Zheng, Y. (ed.) ASIACRYPT, LNCS, vol. 2501, pp. 1 to 21, Springer Heidelberg (2002).
Goyal, V. et al., "Attribute-Based Encryption for Fine-Grained Access Control of Encrypted Data," ACM Conference on Computer and Communication Security, ACM, pp. 1 to 28, (2006).
Katz, J. et al., "Predicate Encryption Supporting Disjunctions, Polynomial Equations, and Inner Products," Smart, N.P. (ed.) EUROCRYPT, LNCS, vol. 4965, pp. 1 to 28, Springer Heidelberg (2008).
Lewko, A. et al., "New Techniques for Dual System Encryption and Fully Secure HIBE with Short Ciphertexts," Micciancio, D. (ed.) TCC, LNCS, vol. 5978, pp. 1 to 22, Springer Heidelberg (2010).
Okamoto, T. et al., "Homomorphic Encryption and Signatures from Vector Decomposition," S.D. Galbraith and K.G. Paterson (Eds.): Pairing, LNCS, vol. 5209, pp. 57 to 74, Springer Heidelberg (2008).
Ostrovsky, R. et al., "Attribute-Based Encryption with Non-Monotonic Access Structures," ACM Conference on Computer and Communication Security, ACM, pp. 195 to 203, (2007).
Pirretti, T. et al., "Secure Attribute-Based Systems," ACM Conference on Computer and Communication Security, ACM, Total pp. 14, (2006).
Sahai, A. et al., "Fuzzy Identity-Based Encryption," Cramer, R. (ed.) EUROCRYPT, LNCS, vol. 494, pp. 1 to 15, Springer Heidelberg, (2005).
Waters, B., "Efficient Identity-Based Encryption Without Random Oracles," Eurocrypt, LNCS, vol. 3152, pp. 1 to 13, Springer Verlag, (2005).
Waters, B., "Dual System Encryption: Realizing Fully Secure IBE and HIBE under simple Assumptions," Halevi, S. (ed.) CRYPTO, LNCS, vol. 5677, pp. 1 to 38, Springer Heidelberg (2009).
Okamoto, T. et al., "Fully Secure Functional Encryption with General Relations from the Decisional Linear Assumption," CRYPTO, LNCS, vol. 6223, pp. 1 to 50, Springer Heidelberg (2010).
International Search Report Issued Mar. 13, 2012 in PCT/JP11/78668 Filed Dec. 12, 2011.

* cited by examiner

CRYPTOGRAPHIC PROCESSING SYSTEM, KEY GENERATION DEVICE, ENCRYPTION DEVICE, DECRYPTION DEVICE, KEY DELEGATION DEVICE, CRYPTOGRAPHIC PROCESSING METHOD, AND CRYPTOGRAPHIC PROCESSING PROGRAM

TECHNICAL FIELD

The present invention relates to hierarchical predicate encryption (HPE).

BACKGROUND ART

Non-Patent Literature 21 discusses HPE for inner products. Non-Patent Literature 18 discusses functional encryption.

CITATION LIST

Non-Patent Literature

Non-Patent Literature 1: Beimel, A., Secure schemes for secret sharing and key distribution. PhD Thesis, Israel Institute of Technology, Technion, Haifa, Israel, 1996.

Non-Patent Literature 2: Bethencourt, J., Sahai, A., Waters, B.: Ciphertext-policy attribute-based encryption. In:2007 IEEE Symposium on Security and Privacy, pp. 321•34. IEEE Press (2007)

Non-Patent Literature 3: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223•38. Springer Heidelberg (2004)

Non-Patent Literature 4: Boneh, D., Boyen, X.: Secure identity based encryption without random oracles. In:Franklin, M. K. (ed.) CRYPTO 2004. LNCS, vol. 3152, pp. 443•59. Springer Heidelberg (2004)

Non-Patent Literature 5: Boneh, D., Boyen, X., Goh, E.: Hierarchical identity based encryption with constant size ciphertext. In: Cramer, R. (ed.) EUROCRYPT 2005. LNCS, vol. 3494, pp. 440•56. Springer Heidelberg (2005)

Non-Patent Literature 6: Boneh, D., Franklin, M.: Identity-based encryption from the Weil pairing. In: Kilian, J. (ed.) CRYPTO 2001. LNCS, vol. 2139, pp. 213•29. Springer Heidelberg (2001)

Non-Patent Literature 7: Boneh, D., Hamburg, M.: Generalized identity based and broadcast encryption scheme. In:Pieprzyk, J. (ed.) ASIACRYPT 2008. LNCS, vol. 5350, pp. 455•70. Springer Heidelberg (2008)

Non-Patent Literature 8: Boneh, D., Katz, J., Improved efficiency for CCA-secure cryptosystems built using identity based encryption. RSA-CT 2005, LNCS, Springer Verlag (2005)

Non-Patent Literature 9: Boneh, D., Waters, B.: Conjunctive, subset, and range queries on encrypted data. In:Vadhan, S. P. (ed.) TCC 2007. LNCS, vol. 4392, pp. 535•54. Springer Heidelberg (2007)

Non-Patent Literature 10: Boyen, X., Waters, B.: Anonymous hierarchical identity-based encryption (without random oracles). In: Dwork, C. (ed.) CRYPTO 2006. LNCS, vol. 4117, pp. 290•07. Springer Heidelberg (2006)

Non-Patent Literature 11: Canetti, R., Halevi S., Katz J.: Chosen-ciphertext security from identity-based encryption. EUROCRYPT 2004, LNCS, Springer-Verlag (2004)

Non-Patent Literature 12: Cocks, C.: An identity based encryption scheme based on quadratic residues. In: Honary, B. (ed.) IMA Int. Conf. LNCS, vol. 2260, pp. 360•63. Springer Heidelberg (2001)

Non-Patent Literature 13: Gentry, C.: Practical identity-based encryption without random oracles. In: Vaudenay, S. (ed.) EUROCRYPT 2006. LNCS, vol. 4004, pp. 445•64. Springer Heidelberg (2006)

Non-Patent Literature 14: Gentry, C., Halevi, S.: Hierarchical identity-based encryption with polynomially many levels. In: Reingold, O. (ed.) TCC 2009. LNCS, vol. 5444, pp. 437•56. Springer Heidelberg (2009)

Non-Patent Literature 15: Gentry, C., Silverberg, A.: Hierarchical ID-based cryptography. In: Zheng, Y. (ed.) ASIACRYPT 2002. LNCS, vol. 2501, pp. 548•66. Springer Heidelberg (2002)

Non-Patent Literature 16: Goyal, V., Pandey, O., Sahai, A., Waters, B.: Attribute-based encryption for fine-grained access control of encrypted data. In: ACM Conference on Computer and Communication Security 2006, pp. 89•8, ACM (2006)

Non-Patent Literature 17: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146•62. Springer Heidelberg (2008)

Non-Patent Literature 18: Lewko, A., Okamoto, T., Sahai, A., Takashima, K., Waters, B.: Fully secure functional encryption: Attribute-based encryption and (hierarchical) inner product encryption, EUROCRYPT 2010. LNCS, Springer Heidelberg (2010)

Non-Patent Literature 19: Lewko, A. B., Waters, B.: New techniques for dual system encryption and fully secure HIBE with short ciphertexts. In: Micciancio, D. (ed.) TCC 2010. LNCS, vol. 5978, pp. 455•79. Springer Heidelberg (2010)

Non-Patent Literature 20: Okamoto, T., Takashima, K.: Homomorphic encryption and signatures from vector decomposition. In: Galbraith, S. D., Paterson, K. G. (eds.) Pairing 2008. LNCS, vol. 5209, pp. 57•4. Springer Heidelberg (2008)

Non-Patent Literature 21: Okamoto, T., Takashima, K.: Hierarchical predicate encryption for inner-products, In:ASIACRYPT 2009, Springer Heidelberg (2009)

Non-Patent Literature 22: Ostrovsky, R., Sahai, A., Waters, B.: Attribute-based encryption with non-monotonic access structures. In: ACM Conference on Computer and Communication Security 2007, pp. 195•03, ACM (2007)

Non-Patent Literature 23: Pirretti, M., Traynor, P., McDaniel, P., Waters, B.: Secure attribute-based systems. In: ACM Conference on Computer and Communication Security 2006, pp. 99•12, ACM, (2006)

Non-Patent Literature 24: Sahai, A., Waters, B.: Fuzzy identity-based encryption. In: Cramer, R. (ed.) EUROCRYPT 2005. LNCS, vol. 494, pp. 457•73. Springer Heidelberg (2005)

Non-Patent Literature 25: Shi, E., Waters, B.: Delegating capability in predicate encryption systems. In: Aceto, L., Damgaard, I., Goldberg, L. A., Halldorsson, M. M., Ingolfsdottir, A., Walukiewicz, I. (eds.) ICALP (2) 2008. LNCS, vol. 5126, pp. 560.578. Springer Heidelberg (2008)

Non-Patent Literature 26: Waters, B.: Efficient identity based encryption without random oracles. Eurocrypt 2005, LNCS, vol. 3152, pp. 443•59. Springer Verlag, (2005)

Non-Patent Literature 27: Waters, B.: Ciphertext-policy attribute-based encryption: an expressive, efficient, and provably secure realization. ePrint, IACR, http://eprint.iacr.org/2008/290

Non-Patent Literature 28: Waters, B.: Dual system encryption: realizing fully secure IBE and HIBE under simple assumptions. In: Halevi, S. (ed.) CRYPTO 2009. LNCS, vol. 5677, pp. 619•36. Springer Heidelberg (2009)

DISCLOSURE OF INVENTION

Technical Problem

In an HPE scheme for inner products discussed in Non-Patent Literature 21, cryptographic processes are constructed using one large space. Thus, when this HPE scheme for inner products is implemented, key sizes could be large, adversely affecting efficiency of operations and so on.

It is an object of the present invention to provide an HPE scheme for inner products with enhanced efficiency of operations and so on.

Solution to Problem

A cryptographic processing system according to this invention is a cryptographic processing system that performs a cryptographic process using a basis $B_t$ and a basis $B^*_t$ for each integer t of t=1, ..., L+1 (L being an integer of 1 or more), the cryptographic processing system, and includes an encryption device that generates, as a ciphertext ct, a vector in which attribute information $x_t$ is embedded in a basis vector of the basis $B_t$ for at least some integer t of t=1, ..., L;

a decryption device that uses, as a decryption key $sk_L$, a vector in which predicate information $v_t$ is embedded in a basis vector of the basis $B^*_t$ for each integer t of t=1, ..., L, performs a pairing operation on the ciphertext ct generated by the encryption device and the decryption key $sk_L$, and decrypts the ciphertext ct; and a key delegation device that generates a lower-level decryption key $sk_{L+1}$ of the decryption key $sk_L$, based on a vector in which predicate information $v_{L+1}$ is embedded in a basis vector of a basis $B^*_{L+1}$ and the decryption key $sk_L$ used by the decryption device.

Advantageous Effects of Invention

In a cryptographic processing system according to the present invention, a hierarchical structure is constructed using a plurality of spaces. Thus, key sizes can be made small, thereby enhancing efficiency of operations.

DESCRIPTION OF PREFERRED EMBODIMENTS

Figure 1:
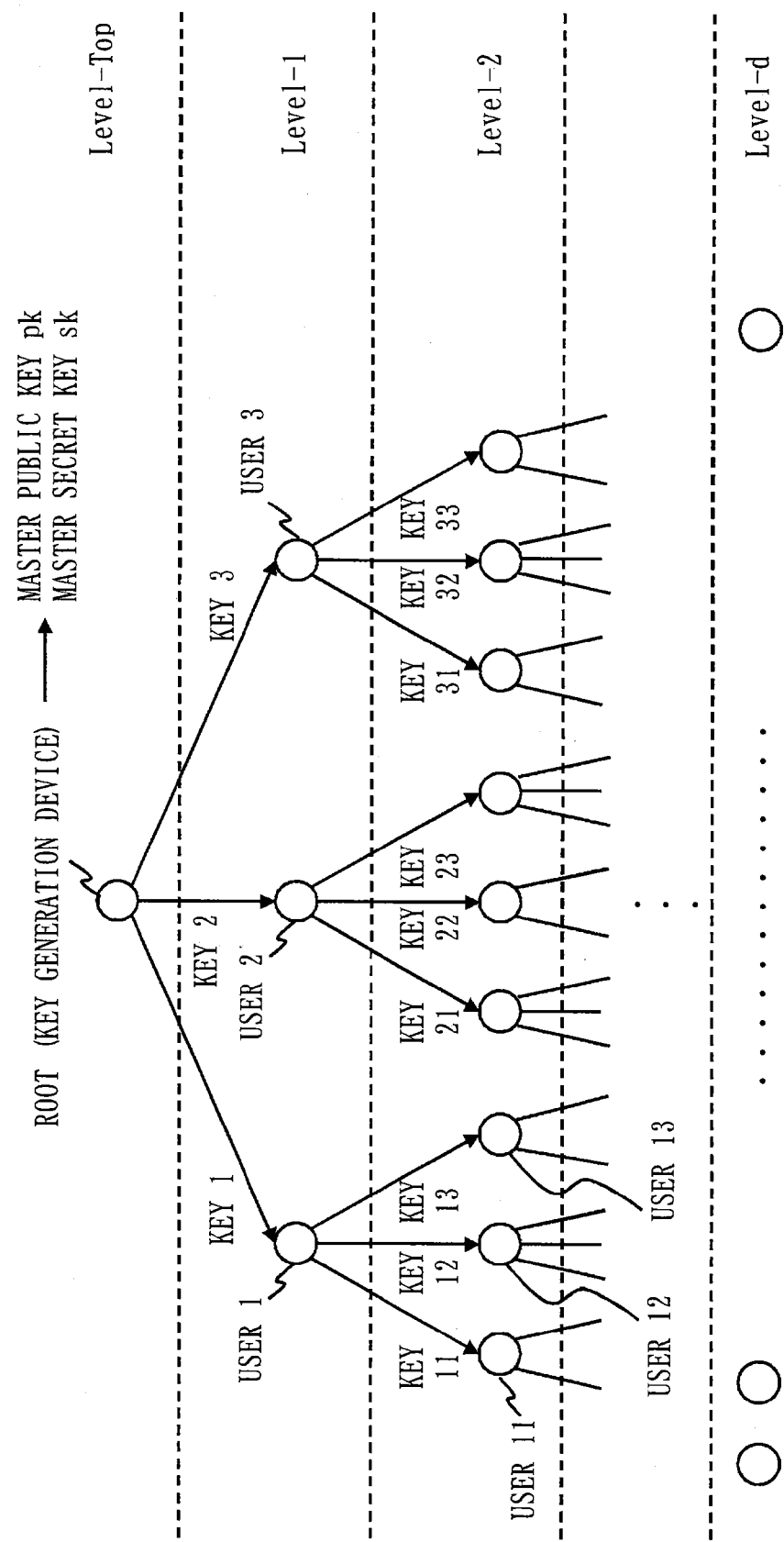
FIG. 1 is a diagram for explaining a notion of "delegation (hierarchical delegation)"

Embodiments of the invention will now be described with reference to drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. An output device is the RAM 914, the magnetic disk 920, the communication board 915, an LCD 901 or the like to be described later. That is, the processing device, the storage device, the communication device, the input device, and the output device are hardware.

Notations to be used in the following description will be described.

When A is a random variable or distribution, Formula 101 denotes that y is randomly selected from A according to the distribution of A. That is, y is a random number in Formula 101.

$$y \xleftarrow{R} A \qquad \text{[Formula 101]}$$

When A is a set, Formula 102 denotes that y is uniformly selected from A. That is, y is a uniform random number in Formula 102.

$$y \xleftarrow{U} A \qquad \text{[Formula 102]}$$

Formula 103 denotes that y is set, defined or substituted by z.

$$y := z \qquad \text{[Formula 103]}$$

When a is a fixed value, Formula 104 denotes that a machine (algorithm) A outputs a on an input x.

$$A(x) \to a \quad \text{[Formula 104]}$$

for example,
$A(x) \to 1$

Formula 105, that is, $F_q$, denotes a finite field of order q.

$$\mathbb{F}_q \quad \text{[Formula 105]}$$

A vector symbol denotes a vector representation over the finite field $F_q$, that is, Formula 106.

$\vec{x}$ denotes $$(x_1, \ldots, x_n) \in \mathbb{F}_q \quad \text{[Formula 106]}$$

Formula 107 denotes the inner product, shown in Formula 109, of two vectors x and v shown in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^n x_i v_i \quad \text{[Formula 109]}$$

$X^T$ denotes the transpose of a matrix X.

For a basis B and a basis B* shown in Formula 110, Formula 111 is defined.

$$\mathbb{B} := (b_1, \ldots, b_N),$$

$$\mathbb{B}^* := (b^*_1, \ldots, b^*_N) \quad \text{[Formula 110]}$$

$$(x_1, \ldots, x_N)_\mathbb{B} := \Sigma_{i=1}^N x_i b_i,$$

$$(y_1, \ldots, y_N)_{\mathbb{B}^*} := \Sigma_{i=1}^N y_i b^*_i \quad \text{[Formula 111]}$$

$e_{t,j}$ denotes an orthonormal basis vector shown in Formula 112.

$$\vec{e}_{t,j} := (\overbrace{0 \ldots 0}^{j-1}, 1, \overbrace{0 \ldots 0}^{n_t - j}) \in \mathbb{F}_q^{n_t} \quad \text{[Formula 112]}$$

for
$j = 1, \ldots, n_t$

Formula 113 to Formula 117 are defined.

$$\left((\vec{x}_0)_{\mathbb{B}^*_0}, \ldots, (\vec{x}_d)_{\mathbb{B}^*_d}\right) + \left((\vec{y}_0)_{\mathbb{B}^*_0}, \ldots, (\vec{y}_d)_{\mathbb{B}^*_d}\right) := \left((\vec{x}_0 + \vec{y}_0)_{\mathbb{B}^*_0}, \ldots, (\vec{x}_d + \vec{y}_d)_{\mathbb{B}^*_d}\right) \quad \text{[Formula 113]}$$

$$(x)_{\mathbb{B}^*_t} := \left((\vec{0})_{\mathbb{B}^*_0}, \ldots, (\vec{0})_{\mathbb{B}^*_{t-1}}, (\vec{x})_{\mathbb{B}^*_t}, (\vec{0})_{\mathbb{B}^*_{t+1}}, \ldots, (\vec{0})_{\mathbb{B}^*_d}\right) \quad \text{[Formula 114]}$$

$$\left((\vec{x}_i)_{\mathbb{B}^*_i}, (\vec{x}_j)_{\mathbb{B}^*_j}\right) := (\vec{x}_i)_{\mathbb{B}^*_i} + (\vec{x}_j)_{\mathbb{B}^*_j} \quad \text{[Formula 115]}$$

$$\left((\vec{x}_0)_{\mathbb{B}^*_0}, (\vec{x}_t)_{\mathbb{B}^*_t}; t = 1, \ldots L\right) := \left((\vec{x}_0)_{\mathbb{B}^*_0}, \ldots, (\vec{x}_L)_{\mathbb{B}^*_L}\right) \quad \text{[Formula 116]}$$

$$e(c, k^*) := \prod_{t=0}^d e(c_t, k^*_t), \quad \text{[Formula 117]}$$

where $c := (c_0 \in \langle \mathbb{B}_0 \rangle, \ldots, c_d \in \langle \mathbb{B}_d \rangle)$,
$k^* := (k^*_{L,0} \in \langle \mathbb{B}^*_0 \rangle, \ldots, k^*_d \in \langle \mathbb{B}^*_d \rangle)$ For Formula 118, Formula 119 is defined.

$$k^* := \left((\vec{x}_0)_{\mathbb{B}^*_0}, \ldots, (\vec{x}_d)_{\mathbb{B}^*_d}\right) \quad \text{[Formula 118]}$$

$$[k^*]^L := \left((\vec{x}_0)_{\mathbb{B}^*_0}, \ldots, (\vec{x}_L)_{\mathbb{B}^*_L}, (\vec{0})_{\mathbb{B}^*_{L+1}}, \ldots, (\vec{0})_{\mathbb{B}^*_d}\right),$$

$$[k^*]_L := \left((\vec{0})_{\mathbb{B}^*_0}, \ldots, (\vec{0})_{\mathbb{B}^*_L}, (\vec{x}_{L+1})_{\mathbb{B}^*_{L+1}}, \ldots, (\vec{x}_d)_{\mathbb{B}^*_d}\right) \quad \text{[Formula 119]}$$

In the following description, nt in $F_q^{nt}$ denotes $n_t$.

Likewise, $(v \to 1, \ldots, v \to L)$ in a secret key $sk_{(v \to 1, \ldots, v \to L)}$ denotes $(v_1, \ldots, v_L)$, and $(v \to 1, \ldots, v \to L+1)$ in a secret key $sk_{(v \to 1, \ldots, v \to L+1)}$ denotes $(v_1, \ldots, v_{L+1})$.

Likewise, when "δi,j" is shown as a superscript, this δi,j denotes $\delta_{i,j}$.

When "→" representing a vector is attached to a subscript or superscript, this "→" is attached as a superscript to the subscript or superscript.

In the following description, a cryptographic process includes an encryption process, a decryption process, a key generation process, and a key delegation process.

First Embodiment

In this embodiment, basic concepts for implementing "HPE for inner products" and constructions of "HPE for inner products" will be described.

Firstly, a notion of HPE for inner products will be described. To describe the notion of HPE for inner products, a notion of "delegation" will be described first, together with a notion of "hierarchical delegation". Then, "predicate encryption (PE) for inner products" will be described. Then, "HPE for inner products", which is a type of PE for inner products with the notion of hierarchical delegation, will be described. Further, to reinforce the understanding of HPE for inner products, an application example of HPE for inner products will be described.

Secondly, HPE for inner products in vector spaces will be described. In this and subsequent embodiments, HPE and hierarchical predicate key encapsulation mechanism (HP-KEM) are implemented in vector spaces. "A basis" and "a basis vector" will be described first. Then, "PE for inner products in vector spaces" will be described. Then, "a method for implementing a hierarchical structure in vector spaces" will be described. Further, to reinforce the understanding, an implementation example of the hierarchical structure will be described.

Thirdly, "dual pairing vector spaces (DPVS)" having rich mathematical structures for implementing HPE for inner products will be described.

Fourthly, basic constructions of "an HPE scheme for inner products" according to this embodiment will be described. Then, basic constructions of "a cryptographic processing system 10" that implements HPE will be described. Then, the HPE scheme and the cryptographic processing system 10 according to this embodiment will be described in detail.

<1. HPE for Inner Products>

<1-1. Notion of Delegation (Hierarchical Delegation)>

FIG. 1 is a diagram for explaining the notion of "delegation (hierarchical delegation)".

Delegation means that a user who has a higher-level key generates a lower-level key having more limited capabilities than the user's (higher-level) key.

In FIG. 1, a root (key generation device) generates secret keys for first-level (level-1) users by using a master secret key. That is, the root generates keys 1, 2, and 3 for first-level users 1, 2, and 3, respectively. Then, using the key 1, for example, the user 1 can generate keys 11, 12, and 13 for users 11, 12, and 13, respectively, who are lower-level (second-level) users of the user 1. The keys 11, 12, and 13 owned by the users 11, 12, and 13 have more limited capabilities than the key 1 owned by the user 1. The limited capabilities mean that ciphertexts that can be decrypted by that secret key are limited. That is, a lower-level secret key can only decrypt some of ciphertexts that can be decrypted by a higher-level secret key. This means that the keys 11, 12, and 13 owned by the users 11, 12, and 13 can only decrypt some of ciphertexts that can be decrypted by the key 1 owned by the user 1. Generally, the keys 11, 12, and 13 can decrypt respectively different ciphertexts. On the other hand, a ciphertext that can be decrypted by the keys 11, 12, or 13 can be decrypted by the key 1.

As shown in FIG. 1, each secret key is provided for a specific level. This is described as "hierarchical". That is, as shown in FIG. 1, hierarchical generation of lower-level keys is called "hierarchical delegation".

Figure 2:
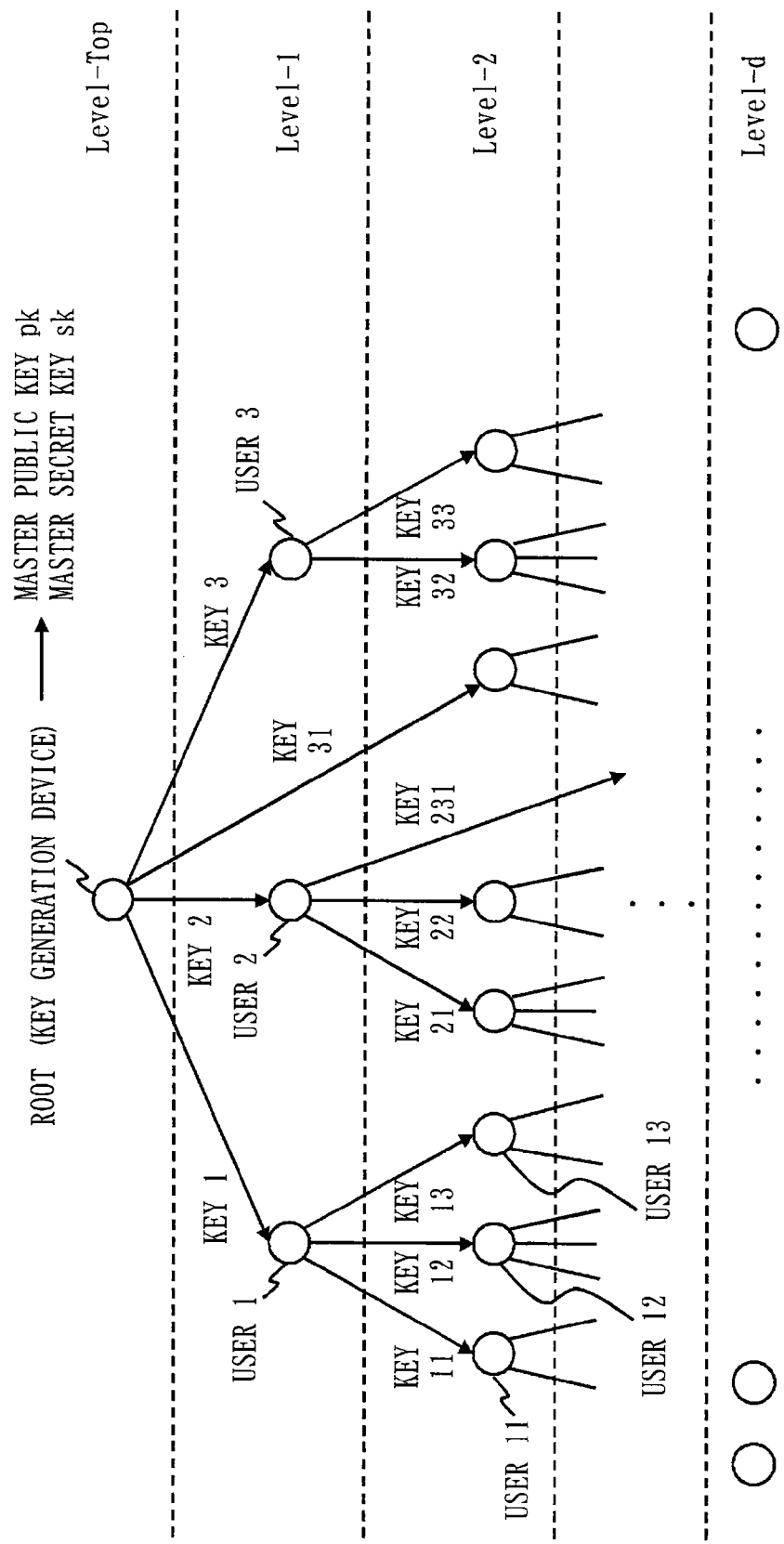
FIG. 2 is a diagram for explaining delegation skipping over a level.

In FIG. 1, it has been described that the root generates the secret keys for the first-level users, the first-level users generate the secret keys for the second-level users, and the second-level users generate the secret keys for the third-level users. However, as shown in FIG. 2, the root can generate not only the secret keys for the first-level users, but also the secret keys for the second-level or lower-level users. Likewise, the first-level users can generate not only the secret keys for the second-level users, but also the secret keys for the third-level or lower-level users. That is, the root or each user can generate the secret keys for levels lower than the level of its own secret key.

<1-2. PE for Inner Products>

Next, "PE for inner products" will be described.

PE is a cryptographic scheme in which a ciphertext can be decrypted if a result of inputting attribute information x to predicate information $f_v$ is 1 (true) ($f_v(x)=1$). Generally, the attribute information x is embedded in a ciphertext, and the predicate information $f_v$ is embedded in a secret key. That is, in PE, a ciphertext c encrypted based on the attribute information x is decrypted by a secret key $SK_f$ generated based on the predicate information $f_v$. PE may be described as a cryptographic scheme in which, for example, the predicate information $f_v$ is a conditional expression and the attribute information x is information to be input to the conditional expression, and a ciphertext can be decrypted if the input information (attribute information x) satisfies the conditional expression (predicate information $f_v$) ($f_v(x)=1$).

PE is discussed in detail in Non-Patent Literature 17.

PE for inner products is a type of PE in which $f_v(x)=1$ if the inner product of attribute information x and predicate information $f_v$ is a predetermined value. That is, a ciphertext c encrypted by the attribute information x can be decrypted by a secret key $SK_f$ generated based on the predicate information $f_v$ if and only if the inner product of the attribute information x and the predicate information $f_v$ is a predetermined value.

In the first embodiment, it is assumed as a general rule that $f_v(x)=1$ if the inner product of the attribute information x and the predicate information $f_v$ is 0.

<1-3. HPE for Inner Products>

HPE for inner products (HPKEM for inner products) is a type of "PE for inner products" with the above-described notion of "hierarchical delegation".

In HPE for inner products, attribute information and predicate information have hierarchical structures, in order to incorporate a hierarchical delegation system in PE for inner products.

Figure 3:
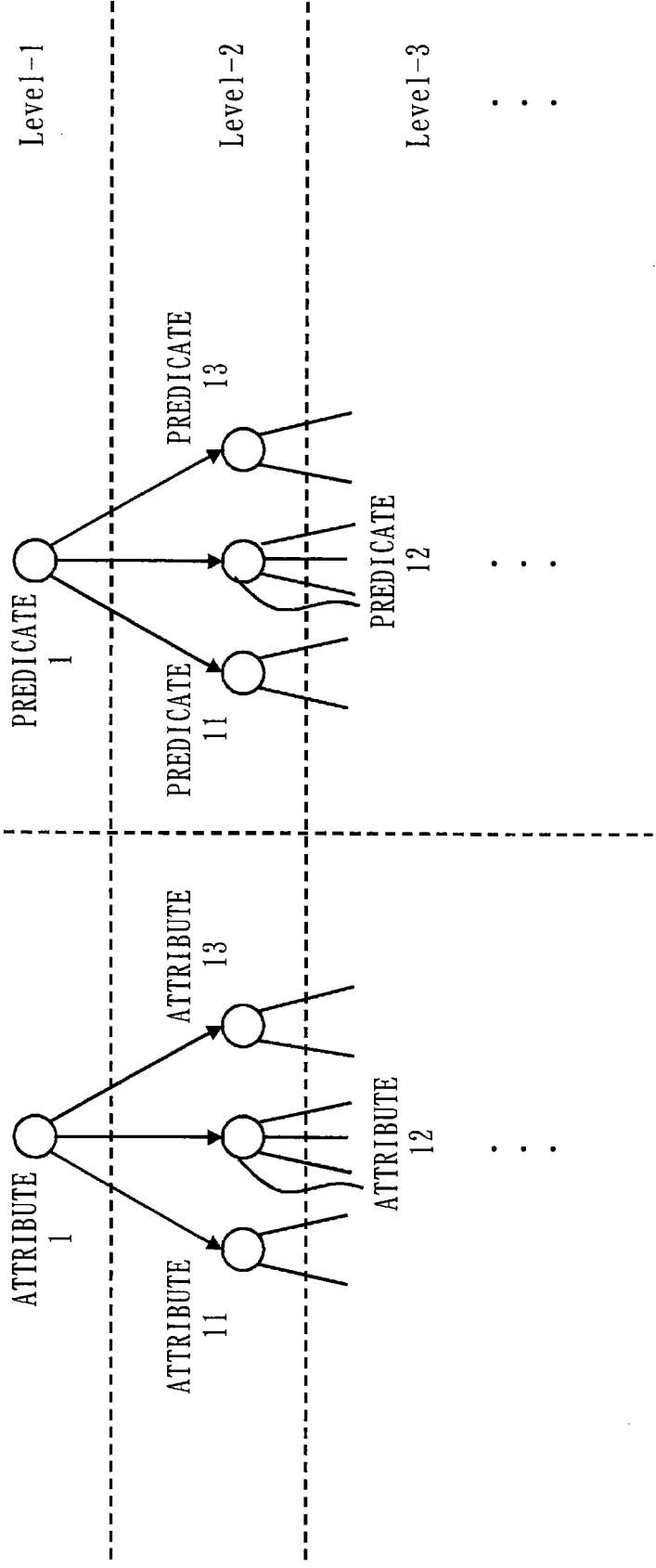
FIG. 3 is a diagram showing hierarchical structures of attribute information and predicate information.

FIG. 3 is a diagram showing hierarchical structures of attribute information and predicate information.

In FIG. 3, attribute information and predicate information with the same reference numerals correspond to each other (i.e., their inner product is 0). That is, the inner product of an attribute 1 and a predicate 1 is 0, the inner product of an attribute 11 and a predicate 11 is 0, the inner product of an attribute 12 and a predicate 12 is 0, and the inner product of an attribute 13 and a predicate 13 is 0. This means that a ciphertext c1 encrypted by the attribute 1 can be decrypted by a secret key k1 generated based on the predicate 1. A ciphertext c11 encrypted by the attribute 11 can be decrypted by a secret key k11 generated based on the predicate 11. The same can be said of the attribute 12 and the predicate 12 as well as the attribute 13 and the predicate 13.

As described above, HPE for inner products has the hierarchical delegation system. Thus, the secret key k11 can be generated based on the predicate 11 and the secret key k1 generated based on the predicate 1. That is, a user having the higher-level secret key k1 can generate its lower-level secret key k11 from the secret key k1 and the lower-level predicate 11. Likewise, a secret key k12 can be generated from the secret key k1 and the predicate 12, and a secret key k13 can be generated from the secret key k1 and the predicate 13.

A ciphertext encrypted by a key (public key) corresponding to a lower-level secret key can be decrypted by a higher-level secret key. On the other hand, a ciphertext encrypted by a key (public key) corresponding to a higher-level secret key cannot be decrypted by a lower-level secret key. That is, the ciphertexts c11, c12, and c13 encrypted by the attributes 11, 12, and 13, respectively, can be decrypted by the secret key k1 generated based on the predicate 1. On the other hand, the ciphertext c1 encrypted by the attribute 1 cannot be decrypted by the secret keys k11, k12, and k13 generated based on the predicates 11, 12, and 13, respectively. That is, the inner product of the attribute 11, 12, or 13 and the predicate 1 is 0. On the other hand, the inner product of the attribute 1 and the predicate 11, 12, or 13 is not 0.

<1-4. Application Example of HPE for Inner Products>

Figure 4:
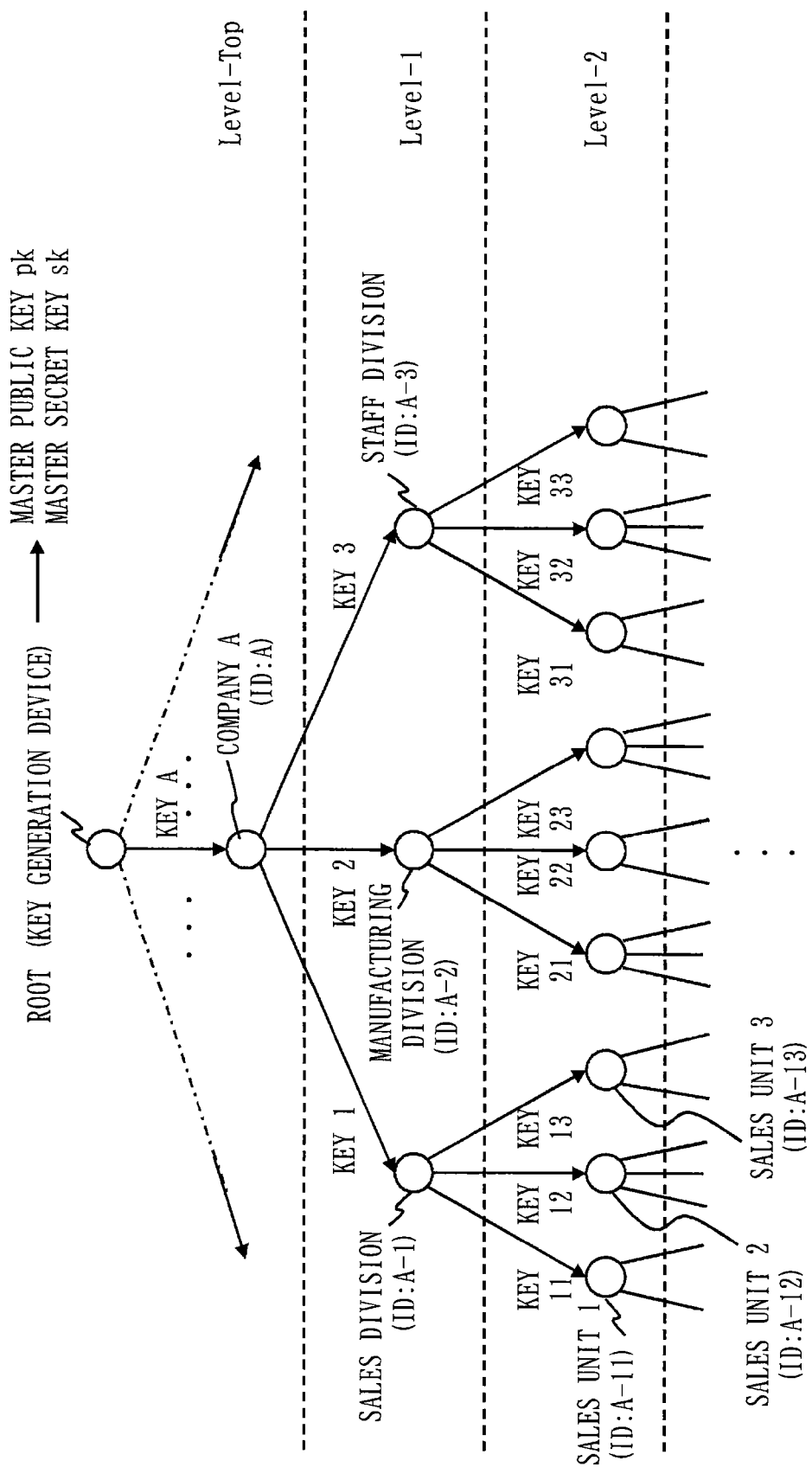
FIG. 4 is a diagram showing an example of hierarchical identity-based encryption.

FIG. 4 is a diagram showing an example of hierarchical identity-based encryption (HIBE), which is an application example of the HPE scheme for inner products to be described later. HIBE is a cryptographic process in which the notion of hierarchical is applied to identity-based encryption (IBE). IBE is a type of PE, namely, matching PE, which allows a ciphertext to be decrypted if an ID included in the ciphertext matches an ID included in a secret key.

In the example shown in FIG. 4, based on a master secret key sk and an ID "A" of Company A, a root (key generation device) generates a secret key (key A) corresponding to the ID "A". For example, based on the key A and the ID of each division, a security administrator of Company A generates a secret key corresponding to that ID. For example, the security administrator generates a secret key (key 1) corresponding to an ID "A-1" of a sales division. Then, based on the secret key of each division and the ID of each unit belonging to that division, for example, an administrator of each division generates a secret key corresponding to that ID. For example, an administrator of the sales division generates a secret key (key 11) corresponding to an ID "A-11" of a sales unit 1.

In this case, a ciphertext encrypted by the ID "A-11" of the sales unit 1 can be decrypted by the key 11 which is the secret key corresponding to the ID "A-11" of the sales unit 1. However, a ciphertext encrypted by the ID of a sales unit 2 or a sales unit 3 cannot be decrypted by the key 11. Also, a ciphertext encrypted by the ID of the sales division cannot be decrypted by the key 11.

A ciphertext encrypted by the ID "A-1" of the sales division can be decrypted by the key 1 which is the secret key corresponding to the ID "A-1" of the sales division. Also, a ciphertext encrypted by the ID of a unit belonging to the sales division can be decrypted by the key 1. That is, a ciphertext encrypted by the ID of the sales unit 1, 2, or 3 can be decrypted by the key 1. However, a ciphertext encrypted by the ID of a manufacturing division (ID: A-2) or a staff division (ID: A-3) cannot be decrypted by the key 1. Also, a ciphertext encrypted by the ID of Company A cannot be decrypted by the key 1.

A ciphertext encrypted by the ID "A" of Company A can be decrypted by the key A which is the secret key corresponding to the ID "A" of Company A. Also, a ciphertext encrypted by the ID of each division belonging to Company A or the ID of a unit belonging to each division can be decrypted by the key A.

HPE for inner products can be adapted to various applications other than IBE. In particular, cryptographic processes to be described later are not limited to a class of equality tests, so that they can be applied to a vast number of applications. For example, with respect to searchable encryption or the like which is a type of PE for inner products, the cryptographic processes allow applications that cannot be implemented with conventional PE having the delegation system, such as limiting a searchable range at each level by using a conditional expression such as AND or OR.

That is, the HPKEM and HPE schemes to be described in the subsequent embodiments can be applied to a wide variety of applications such as IBE and searchable encryption.

<2. HPE for Inner Products in Vector Spaces>

HPKEM and HPE are implemented in high-dimensional vector spaces called dual pairing vector spaces (DPVS) to be described later. Thus, HPE for inner products in vector spaces will be described.

<2-1. Basis and Basis Vector>

First, "a basis" and "a basis vector" to be used for explaining a vector space will be briefly explained.

Figure 5:
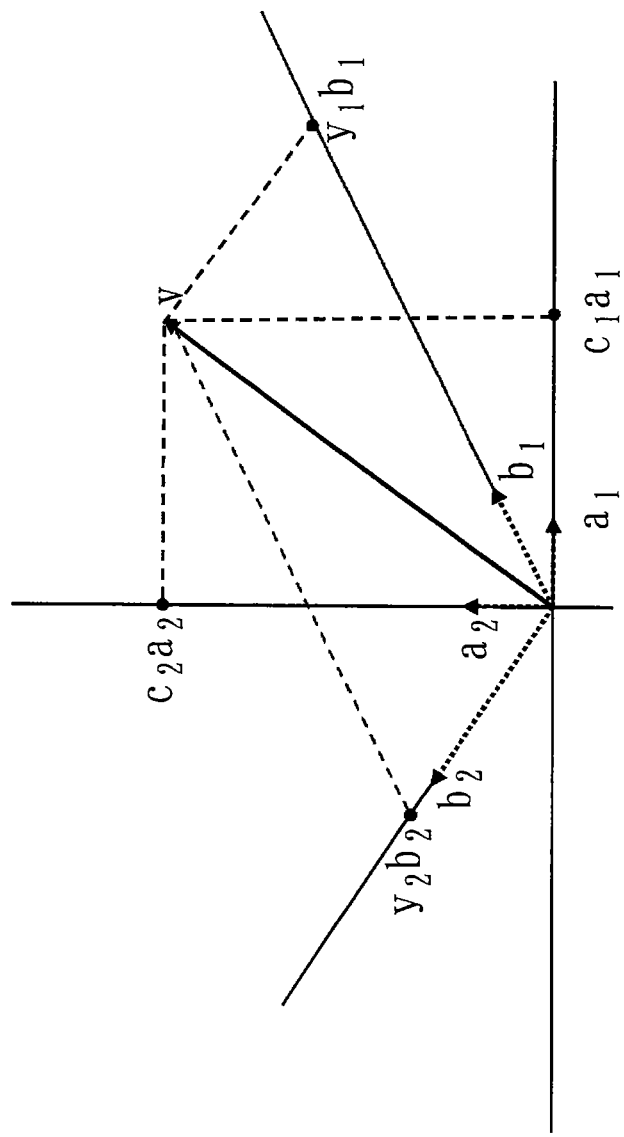
FIG. 5 is a diagram for explaining a basis and a basis vector.

FIG. 5 is a diagram for explaining the basis and the basis vector.

FIG. 5 shows a vector v of a 2-dimensional vector space. The vector v is $c_1 a_1 + c_2 a_2$. Further, the vector v is $y_1 b_1 + y_2 b_2$. Here, $a_1$ and $a_2$ are called basis vectors in a basis A, and are represented as basis $A := (a_1, a_2)$. $b_1$ and $b_2$ are called basis vectors in a basis B, and are represented as basis $B := (b_1, b_2)$. $c_1, c_2, y_1$, and $y_2$ are coefficients of respective basis vectors. FIG. 5 shows a 2-dimensional vector space, so that there are two basis vectors in each basis. In an N-dimensional vector space, there are an N number of basis vectors in each basis.

<2-2. PE for Inner Products in Vector Spaces>

PE for inner products in vector spaces will now be described.

As described above, PE for inner products is a type of PE in which $f_v(x)=1$ if the inner product of the attribute information x and the predicate information $f_v$ is a predetermined value (0 in this case). When the attribute information x and the predicate information $f_v$ are vectors, namely, an attribute vector x and a predicate vector v, their inner-product predicate is defined as shown in Formula 120.

$$\text{If } \vec{x} \cdot \vec{v} = \Sigma_{i=1}^{n} x_i v_i = 0, \text{ then } f_{\vec{v}}(\vec{x}) = 1, \text{ and}$$

$$\text{if } \vec{x} \cdot \vec{v} = \Sigma_{i=1}^{n} x_i v_i \neq 0, \text{ then } f_{\vec{v}}(\vec{x}) = 0, \quad \text{[Formula 120]}$$

where $\vec{x} = (x_1, \ldots, x_n)$, $\vec{v} = (v_1, \ldots, v_n)$.

That is, it is a type of PE in which a result of inputting the attribute information x to the predicate information $f_v$ is 1 (true) if the inner product of the attribute vector x and the predicate vector $\vec{v}$ (i.e., the sum of element-wise inner products) is 0, and a result of inputting the attribute information x to the predicate information $f_v$ is 0 (false) if the inner product of the attribute vector x and the predicate vector v is not 0.

<2-3. Method for Implementing a Hierarchical Structure in Vector Spaces>

A method for implementing a hierarchical structure in vector spaces will now be described.

Figure 6:
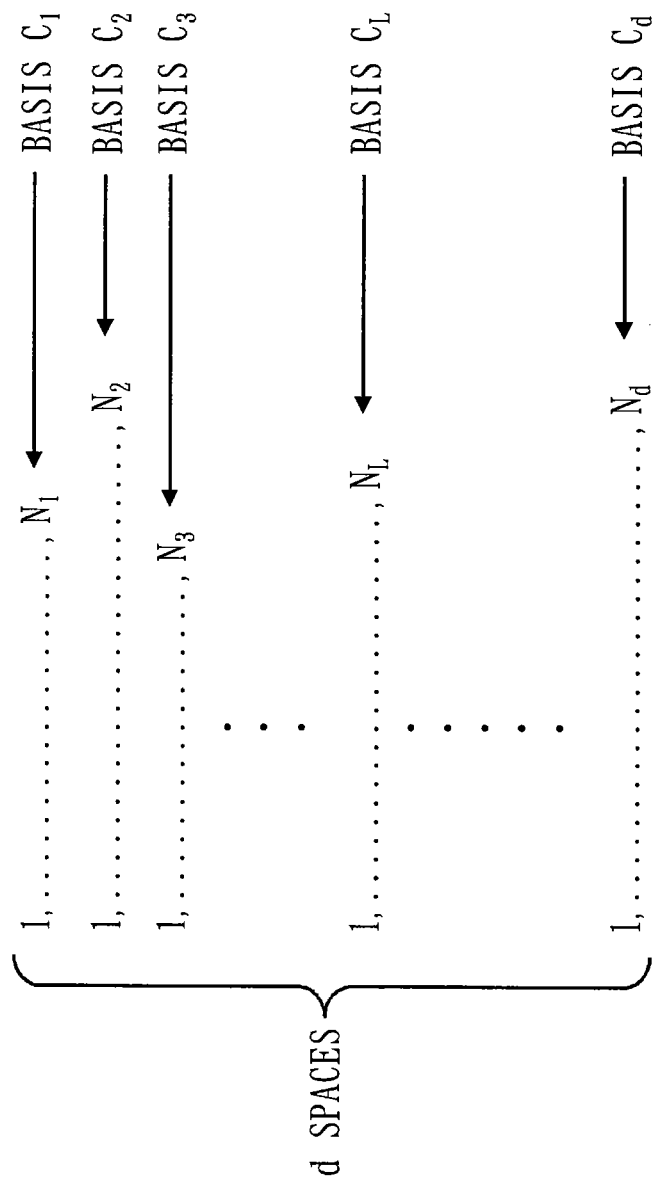
FIG. 6 is a diagram for explaining an example of a method for implementing a hierarchical structure in vector spaces.

FIG. 6 is a diagram for explaining an example of the method for implementing a hierarchical structure in vector spaces.

A d number (d is an integer of 1 or more) of vector spaces will be discussed here. Each vector space is a high-dimensional ($N_t$-dimensional ($t=1, \ldots, d$)) vector space. That is, there exist an $N_t$ number of basis vectors $c_i$ ($i=1, \ldots, N_t$) in a predetermined basis $C_t$ ($t=1, \ldots, d$) in each vector space.

A basis $C_1$ is a space for setting attribute information and predicate information of a first level. A basis $C_2$ is a space for setting attribute information and predicate information of a second level. Likewise, a basis $C_L$ is a space for setting attribute information and predicate information of an L-th level. Thus, d levels can be represented here.

A secret key of the L-th level is generated not only by setting the predicate information of the L-th level using the basis $C_L$, but also by setting the predicate information of the first to (L−1)-th levels using the bases $C_1$ to $C_{L-1}$. That is, in a lower-level secret key, the predicate information to be set in a higher-level secret key is also set. This arrangement allows the predicate information to have a hierarchical structure. Then, using the hierarchical structure of the predicate information, a delegation system in PE for inner products is constructed.

In the following description, a format of hierarchy n:=(d; $N_1, \ldots, N_d$) is used to denote the hierarchical structure in a vector space, where d is a value representing the depth of levels described above, and $N_i$ ($i=1, \ldots, d$) is a value representing the number of dimensions, that is, the number of basis vectors, allocated to each level i.

<2-4. Implementation Example of the Hierarchical Structure>

The hierarchical structure will be explained using a simple example. Explanation will be given using an example where there are three levels and each level is allocated a two-dimensional space. That is, n:=(d; $N_1, \ldots, N_d$)=(3; 2, 2, 2).

A user who has a first-level secret key $sk_1$ generated based on a first-level predicate vector $v_1:=(v_1, v_2)$ can generate a second-level secret key $sk_2$ based on the first-level secret key $sk_1$ and a second-level predicate vector $v_2:=(v_3, v_4)$. That is, the second-level secret key $sk_2$ is generated based on the predicate vectors $(v_1, v_2)$. Likewise, a user who has the second-level secret key $sk_2$ can generate a third-level secret key $sk_3$ based on the second-level secret key $sk_2$ and a third-level predicate vector $v_3:=(v_5, v_6)$. That is, the third-level secret key $sk_3$ is generated based on the predicate vectors $(v_1, v_2, v_3)$.

The first-level secret key $sk_1$ generated based on the first-level predicate vector $v_1$ is a secret key generated by $(v_1, (0, 0), (0, 0))$. Thus, the first-level secret key $sk_1$ can decrypt a ciphertext encrypted by an attribute vector $(x_1, (*, *), (*, *)):=((x_1, x_2), (*, *), (*, *))$ if $v_1 \cdot x_1=0$. This is because $(*, *) \cdot (0, 0)=0$. Here, "*" denotes an arbitrary value.

Likewise, the second-level secret key $sk_2$ generated based on the second-level predicate vectors $(v_1, v_2)$ is a secret key generated by $(v_1, v_2, (0, 0))$. Thus, the second-level secret key $sk_2$ can decrypt a ciphertext encrypted by attribute vectors $(x_1, x_2, (*, *))=((x_1, x_2), (x_3, x_4), (*, *))$ if $v_1 \cdot x_1=0$ and $v_2 \cdot x_2=0$.

However, the second-level secret key $sk_2$ cannot decrypt a ciphertext encrypted by the first-level attribute vector $x_1:=(x_1, x_2)$ (i.e., $(x_1, (*, *), (*, *))$). This is because if not $v_2=(0, 0)$, then $(*, *) \cdot v_2 \neq 0$ and $v_2 \cdot x_2 \neq 0$. Therefore, it can be stated that the second-level secret key $sk_2$ has more limited capabilities than the parent secret key $sk_1$.

<3. Dual Pairing Vector Spaces (DPVS)>

Symmetric bilinear pairing groups will be described first.

Symmetric bilinear pairing groups $(q, G, G^T, g, e)$ are a tuple of a prime q, a cyclic additive group G of order q, a cyclic multiplicative group $G^T$ of order q, $g \neq 0 \in G$, and a polynomial-time computable nondegenerate bilinear pairing e: $G \times G \to G_T$. The nondegenerate bilinear pairing is $e(sg, tg)=e(g, g)^{st}$ and $e(g,g) \neq 1$.

In the following description, Formula 121 is an algorithm that takes $1_\lambda$ as input and outputs values of parameter $param_G:=(q, G, G_T, g, e)$ of bilinear pairing groups with a security parameter $\lambda$.

$$G_{bpg} \qquad \text{[Formula 121]}$$

Dual pairing vector spaces will now be described.

Dual pairing vector spaces $(q, V, G_T, A, e)$ can be constructed by a direct product of the symmetric bilinear pairing groups $(param_G:=(q, G, G_T, g, e))$. The dual pairing vector spaces $(q, V, G_T, A, e)$ are a tuple of a prime q, an N-dimensional vector space V over $F_q$ shown in Formula 122, a cyclic group $G_T$ of order q, and a canonical basis $A:=(a_1, \ldots, a_N)$ of the space V, and have the following operations (1) and (2). Here, $a_i$ is as shown in Formula 123.

$$V := \overbrace{G \times \ldots \times G}^{N} \qquad \text{[Formula 122]}$$

$$a_i := (\overbrace{0, \ldots, 0}^{i-1}, g, \overbrace{0, \ldots, 0}^{N-i}) \qquad \text{[Formula 123]}$$

Operation (1): Nondegenerate Bilinear Pairing

A pairing in the space V is defined by Formula 124.

$$e(x,y):=\Pi_{i=1}^N e(G_i, H_i) \in G_T \qquad \text{[Formula 124]}$$

where
$(G_1, \ldots, G_N):=x \in V$
$(H_1, \ldots, H_N):=y \in V$

This is nondegenerate bilinear, that is, $e(sx, ty)=e(x, y)^{st}$ and if $e(x, y)=1$ for all $y \in V$, then $x=0$. For all i and j, $e(a_i, a_j)=e(g, g)^{\delta_{i,j}}$, where $\delta_{i,j}=1$ if $i=j$, and $\delta_{i,j}=0$ if $i \neq j$, and $e(g, g) \neq 1 \in G_T$.

Operation (2): Distortion Maps

Linear transformations $\phi_{i,j}$ on the space V shown in Formula 125 can achieve Formula 126.

$$\text{If } \phi_{i,j}(a_j) = a_i \qquad \text{[Formula 125]}$$
and
$k \neq j$,
then
$\phi_{i,j}(a_k) = 0.$ $$\phi_{i,j}(x) := (\overbrace{0, \ldots, 0}^{i-1}, g_j, \overbrace{0, \ldots, 0}^{N-i}) \qquad \text{[Formula 126]}$$
where
$(g_1, \ldots g_N) := x.$ The linear transformations $\phi_{i,j}$ will be called distortion maps.

In the following description, Formula 127 is an algorithm that takes as input $1^\lambda$ ($\lambda \in$ natural number), N$\in$natural number, and values of parameter $param_G:=(q, G, G_T, g, e)$ of bilinear pairing groups, and outputs values of parameter $param_v:=(q, V, G_T, A, e)$ of dual pairing vector spaces with a security parameter $\lambda$ and an N-dimensional space V.

$$G_{dpvs} \qquad \text{[Formula 127]}$$

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<4. Construction of HPE and Cryptographic Processing System 10>

<4-1. Basic Construction of HPE for Inner Products>

A construction of the HPE scheme for inner products will be briefly described.

The HPE scheme for inner products includes five probabilistic polynomial-time algorithms: Setup, KeyGen, Enc, Dec, and Delegate$_L$ (L=1, \ldots, d-1).

(Setup)

The Setup algorithm takes as input a security parameter $1^\lambda$ and a format of hierarchy $n:=(d; N_0, \ldots, N_d)$, and outputs a master public key pk and a master secret key sk. The master secret key sk is a top-level key.

(KeyGen)

The KeyGen algorithm takes as input the master public key pk, the master secret key sk, and predicate vectors $(v_1, \ldots, v_L)$ ($1 \leq L \leq d$), and outputs an L-th-level secret key $sk_{(v \to 1, \ldots, v \to L)}$.

(Enc)

The Enc algorithm takes as input the master public key pk, attribute vectors $(x_1, \ldots, x_h)$ ($1 \leq h \leq d$), and a message m, and outputs a ciphertext ct (encrypted text). That is, the Enc algorithm outputs the ciphertext ct containing the message m and encrypted by the attribute vectors $(x_1, \ldots, x_h)$.

(Dec)

The Dec algorithm takes as input the master public key pk, the L-th-level secret key $sk_{(v \to 1, \ldots, v \to L)}$, and the ciphertext ct, and outputs the message m or a distinguished symbol $\bot$. The distinguished symbol $\bot$ is information indicating decryption failure. That is, the Dec algorithm decrypts the ciphertext ct by the L-th-level secret key, and extracts the message m. In case of decryption failure, the Dec algorithm outputs the distinguished symbol $\bot$.

(Delegate$_L$)

Delegate$_L$ takes as input the master public key pk, the L-th-level secret key $sk_{(v \to 1, \ldots, v \to L)}$, and an (L+1)-th-level predicate vector $v_{L+1}$ (L+1$\leq$d), and outputs an (L+1)-th-level secret key $sk_{(v \to 1, \ldots, v \to L+1)}$. That is, the Delegate$_L$ algorithm outputs a lower-level secret key.

<4-2. Cryptographic Processing System 10>

The cryptographic processing system 10 that executes the algorithms of the HPE scheme for inner products will be described.

Figure 7:
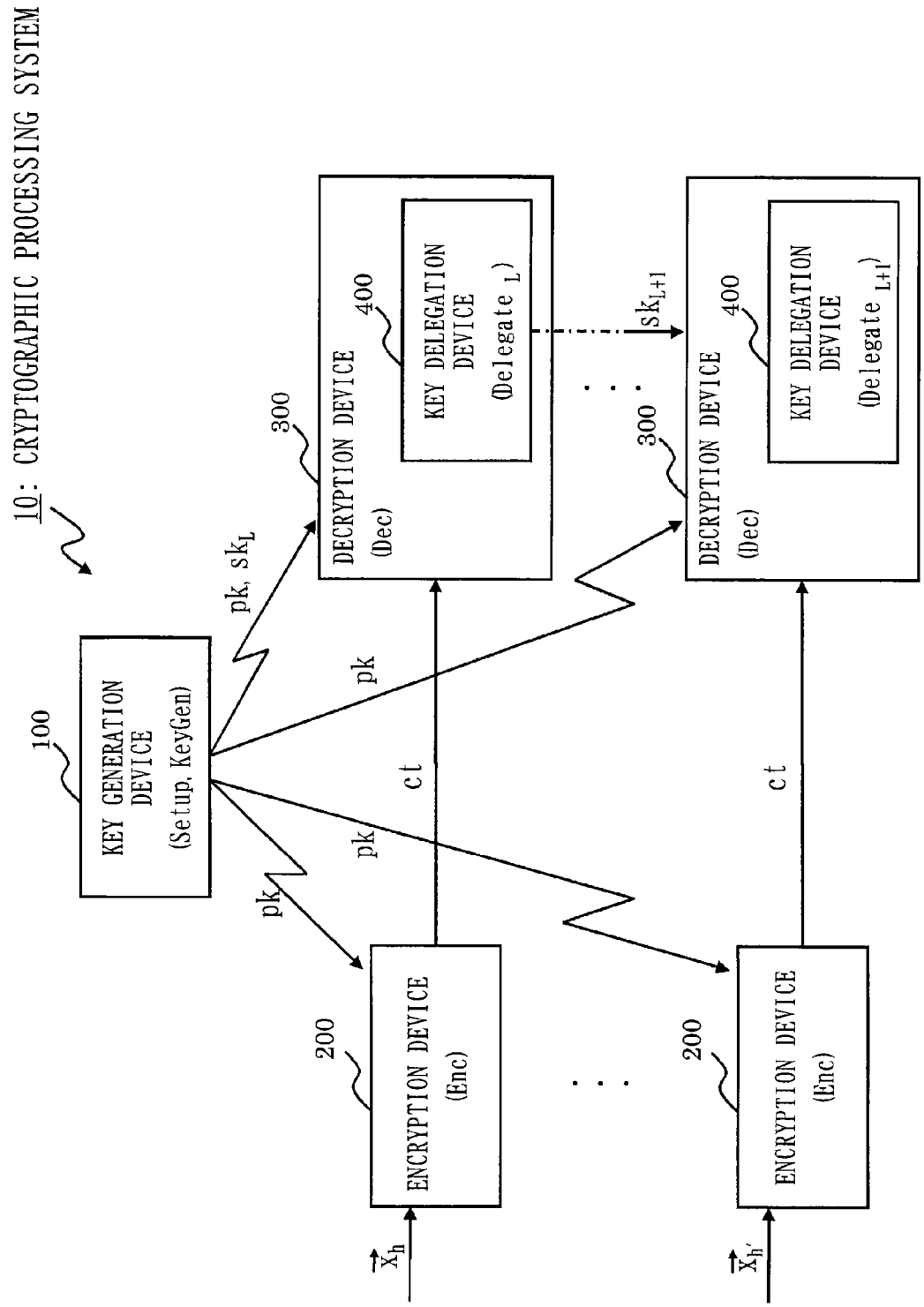
FIG. 7 is a configuration diagram of a cryptographic processing system 10 that executes algorithms of an HPE scheme for inner products.

FIG. 7 is a configuration diagram of the cryptographic processing system 10 that executes the algorithms of the HPE scheme for inner products.

The cryptographic processing system 10 includes a key generation device 100, an encryption device 200, a decryption device 300, and a key delegation device 400. Description will be given herein assuming that the decryption device 300 includes the key delegation device 400. However, the key delegation device 400 may be provided separately from the decryption device 300.

The key generation device 100 executes the Setup algorithm taking as input a security parameter λ and a format of hierarchy n:=(d; $N_0, \ldots, N_d$), and generates a master public key pk and a master secret key sk. Then, the key generation device 100 makes public the generated master public key pk. The key generation device 100 also executes the KeyGen algorithm taking as input the master public key pk, the master secret key sk, and predicate vectors ($v_1, \ldots, v_L$) (1≤L≤d), generates an L-th-level secret key $sk_{(v \to 1, \ldots, v \to L)}$, and secretly provides the L-th-level secret key to the L-th-level decryption device 300.

The encryption device 200 executes the Enc algorithm taking as input the master public key pk, attribute vectors ($x_1, \ldots, x_h$) (1≤h≤d), and a message m, and generates a ciphertext ct. The encryption device 200 transmits the generated ciphertext ct to the decryption device 300.

The decryption device 300 executes the Dec algorithm taking as input the master public key pk, the L-th-level secret key $sk_{(v \to 1, \ldots, v \to L)}$, and the ciphertext ct, and outputs the message m or the distinguished symbol ⊥.

The key delegation device 400 executes the Delegate$_L$ algorithm taking as input the master public key pk, the L-th-level secret key $sk_{(v \to 1, \ldots, v \to L)}$, and an (L+1)-th-level predicate vector $v_{L+1}$ (L+1≤d), and generates an (L+1)-th-level secret key $sk_{(v \to 1, \ldots, v \to L+1)}$, and secretly provides the (L+1)-th-level secret key to the (L+1)-th-level decryption device 300.

<4-3. Details of HPE Scheme for Inner Products and Cryptographic Processing System 10>

Referring to FIGS. 8 to 16, description will be directed to the HPE scheme for inner products according to the first embodiment. Description will also be directed to functions and operations of the cryptographic processing system 10 that implements the HPE scheme for inner products.

Figure 8:
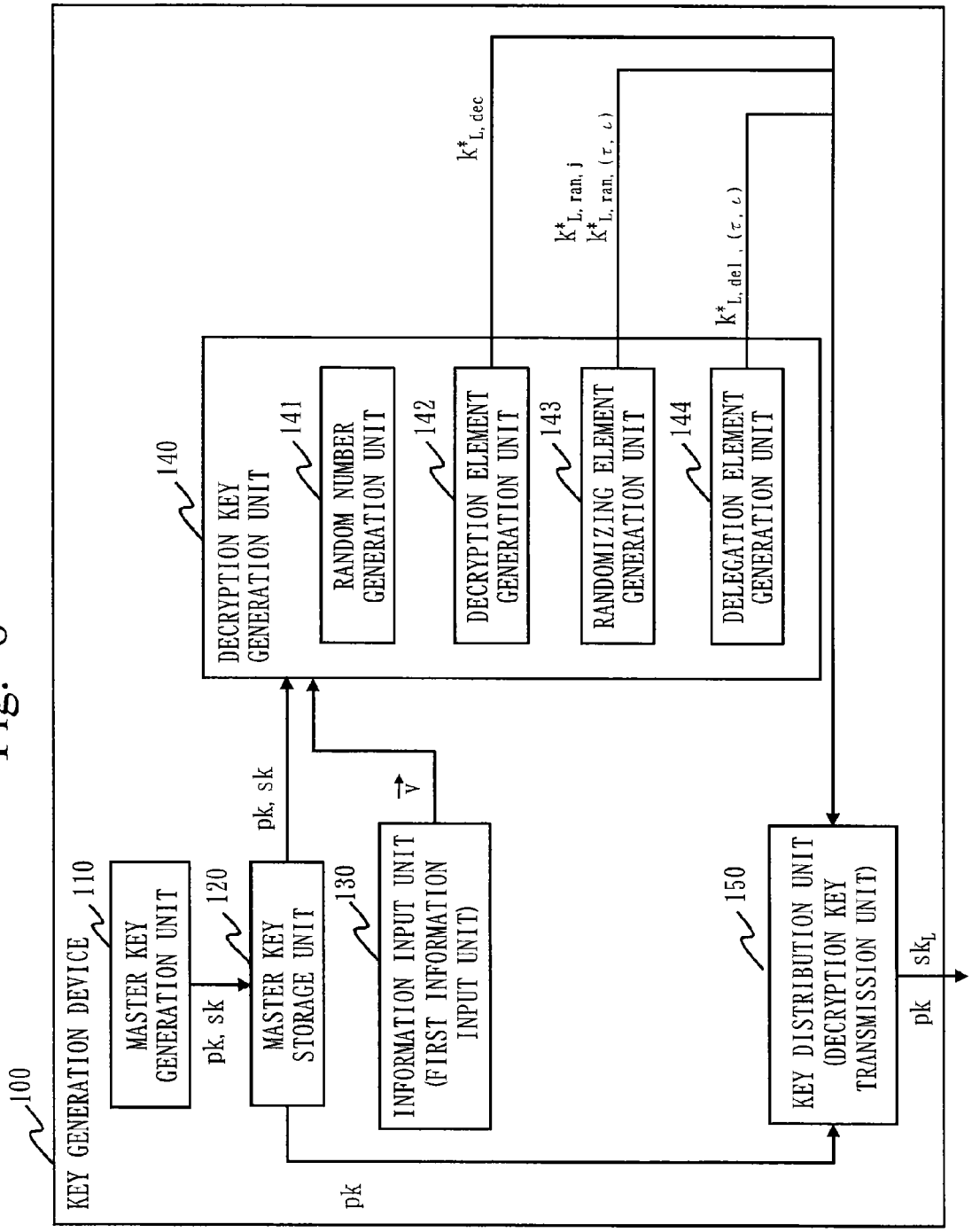
FIG. 8 is a functional block diagram showing functions of a key generation device 100.
Figure 9:
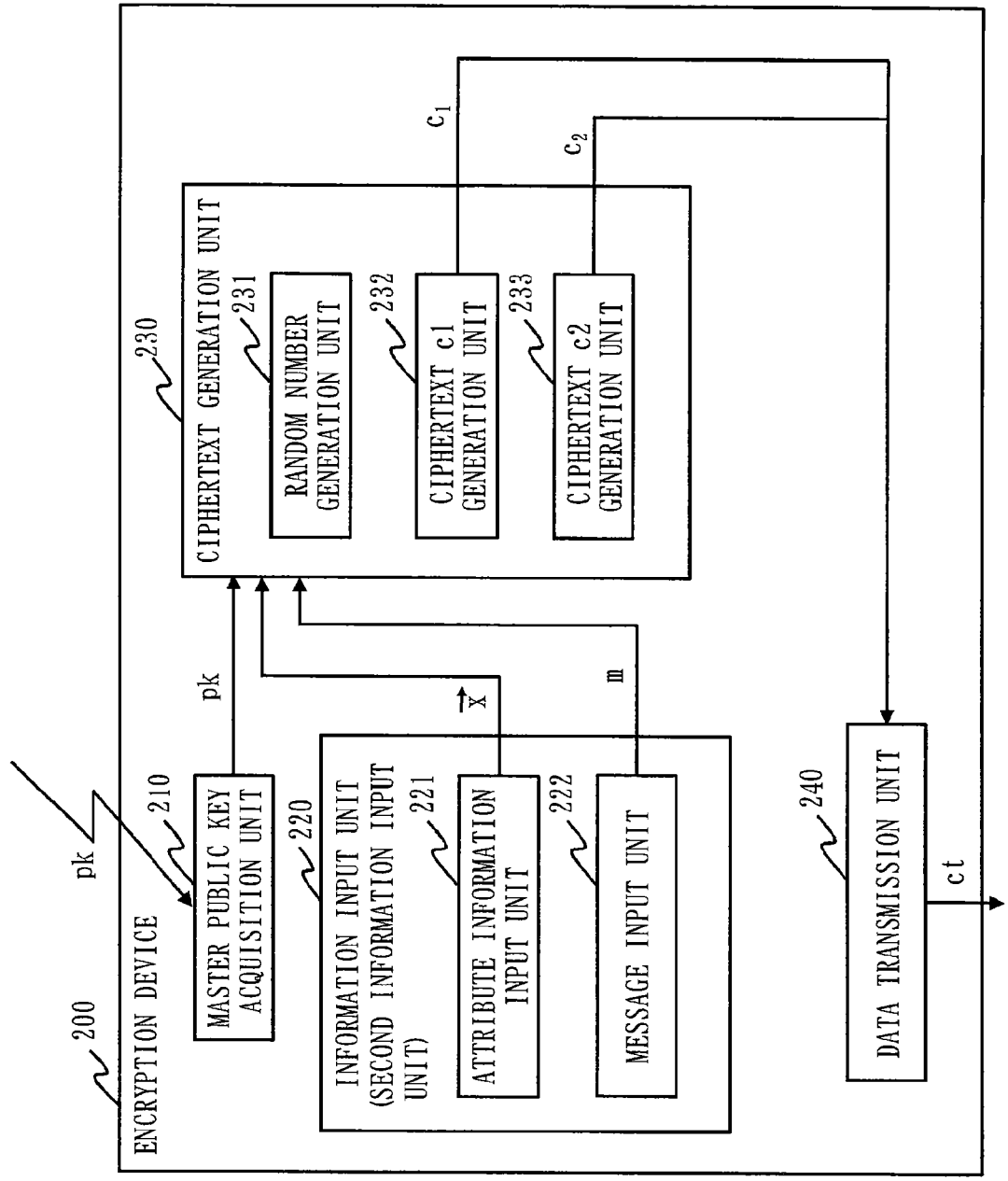
FIG. 9 is a functional block diagram showing functions of an encryption device 200.
Figure 10:
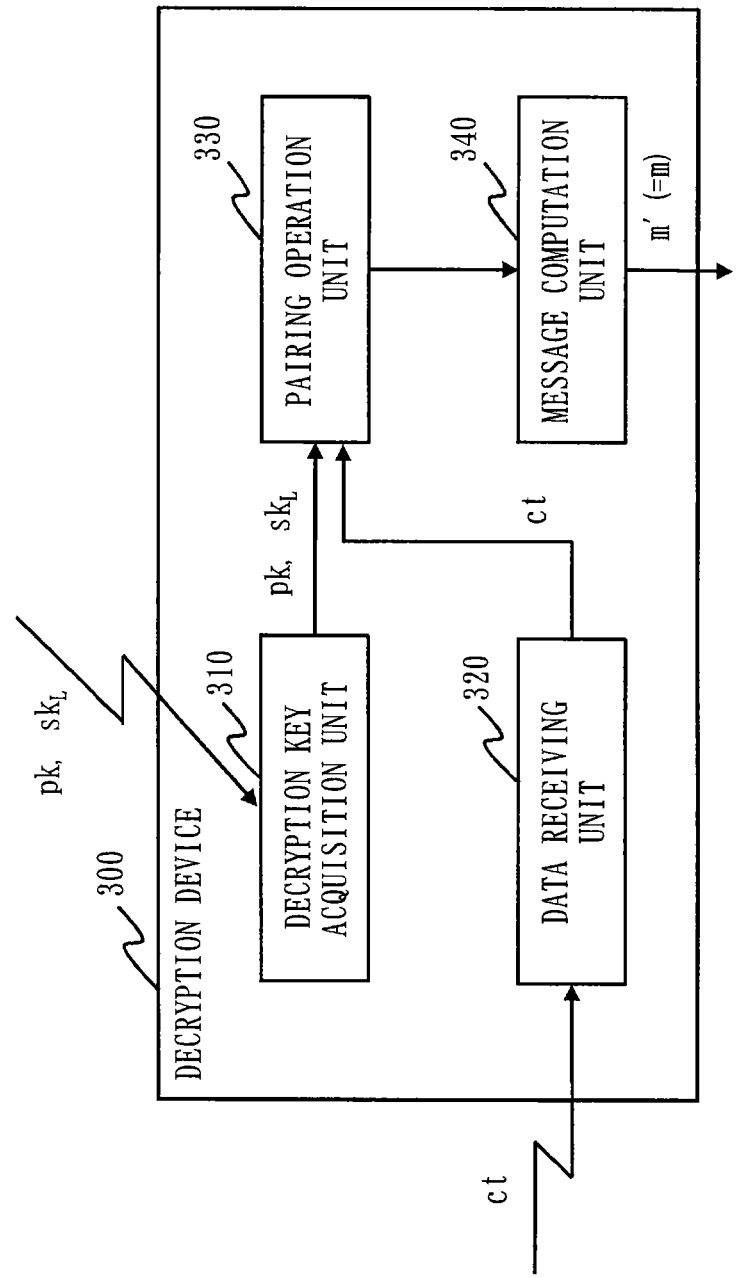
FIG. 10 is functional block diagram showing functions of a decryption device 300.
Figure 11:
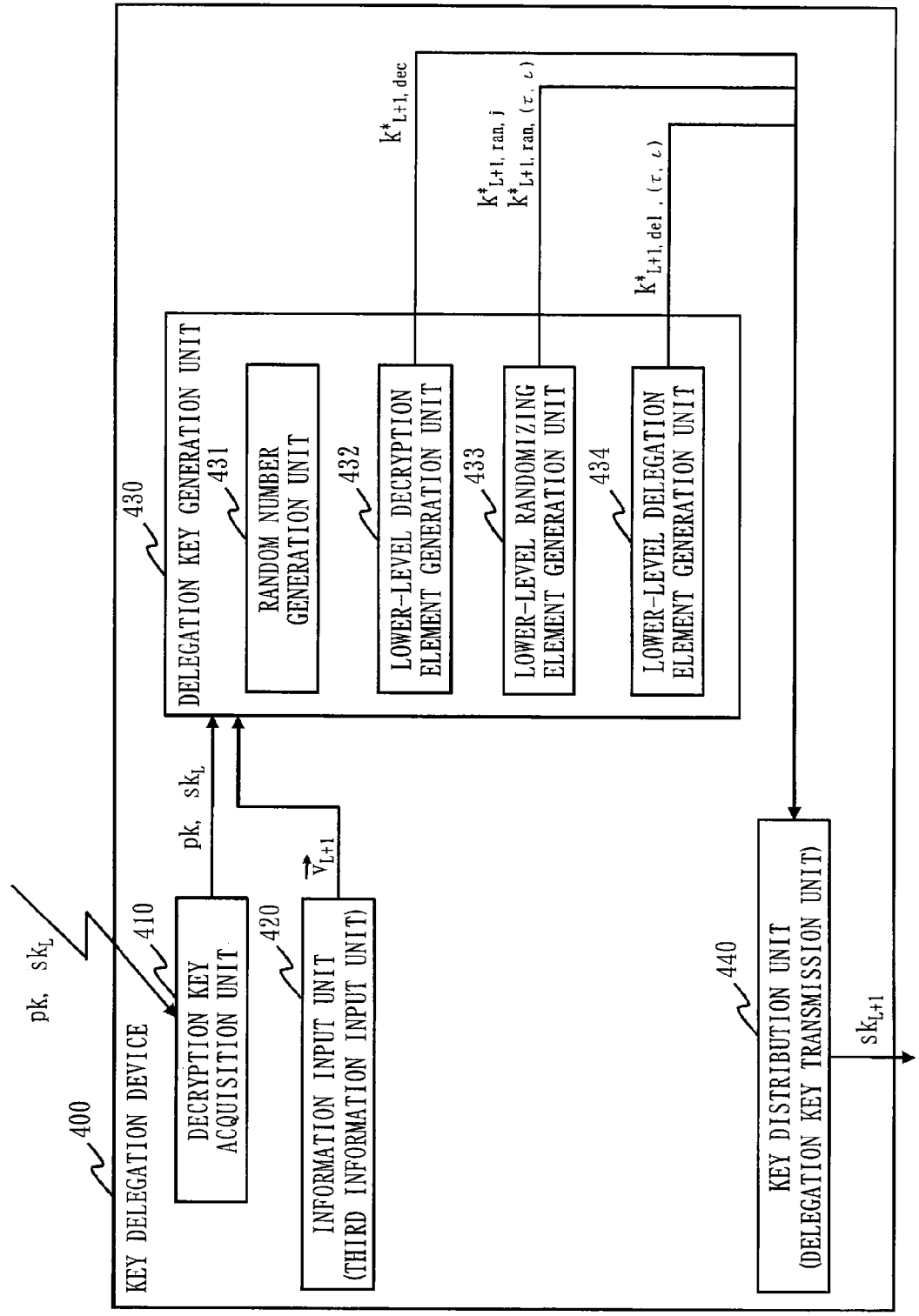
FIG. 11 is a functional block diagram showing functions of a key delegation device 400.

FIG. 8 is a functional block diagram showing functions of the key generation device 100. FIG. 9 is a functional block diagram showing functions of the encryption device 200. FIG. 10 is a functional block diagram showing functions of the decryption device 300. FIG. 11 is a functional block diagram showing functions of the key delegation device 400.

Figure 12:
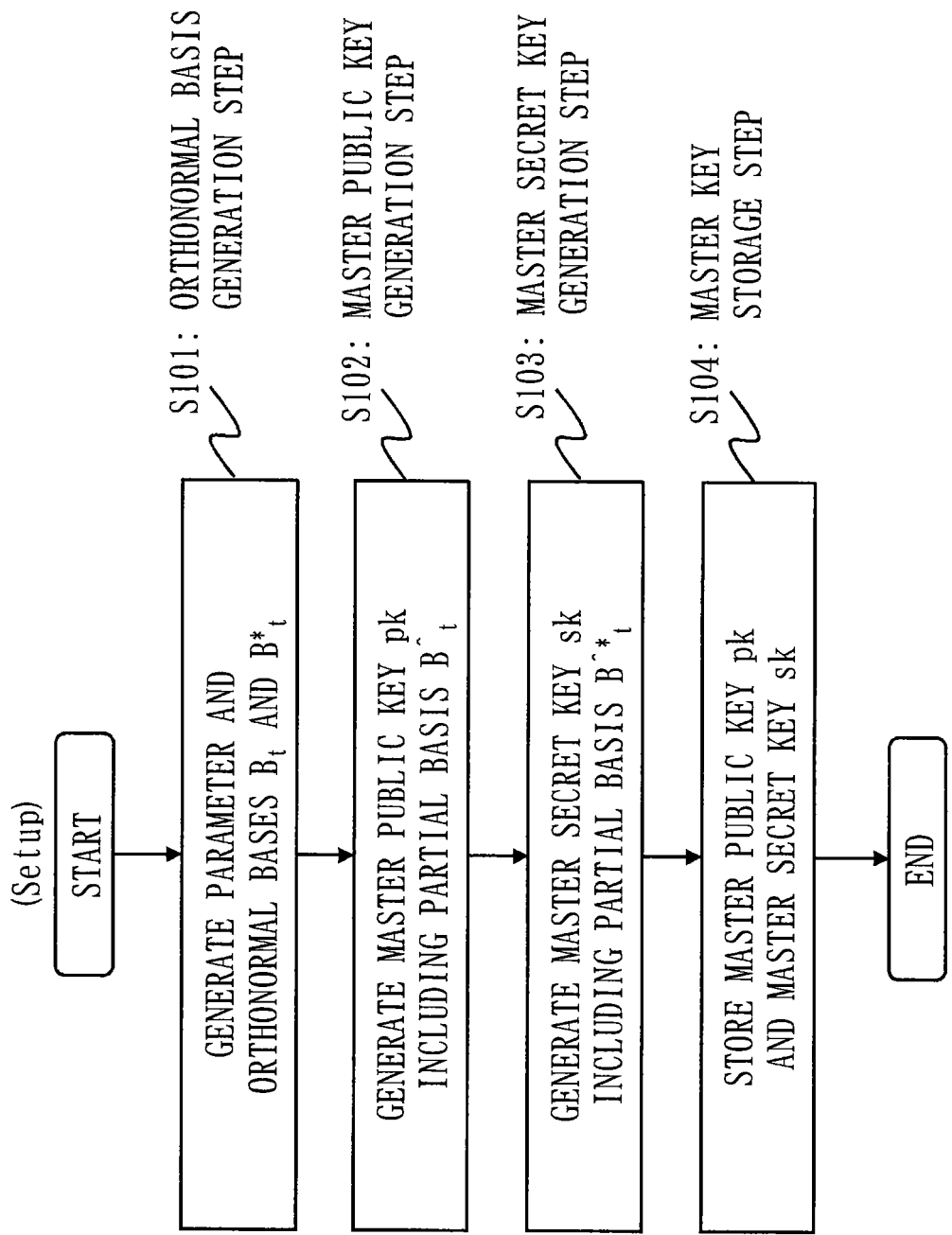
FIG. 12 is a flowchart showing a process of a Setup algorithm.
Figure 13:
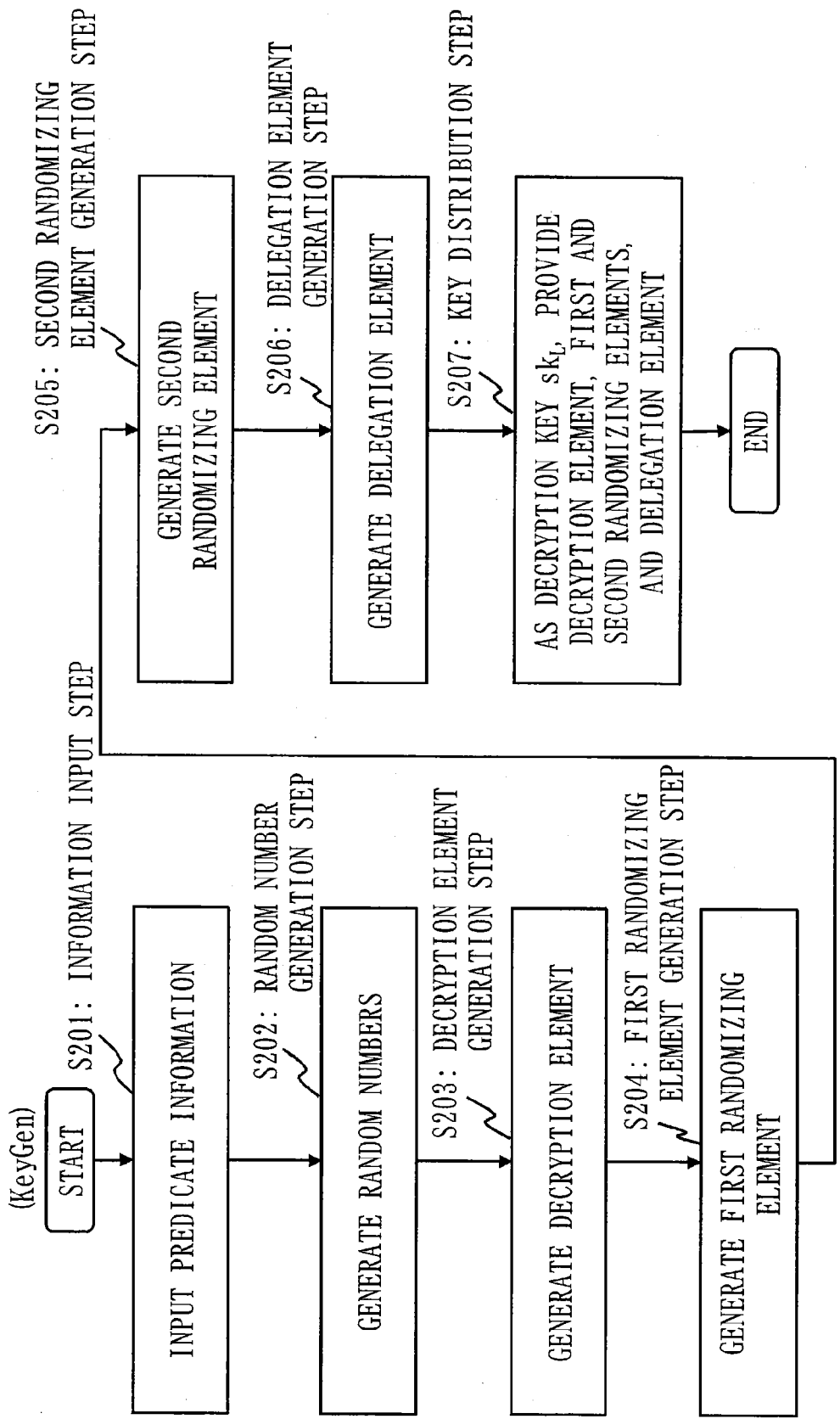
FIG. 13 is a flowchart showing a process of a KeyGen algorithm.
Figure 14:
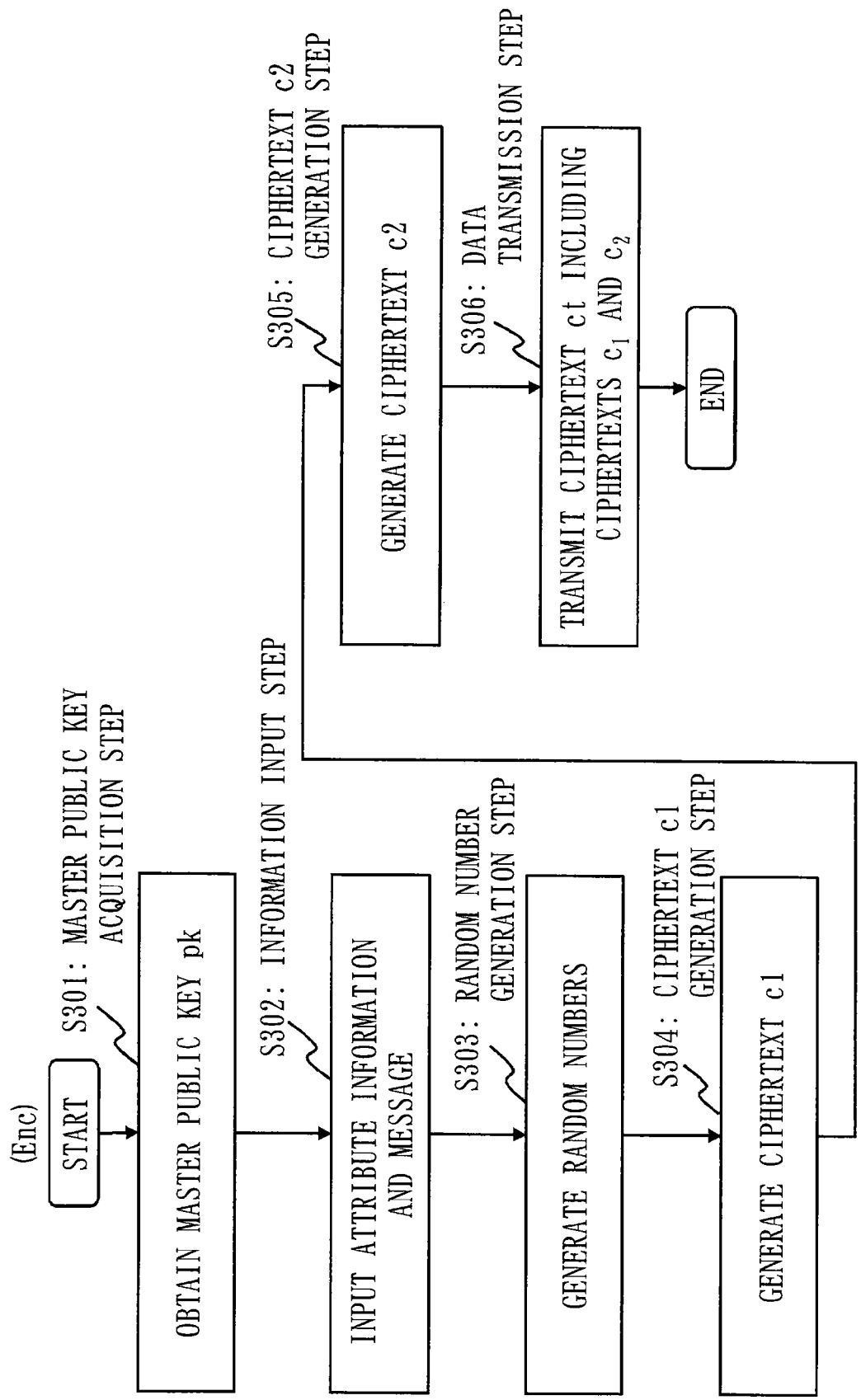
FIG. 14 is a flowchart showing a process of an Enc algorithm.
Figure 15:
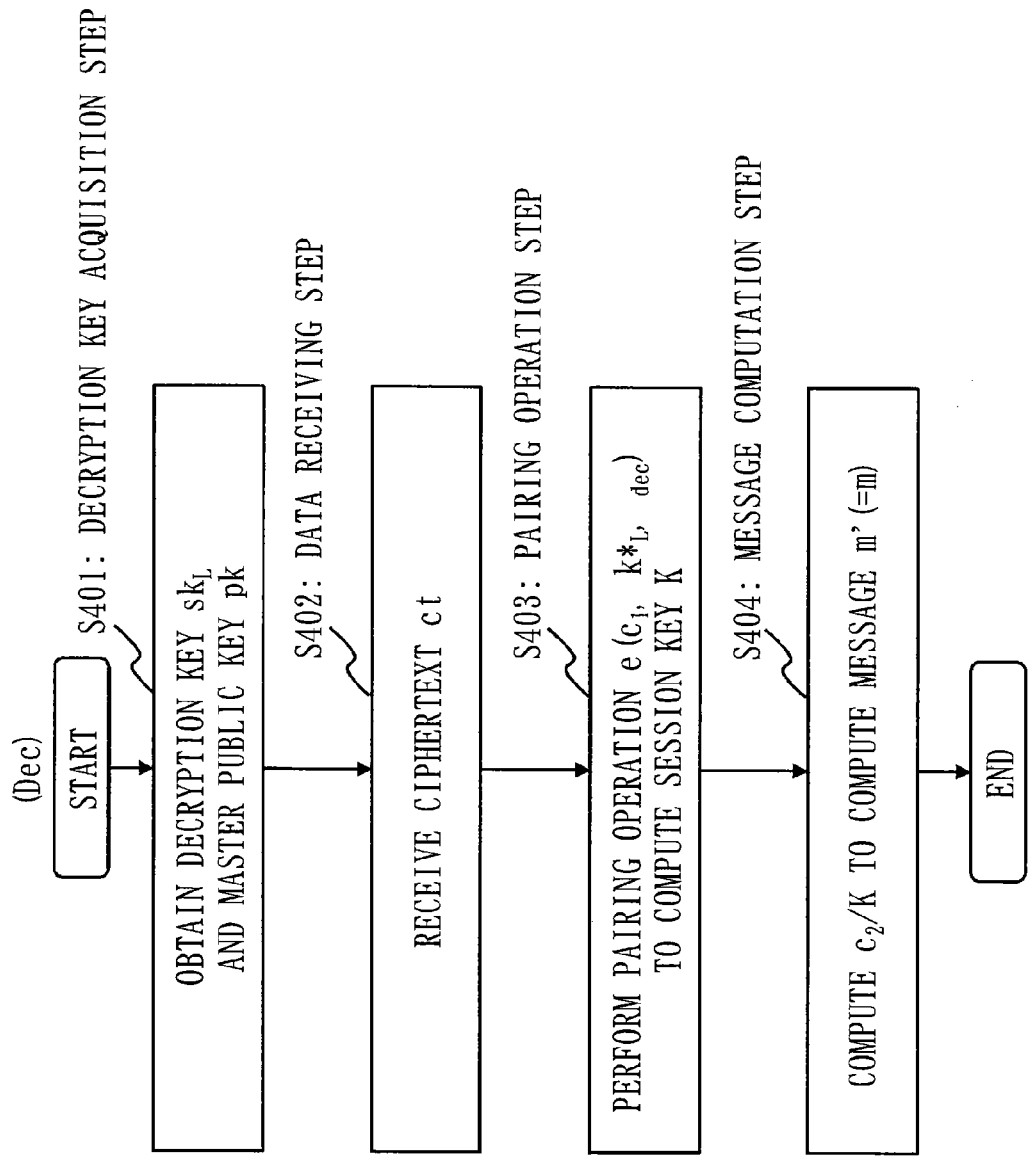
FIG. 15 is a flowchart showing a process of a Dec algorithm.
Figure 16:
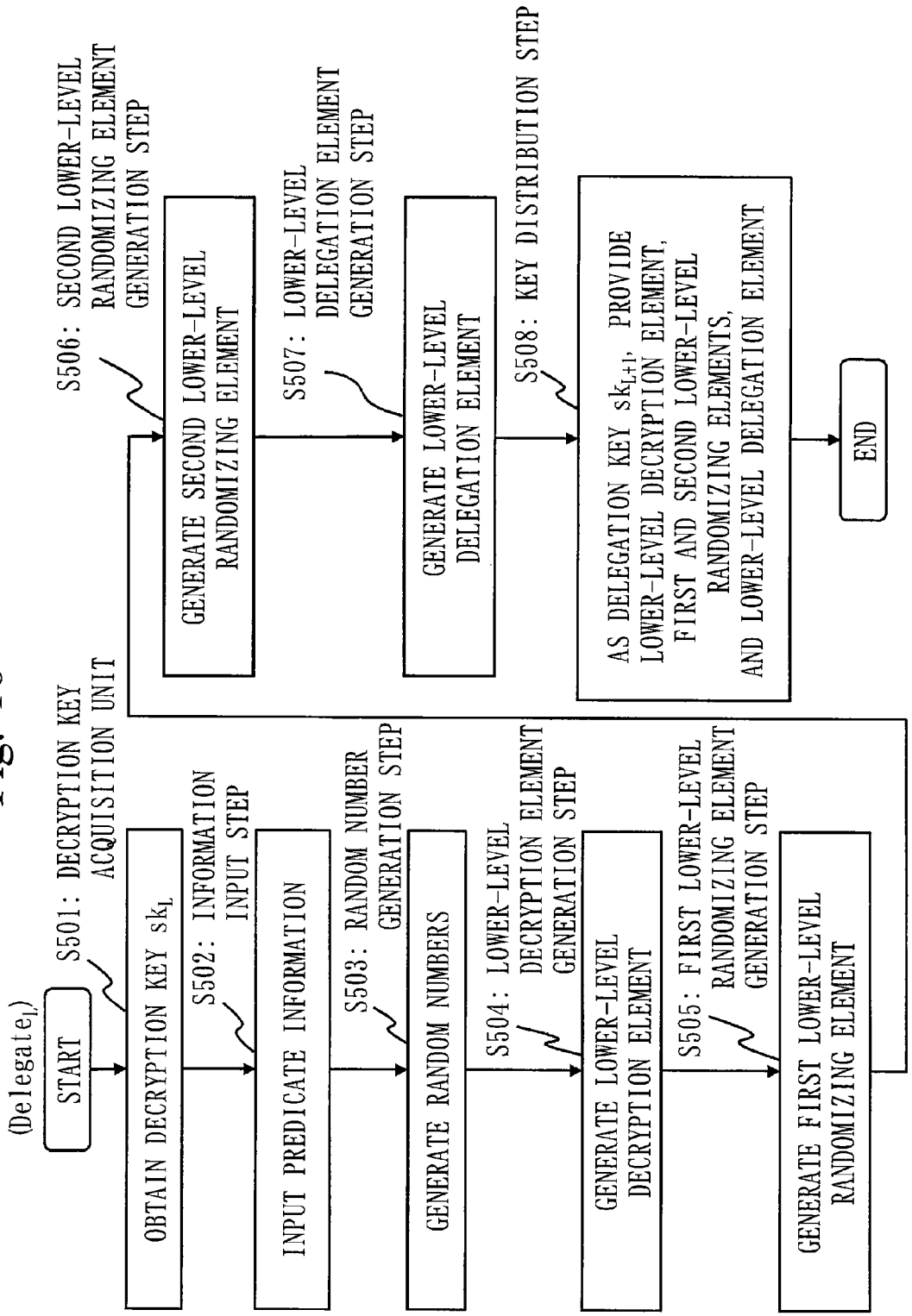
FIG. 16 is a flowchart showing a process of a Delegate$_L$ algorithm.

FIGS. 12 and 13 are flowcharts showing operations of the key generation device 100. FIG. 12 is a flowchart showing a process of the Setup algorithm. FIG. 13 is a flowchart showing a process of the KeyGen algorithm. FIG. 14 is a flowchart showing operations of the encryption device 200 and showing a process of the Enc algorithm. FIG. 15 is a flowchart showing operations of the decryption device 300 and showing a process of the Dec algorithm. FIG. 16 is a flowchart showing operations of the key delegation device 400 and showing a process of the Delegate$_L$ algorithm.

In the following description, a subscript "dec" stands for "decryption". The subscript "dec" indicates a decryption element used for decrypting a ciphertext. A subscript "ran" stands for "randomization". The subscript "ran" indicates a randomizing element for randomizing the coefficient of a predetermined basis vector of a lower-level decryption key. A subscript "del" stands for "delegation". The subscript "del" indicates a delegation element for generating a lower-level decryption key.

The functions and operations of the key generation device 100 will be described.

As shown in FIG. 8, the key generation device 100 includes a master key generation unit 110, a master key storage unit 120, an information input unit 130 (first information input unit), a decryption key generation unit 140, and a key distribution unit 150 (decryption key transmission unit).

The decryption key generation unit 140 includes a random number generation unit 141, a decryption element generation unit 142, a randomizing element generation unit 143, and a delegation element generation unit 144.

Referring to FIG. 12, the process of the Setup algorithm will be described first.

(S101: Orthonormal Basis Generation Step)

Using the processing device, the master key generation unit 110 computes Formula 128, and randomly generates param$_{\vec{n}}$ as well as a basis $B_t$ and a basis $B^*_t$ for each integer t of t=0, . . . , d.

[Formula 128]

$$\text{input} \quad (1)$$
$$1^\lambda, \vec{n} := (d; \vec{n} := (d; n_1, \ldots, n_d, u_0, \ldots, u_d, w_0, \ldots, w_d, z_0, \ldots, z_d))$$
$$N_0 := 1 + u_0 + 1 + w_0 + z_0;$$
$$N_t := n_t + u_t + w_t + z_t (t = 1, \ldots, d)$$

$$param_\mathbb{G} := (q, \mathbb{G}, \mathbb{G}_T, g, e) \xleftarrow{R} \mathcal{G}_{bpg}(1^\lambda) \quad (2)$$

$$\psi \xleftarrow{U} \mathbb{F}_q^\times, \quad (3)$$

Steps (4) to (8) are executed for each $t$ of $t = 0, \ldots, d$.

$$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}) \quad (4)$$

$$X_t := (\chi_{t,i,j})_{i,j} \xleftarrow{U} GL(N_t, \mathbb{F}_q) \quad (5)$$

$$(\nu_{t,i,j})_{i,j} := \psi \cdot (X_t^T)^{-1} \quad (6)$$

$$\mathbb{B}_t := (b_{t,1}, \ldots, b_{t,N_t}) \quad (7)$$

$$\mathbb{B}^*_t := (b^*_{t,1}, \ldots, b^*_{t,N_t}) \quad (8)$$

$$param_{\vec{n}} := (\{param_{\mathbb{V}_t}\}_{t=0,\ldots,d}, g_T) \quad (9)$$

That is, the master key generation unit 110 executes the following steps.

(1) Using the input device, the master key generation unit 110 inputs a security parameter λ($1^\lambda$) and a format of attribute n:=(d; $n_1, \ldots, n_d, u_0, \ldots, u_d, w_0, \ldots, w_d, z_0, \ldots, z_d$), where d is an integer of 1 or more, $n_t$ is an integer of 1 or more for each integer t of t=1, . . . , d, and $u_t$, $w_t$, $z_t$ are integers of 1 or more for each integer t of t=0, . . . , d. The master key generation unit 110 also sets $N_0:=1+u_0+1+w_0+z_0$ and $N_t:=n_t+u_t+w_t+z_t$ for each integer t of t=1, . . . , d.

(2) Using the processing device, the master key generation unit 110 executes the algorithm $G_{bpg}$ taking as input the security parameter λ($1^\lambda$) input in (1), and randomly generates values of parameter param$_G$:=(q, G, $G_T$, g, e) of bilinear pairing groups.

(3) Using the processing device, the master key generation unit 110 generates a random number ψ.

Then, the master key generation unit 110 executes the following steps (4) to (8) for each integer t of t=0, . . . , d.

(4) Using the processing device, the master key generation unit 110 executes the algorithm $G_{dpvs}$ taking as input the security parameter λ($1^\lambda$) and $N_t$ input in (1) and the values of param$_G$:=(q, G, $G_T$, g, e) generated in (2), and generates values of parameter param$_{V_t}$:=(q, $V_t$, $G_T$, $A_t$, e) of dual pairing vector spaces.

(5) Using the processing device, the master key generation unit 110 randomly generates a linear transformation $X_t := (\chi_{t,i,j})_{i,j}$ taking as input $N_t$ set in (1) and $F_q$. Note that GL stands for general linear. That is, GL is a general linear group, a set of square matrices with nonzero determinants, and a group under multiplication. $(\chi_{t,i,j})_{i,j}$ denotes a matrix associated with the subscripts i,j of the matrix $\chi_{t,i,j}$, where $i, j=1, \ldots, N_t$.

(6) Using the processing device and based on the random number $\psi$ and the linear transformation $X_t$, the master key generation unit 110 generates $(v_{t,i,j})_{i,j} := \psi \cdot (X_t^T)^{-1}$. As in the case of $(\chi_{t,i,j})_{i,j}$, $(v_{t,i,j})_{i,j}$ denotes a matrix associated with the subscripts i,j of the matrix $v_{t,i,j}$, where $i, j=1, \ldots, N_t$.

(7) Using the processing device and based on the linear transformation $X_t$ generated in (5), the master key generation unit 110 generates the basis $B_t$ from the orthonormal basis $A_t$ generated in (4).

(8) Using the processing device and based on $(v_{t,i,j})_{i,j}$ generated in (6), the master key generation unit 110 generates the basis $B^*_t$ from the orthonormal basis $A_t$ generated in (4).

(9) Using the processing device, the master key generation unit 110 sets $e(g,g)^\psi$ in $g_T$. The master key generation unit 110 also sets $\{param_{V_t}\}_{t=0,\ldots,d}$ generated in (4) and $g_T$ in $param_{\vec{n}}$, where $g_T = e(b_{t,i}, b^*_{t,i})$ for each integer t of $t=0, \ldots, d$ and each integer i of $i=1, \ldots, N_t$.

To summarize, in (S101), the master key generation unit 110 executes the algorithm $G_{ob}$ shown in Formula 129, and generates $param_{\vec{n}}$ as well as the basis $B_t$ and the basis $B^*_t$ for each integer t of $t=0, \ldots, d$.

$$\mathcal{G}_{ob}(1^\lambda, \quad \text{[Formula 129]}$$
$$\vec{n} := (d; \vec{n} := (d; n_1, \ldots, n_d, u_0, \ldots, u_d, w_0, \ldots, w_d,$$
$$z_0, \ldots, z_d)):$$
$$N_0 := 1 + u_0 + 1 + w_0 + z_0, N_t := n_t + u_t + w_t + z_t$$
$$\text{for } t = 1, \ldots, d,$$
$$param_\mathbb{G} := (q, \mathbb{G}, \mathbb{G}_T, g, e) \xleftarrow{R} \mathcal{G}_{bpg}(1^\lambda),$$
$$\psi \xleftarrow{U} \mathbb{F}_q^\times,$$
$$\text{For } t = 0, \ldots, d,$$
$$param_{\mathbb{V}_t} :=$$
$$(q, \mathbb{V}_t, \mathbb{G}_T, \mathbb{A}_t, e) := \mathcal{G}_{dpvs}(1^\lambda, N_t, param_\mathbb{G}),$$
$$X_t := (\chi_{t,i,j})_{i,j} \xleftarrow{U} GL(N_t, \mathbb{F}_q),$$
$$(v_{t,i,j})_{i,j} := \psi \cdot (X_t^T) - 1,$$
$$b_{t,i} := (\chi_{t,i,1}, \ldots, \chi_{t,i,N_t})\mathbb{A}_t = \sum_{j=1}^{N_t} \chi_{t,i,j} a_{t,j},$$
$$\mathbb{B}_t := (b_{t,1}, \ldots, b_{t,N_t}),$$
$$b^*_{t,i} := (v_{t,i,1}, \ldots, v_{t,i,N_t})\mathbb{A}_t = \sum_{j=1}^{N_t} v_{t,i,j} a_{t,j},$$
$$\mathbb{B}^*_t := (b^*_{t,1}, \ldots, b^*_{t,N_t}),$$
$$g_T := e(g, g)^\psi,$$
$$param_{\vec{n}} := (\{param_{\mathbb{V}_t}\}_{t=0,\ldots,d}, g_T)$$
$$\text{return } (param_{\vec{n}}, \{\mathbb{B}_t, \mathbb{B}^*_t\}_{t=0,\ldots,d}).$$

(S102: Master Public Key Generation Step)

Using the processing device, the master key generation unit 110 generates a partial basis $\hat{B}_0$ of the basis $B_0$ and a partial basis $\hat{B}_t$ of the basis $B_t$ for each integer t of $t=1, \ldots, d$, as shown in Formula 130.

$$\hat{\mathbb{B}}_0 := (b_{0,1}, b_{0,1+u_0+1}, b_{0,1+u_0+1+w_0+1}, \ldots,$$
$$b_{0,1+u_0+1+w_0+z_0}),$$
$$\hat{\mathbb{B}}_t := (b_{t,1}, \ldots, b_{t,n_t}, b_{t,n_t+u_t+w_t+1}, \ldots, b_{t,n_t+u_t+w_t+z_t}) \text{ for }$$
$$t=1, \ldots, d \quad \text{[Formula 130]}$$

The master key generation unit 110 designates, as a master public key pk, a combination of the generated partial basis $\hat{B}_0$ and partial basis $\hat{B}_t$, the security parameter $\lambda(1^\lambda)$ input in (S101), and $param_{\vec{n}}$, the basis vectors $b^*_{0,1+u_0+1+1}, \ldots, b^*_{0,1+u_0+1+w_0}$ (where u0 and w0 respectively denote $u_0$ and $w_0$), and the basis vectors $b^*_{t,nt+ut+1}, \ldots, b^*_{t,nt+ut+wt}$ (where nt, ut, and wt respectively denote $n_t$, $u_t$, and $w_t$) for each integer t of $t=1, \ldots, d$ generated in (S101).

(S103: Master Secret Key Generation Step)

Using the processing device, the master key generation unit 110 generates a partial basis $\hat{B}^*_0$ of the basis $B^*_0$ and a partial basis $\hat{B}^*_t$ of the basis $B^*_t$ for each integer t of $t=1, \ldots, d$, as shown in Formula 131.

$$\hat{\mathbb{B}}^*_0 := (b^*_{0,1}, b^*_{0,1+u_0+1}),$$
$$\hat{\mathbb{B}}^*_t := (b^*_{t,1}, \ldots, b^*_{t,n_t}) \text{ for } t=1, \ldots, d \quad \text{[Formula 131]}$$

The master key generation unit 110 designates the generated partial basis $\hat{B}^*_0$ and partial basis $\hat{B}^*_t$ as a master secret key.

(S104: Master Key Storage Step)

The master key storage unit 120 stores the master public key pk generated in (S102) in the storage device. The master key storage unit 120 also stores the master secret key sk generated in (S103) in the storage device.

To summarize, in (S101) to (S103), the key generation device 100 executes the Setup algorithm shown in Formula 132, and generates the master public key pk and the master secret key sk. Then, in (S104), the key generation device 100 stores the generated master public key pk and master secret key sk in the storage device.

The master public key pk is made public through a network, for example, so as to be made available for the decryption device 300.

$$\text{Setup } (1^\lambda, \vec{n} := (d; n_1, \ldots, n_d, u_0, \quad \text{[Formula 132]}$$
$$\ldots, u_d, w_0, \ldots, w_d, z_0, \ldots, z_d)):$$
$$(param_{\vec{n}}, \{\mathbb{B}_t, \mathbb{B}^*_t\}_{t=0,\ldots,d}) \xleftarrow{R} \mathcal{G}_{ob}(1^\lambda, \vec{n}),$$
$$\hat{\mathbb{B}}_0 := (b_{0,1}, b_{0,1+u_0+1}, b_{0,1+u_0+1w_0+1}, \ldots, b_{0,1+u_0+1+w_0+z_0}),$$
$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$
$$\text{for } t = 1, \ldots, d,$$
$$\hat{\mathbb{B}}^*_0 := (b^*_{0,1}, b^*_{0,1+u_0+1}),$$
$$\hat{\mathbb{B}}^*_t := (b^*_{t,1}, \ldots, b^*_{t,n_t}) \text{ for } t = 1, \ldots, d,$$
$$pk := (1^\lambda, param_{\vec{n}}, \{\hat{\mathbb{B}}_t\}_{t=0,\ldots,d}, b^*_{01+u_0+1+1}, \ldots,$$
$$b^*_{0,1+u_0+1+w_0}, \{b^*_{t,n_t+u_t,+1}, \ldots, b^*_{t,n_t+u_t+w_t}\}_{t=1,\ldots,d}),$$
$$sk := \{\hat{\mathbb{B}}^*_t\}_{t=0,\ldots,d},$$
$$\text{return } pk, sk.$$

Referring to FIG. 13, the process of the KeyGen algorithm executed by the key generation device 100 will now be described.

(S201: Information Input Step)

Using the input device, the information input unit 130 inputs predicate information $(v_1, \ldots, v_L) := ((v_{1,i} \; (i=1, \ldots,$ $n_1)), \ldots, (v_{L,i} (i=1, \ldots, n_L)))$. As predicate information, an attribute of a user of a key is input.

(S202: Random Number Generation Step)

Using the processing device, the random number generation unit 141 generates a random number $\psi$, random numbers $s_{dec,t}$, $s_{ran,j,t}$ (t=1, ..., L), random numbers $\theta_{dec,t}$, $\theta_{ran,j,t}$, $\eta_{dec,t}$, $\eta_{ran,j,t}$ (t=0, ..., L), random numbers $s_{ran,(\tau,\iota),t}$, $s_{del,(\tau,\iota),t}$ (t=1, ..., L+1), and random numbers $\theta_{ran,(\tau,\iota),t}$, $\theta_{del,(\tau,\iota),t}$, $\eta_{ran,(\tau,\iota),t}$, $\eta_{del,(\tau,\iota),t}$ (t=0, ..., L+1) for each integer j, $\tau$, $\iota$ of j=1, ..., 2L, $\tau$ of $\tau$=L+1, ... d, and $(\tau,\iota)=(\tau,1), \ldots, (\tau,n_\tau)$, as shown in Formula 133.

$$\text{for}$$
$$j = 1, \ldots, 2L;$$
$$\tau = L+1, \ldots, d;$$
$$(\tau, l) = (\tau, 1), \ldots, (\tau, n_\tau);$$
$$\psi, s_{dec,t}, s_{ran,j,t} \xleftarrow{U} \mathbb{F}_q (t = 1, \ldots, L),$$
$$\theta_{dec,t}, \theta_{ran,j,t} \xleftarrow{U} \mathbb{F}_q (t = 0, \ldots, L),$$
$$\vec{\eta}_{dec,t} := (\eta_{dec,t,1}, \ldots, \eta_{dec,t,w_t}) \xleftarrow{U} \mathbb{F}_q^{w_t} (t = 0, \ldots, L),$$
$$\vec{\eta}_{ran,j,t} := (\eta_{ran,j,t,1}, \ldots, \eta_{ran,j,t,w_t}) \xleftarrow{U} \mathbb{F}_q^{w_t} (t = 0, \ldots, L),$$
$$s_{ran,(\tau,l),t}, s_{del,(\tau,l),t} \xleftarrow{U} \mathbb{F}_q (t = 1, \ldots, L+1),$$
$$\theta_{ran,(\tau,l),t}, \theta_{del,(\tau,l),t} \xleftarrow{U} \mathbb{F}_q (t = 0, \ldots, L+1),$$
$$\vec{\eta}_{ran,(\tau,l),t} := (\eta_{ran,(\tau,l),t,1}, \ldots, \eta_{ran,(\tau,l),t,w_t}) \xleftarrow{U}$$
$$\mathbb{F}_q^{w_t} (t = 0, \ldots, L+1),$$
$$\vec{\eta}_{del,(\tau,l),t} := (\eta_{del,(\tau,l),t,1}, \ldots, \eta_{del,(\tau,l),t,w_t}) \xleftarrow{U}$$
$$\mathbb{F}_q^{w_t} (t = 0, \ldots, L+1) \quad \text{[Formula 133]}$$

Also, $s_{dec,0}$, $s_{ran,j,0}$, $s_{ran,(\tau,\iota),0}$, and $s_{del,(\tau,\iota),0}$ are set as shown in Formula 134.

$$s_{dec,0} := \sum_{t=1}^{L} s_{dec,t},$$
$$s_{ran,j,0} := \sum_{t=1}^{L} s_{ran,j,t},$$
$$s_{ran,(\tau,\iota),0} := \sum_{t=1}^{L+1} s_{ran,(\tau,\iota),t},$$
$$s_{del,(\tau,\iota),0} := \sum_{t=1}^{L+1} s_{del,(\tau,\iota),t} \quad \text{[Formula 134]}$$

(S203: Decryption Element Generation Step)

Using the processing device, the decryption element generation unit 142 generates a decryption element $k^*_{L,dec}$ which is an element of a decryption key $sk_L$, as shown in Formula 135.

$$k^*_{L,dec} := ((-s_{dec,0}, 0^{u_0}, 1, \vec{\eta}_{dec,0}, 0^{z_0}) \mathbb{B}^*_0, (s_{dec,t}$$
$$\vec{e}_{t,1} + \theta_{dec,t} \vec{v}_0, 0^{u_t}, \vec{\eta}_{dec,t}, 0^{z_t}) \mathbb{B}^*_t : t=1, \ldots, L) \quad \text{[Formula 135]}$$

As described above, for the basis B and the basis B* shown in Formula 110, Formula 111 is defined. Thus, Formula 135 denotes that coefficients of basis vectors of the basis $B^*_0$ and the basis $B^*_t$ (t=1, ..., L) are set as described below to generate the decryption element $k^*_{L,dec}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{dec,0}$ is set as a coefficient of a basis vector 1 of the basis $B^*_0$. 0 is set as a coefficient of each of basis vectors 1+1, ..., 1+$u_0$. 1 is set as a coefficient of a basis vector 1+$u_0$+1. $\eta_{dec,0,1}, \ldots, \eta_{dec,0,w0}$ (where w0 denotes $w_0$) are respectively set as coefficients of basis vectors 1+$u_0$+1+1, ..., 1+$u_0$+1+$w_0$. 0 is set as a coefficient of each of basis vectors 1+$u_0$+1+$w_0$+1, ..., 1+$u_0$+1+$w_0$+$z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, \ldots, b^*_{t,3}$.

$s_{dec,t} + \theta_{dec,t} v_{t,1}$ is set as a coefficient of a basis vector 1 of the basis $B^*_t$ (t=1, ..., L). $\theta_{dec,t} v_{t,2}, \ldots, \theta_{dec,t} v_{t,nt}$ (where nt denotes $n_t$) are respectively set as coefficients of basis vectors 2, ..., $n_t$. 0 is set as a coefficient of each of basis vectors $n_t$+1, ..., $n_t$+$u_t$. $\eta_{dec,t,1}, \ldots, \eta_{dec,t,wt}$ (where wt denotes $w_t$) are respectively set as coefficients of basis vectors $n_t$+$u_t$+1, ..., $n_t$+$u_t$+$w_t$. 0 is set as a coefficient of each of basis vectors $n_t$+$u_t$+$w_t$+1, ..., $n_t$+$u_t$+$w_t$+$z_t$.

(S204: First Randomizing Element Generation Step)

Using the processing device, the randomizing element generation unit 143 generates a first randomizing element $k^*_{L,ran,j}$ which is an element of the decryption key $sk_L$, for each integer j of j=1, ..., 2L, as shown in Formula 136.

$$k^*_{L,ran,j} := ((-s_{ran,j,0}, 0^{u_0}, 0, \vec{\eta}_{ran,j,0}, 0^{z_0}) \mathbb{B}^*_0, (s_{ran,j,t}$$
$$\vec{e}_{t,1} + \theta_{ran,j,t} \vec{v}_t, 0^{u_t}, \vec{\eta}_{ran,j,t}, 0^{z_t}) \mathbb{B}^*_t : t=1, \ldots, L) \quad \text{[Formula 136]}$$

As described above, for the basis B and the basis B* shown in Formula 110, Formula 111 is defined. Thus, Formula 136 denotes that coefficients of basis vectors of the basis $B^*_0$ and the basis $B^*_t$ (t=1, ..., L) are set as described below to generate the first randomizing element $k^*_{L,ran,j}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{ran,j,0}$ is set as a coefficient of a basis vector 1 of the basis $B^*_0$. 0 is set as a coefficient of each of basis vectors 1+1, ..., 1+$u_0$+1. $\eta_{ran,j,0,1}, \ldots, \eta_{ran,j,0,w0}$ (where w0 denotes $w_0$) are respectively set as coefficients of basis vectors 1+$u_0$+1+1, ..., 1+$u_0$+1+$w_0$. 0 is set as a coefficient of each of basis vectors 1+$u_0$+1+$w_0$+1, ..., 1+$u_0$+1+$w_0$+$z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, \ldots, b^*_{t,3}$.

$s_{ran,j,t} + \theta_{ran,j,t} v_{t,1}$ is set as a coefficient of a basis vector 1 of the basis $B^*_t$ (t=1, ..., L). $\theta_{ran,j,t} v_{t,2}, \ldots, \theta_{ran,j,t} v_{t,nt}$ (where nt denotes $n_t$) are respectively set as coefficients of basis vectors 2, ..., $n_t$. 0 is set as a coefficient of each of basis vectors $n_t$+1, ..., $n_t$+$u_t$. $\eta_{ran,j,t,1}, \ldots, \eta_{ran,j,t,wt}$ (where wt denotes $w_t$) are respectively set as coefficients of basis vectors $n_t$+$u_t$+1, ..., $n_t$+$u_t$+$w_t$. 0 is set as a coefficient of each of basis vectors $n_t$+$u_t$+$w_t$+1, ..., $n_t$+$u_t$+$w_t$+$z_t$.

(S205: Second Randomizing Element Generation Step)

Using the processing device, the randomizing element generation unit 143 generates a second randomizing element $k^*_{L,ran,(\tau,\iota)}$ which is an element of the decryption key $sk_L$, for each integer $\tau$ of $\tau$=L+1, ..., d and each integer $\iota$ of $\iota$=1, ..., $n_\tau$ with respect to each integer $\tau$, as shown in Formula 137.

$$k^*_{L,ran,(\tau,\iota)} := ((-s_{ran,(\tau,\iota),0}, 0^{u_0}, 0, \vec{\eta}_{ran,(\tau,\iota),0}, 0^{z_0}) \mathbb{B}^*_0,$$
$$(s_{ran,(\tau,\iota),t} \vec{e}_{t,1} + \theta_{ran,(\tau,\iota),t} \vec{v}_t, 0^{u_t}, \vec{\eta}_{ran,(\tau,\iota),t}, 0^{z_t})$$
$$\mathbb{B}^*_t : t=1, \ldots, L (s_{ran,(\tau,\iota),L+1} \vec{e}_{\tau,1}, 0^{u_\tau},$$
$$\vec{\eta}_{ran,(\tau,\iota),L+1}, 0^{z_\tau}) \mathbb{B}^*_\tau) \quad \text{[Formula 137]}$$

As described above, for the basis B and the basis B* shown in Formula 110, Formula 111 is defined. Thus, Formula 137 denotes that coefficients of basis vectors of the basis $B^*_0$, the basis $B^*_t$ (t=1, ..., L), and a basis $B^*_\tau$ are set as described below to generate the second randomizing element $k^*_{L,ran,(\tau,\iota)}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, ..., b^*_{0,3}$.

$-s_{ran,(\tau,\iota),0}$ is set as a coefficient of a basis vector 1 of the basis $B^*_0$. 0 is set as a coefficient of each of basis vectors 1+1, ..., $1+u_0+1$. $\eta_{ran,(\tau,\iota),0,1}, ..., \eta_{ran,(\tau,\iota),0,w0}$ (where w0 denotes $w_0$) are respectively set as coefficients of basis vectors $1+u_0+1+1, ..., 1+u_0+1+w_0$. 0 is set as a coefficient of each of basis vectors $1+u_0+1+w_0+1, ..., 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, ..., b^*_{t,3}$.

$s_{ran,(\tau,\iota),t}+\theta_{ran,(\tau,\iota),t}v_{t,1}$ is set as a coefficient of a basis vector 1 of the basis $B^*_t$ (t=1, ..., L). $\theta_{ran,(\tau,\iota),t}v_{t,2}, ..., \theta_{ran,(\tau,\iota),t}v_{t,nt}$ (where nt denotes $n_t$) are respectively set as coefficients of basis vectors 2, ..., $n_t$. 0 is set as a coefficient of each of basis vectors $n_t+1, ..., n_t+u_t$. $\eta_{ran,(\tau,\iota),t,1}, ..., \eta_{ran,(\tau,\iota),t,wt}$ (where wt denotes $w_t$) are respectively set as coefficients of basis vectors $n_t+u_t+1, ..., n_t+u_t+w_t$. 0 is set as a coefficient of each of basis vectors $n_t+u_t+w_t+1, ..., n_t+u_t+w_t+z_t$.

Next, description will be directed to the basis $B^*_\tau$. For simplicity of notation, a basis vector $b^*_{\tau,i}$ is identified using only the i portion. For example, a basis vector 1 denotes a basis vector $b^*_{\tau,1}$. Basis vectors 1, ..., 3 denote basis vectors $b^*_{\tau,1}, ..., b^*_{\tau,3}$.

$s_{ran,(\tau,\iota),L+1}$ is set as a coefficient of a basis vector 1 of the basis $B^*_\tau$. 0 is set as a coefficient of each of basis vectors 2, ..., $n_\tau, ... n_\tau+u_\tau$. $\eta_{ran,(\tau,\iota),L+1,1}, ..., \eta_{ran,(\tau,\iota),L+1,w\tau}$ (where w$\tau$ denotes $w_\tau$) are respectively set as coefficients of basis vectors $n_\tau+u_\tau+1, ..., n_\tau+u_\tau+w_\tau$. 0 is set as a coefficient of each of basis vectors $n_\tau+u_\tau+w_\tau+1, ..., n_\tau+u_\tau+w_\tau+z_\tau$.

(S206: Delegation Element Generation Step)

Using the processing device, the delegation element generation unit 144 generates a delegation element $k^*_{L,del,(\tau,\iota)}$ which is an element of the decryption key $sk_L$, for each integer $\tau$ of $\tau=L+1, ..., d$ and each integer $\iota$ of $\iota=1, ..., n_\tau$ with respect to each integer $\tau$, as shown in Formula 138.

$$k^*_{L,del,(\tau,\iota)} := ((-s_{del,(\tau,\iota),0}0^{u0}, 0, \vec{\eta}_{del,(\tau,\iota),0}, 0^{z0})\mathbb{B}^*_0,$$
$$(s_{del,(\tau,\iota),t}\vec{e}_{t,1}+\theta_{del,(\tau,\iota),t}\vec{v}_t 0^{ut}, \vec{\eta}_{del,(\tau,\iota),t}, 0^{zt})$$
$$\mathbb{B}^*_t : t=1, ..., L(s_{del,(\tau,\iota),L+1}\vec{e}_{\tau,1}+\psi \vec{e}_{\tau,\iota}, 0^{u\tau},$$
$$\vec{\eta}_{del,(\tau,\iota),L+1}, 0^{z\tau}\mathbb{B}^*_\tau)$$ [Formula 138]

As described above, for the basis B and the basis B* shown in Formula 110, Formula 111 is defined. Thus, Formula 138 denotes that coefficients of basis vectors of the basis $B^*_0$ and the basis $B^*_t$ (t=1, ..., L) are set as described below to generate the delegation element $k^*_{L,del,(\tau,\iota)}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, ..., b^*_{0,3}$.

$-s_{del,(\tau,\iota),0}$ is set as a coefficient of a basis vector 1 of the basis $B^*_0$. 0 is set as a coefficient of each of basis vectors 1+1, ..., $1+u_0+1$. $\eta_{del,(\tau,\iota),0,1}, ..., \eta_{del,(\tau,\iota),0,w0}$ (where w0 denotes $w_0$) are respectively set as coefficients of basis vectors $1+u_0+1+1, ..., 1+u_0+1+w_0$. 0 is set as a coefficient of each of basis vectors $1+u_0+1+w_0+1, ..., 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, ..., b^*_{t,3}$.

$s_{del,(\tau,\iota),t}+\theta_{del,(\tau,\iota),t}v_{t,1}$ is set as a coefficient of a basis vector 1 of the basis $B^*_t$ (t=1, ..., L). $\theta_{del,(\tau,\iota),t}v_{t,2}, ..., \theta_{del,(\tau,\iota),t}v_{t,nt}$ (where nt denotes $n_t$) are respectively set as coefficients of basis vectors 2, ..., $n_t$. 0 is set as a coefficient of each of basis vectors $n_t+1, ..., n_t+u_t$. $\eta_{del,(\tau,\iota),t,1}, ..., \eta_{del,(\tau,\iota),t,wt}$ (where wt denotes $w_t$) are respectively set as coefficients of basis vectors $n_t+u_t+1, ..., n_t+u_t+w_t$. 0 is set as a coefficient of each of basis vectors $n_t+u_t+w_t+1, ..., n_t+u_t+w_t+z_t$.

Next, description will be directed to the basis $B^*_\tau$. For simplicity of notation, a basis vector $b^*_{\tau,i}$ is identified using only the i portion. For example, a basis vector 1 denotes a basis vector $b^*_{\tau,1}$. Basis vectors 1, ..., 3 denote basis vectors $b^*_{\tau,1}, ..., b^*_{\tau,3}$.

$s_{del,(\tau,\iota),L+1}e_{\tau,1}+\psi e_{\tau,\iota}$ is set as a coefficient of each of basis vectors 1, ..., $n_\tau$ of the basis $B^*_\tau$. 0 is set as a coefficient of each of basis vectors $n_\tau+1, ..., n_\tau+u_\tau$. $\eta_{del,(\tau,\iota),L+1,1}, ..., \eta_{del,(\tau,\iota),L+1,w\tau}$ (where w$\tau$ denotes $w_\tau$) are respectively set as coefficients of basis vectors $n_\tau+u_\tau+1, ..., n_\tau+u_\tau+w_\tau$. 0 is set as a coefficient of each of basis vectors $n_\tau+u_\tau+w_\tau+1, ..., n_\tau+u_\tau+w_\tau+z_\tau$.

(S207: Key Distribution Step)

Using the communication device and through the network, for example, the key distribution unit 150 secretly provides to the decryption device 300 the decryption key $sk_L$ having elements of the decryption element $k^*_{L,dec}$, the first randomizing element $k^*_{L,ran,j}$ (j=1, ..., 2L), the second randomizing element $k^*_{L,ran,(\tau,\iota)}$ ($\tau=L+1, ..., d$; $(\tau,\iota)=(\tau,1), ..., (\tau,n_\tau)$), and the delegation element $k^*_{L,del,(\tau,\iota)}$ ($\tau=L+1, ..., d$; $(\tau,\iota)=(\tau,1), ..., (\tau,n_\tau)$). It is obvious that the decryption key $sk_L$ may be provided to the decryption device 300 by other methods.

To summarize, in (S201) to (S206), the key generation device 100 executes the KeyGen algorithm shown in Formulas 139 and 140, and generates the decryption key $sk_L$. Then, in (S207), the key generation device 100 provides the generated decryption key $sk_L$ to the decryption device 300.

$$KeyGen(pk, sk, (\vec{v}_1, ..., \vec{v}_L) := (v_{1,1}, ..., v_{1,n_1}), ..., \quad \text{[Formula 139]}$$
$$(v_{L,1}, ..., v_{L,n_L})):$$

for $j = 1, ..., 2L;$ $\tau = L+1, ..., d;$ $(\tau, l) = (\tau, 1), ..., (\tau, n_\tau);$ $\psi, s_{dec,t}, s_{ran,j,t} \xleftarrow{U} \mathbb{F}_q \; (t=1, ..., L);$ $\theta_{dec,t}, \theta_{ran,j,t} \xleftarrow{U} \mathbb{F}_q, \vec{\eta}_{dec,t}, \vec{\eta}_{ran,j,t} \xleftarrow{U} \mathbb{F}_q^{w_t} \; (t=0, ..., L);$ $s_{ran,(\tau,l),t}, s_{del,(\tau,l),t} \xleftarrow{U} \mathbb{F}_q \; (t=1, ..., L+1);$ $\theta_{ran,(\tau,l),t}, \theta_{del,(\tau,l),t} \xleftarrow{U} \mathbb{F}_q, \vec{\eta}_{ran,(\tau,l),t},$ $\vec{\eta}_{del,(\tau,l),t} \xleftarrow{U} \mathbb{F}_q^{w_t}, (t=0, ..., L+1);$ $s_{dec,0} := \sum_{t=1}^{L} s_{dec,t}, s_{ran,j,0} := \sum_{t=1}^{L} s_{ran,j,t},$ -continued $$s_{ran,(\tau,l),0} := \sum_{t=1}^{L+1} s_{ran,(\tau,l),t}, \quad s_{del,(\tau,l),0} := \sum_{t=1}^{L+1} s_{del,(\tau,l),t},$$

$$k^*_{L,dec} := ((-s_{dec,0}, 0^{u_0}, 1, \vec{\eta}_{dec,0}, 0^{z_0})_{\mathbb{B}^*_0},$$

$$(s_{dec,t}\vec{e}_{t,1} + \theta_{dec,t}\vec{v}_t, 0^{u_t}, \vec{\eta}_{dec,t}, 0^{z_t})_{\mathbb{B}^*_t} : t = 1, \ldots, L),$$  [Formula 140]

$$k^*_{L,ran,j} := ((-s_{ran,j,0}, 0^{u_0}, 0, \vec{\eta}_{ran,j,0}, 0^{z_0})_{\mathbb{B}^*_0},$$

$$(s_{ran,j,t}\vec{e}_{t,1} + \theta_{ran,j,t}\vec{v}_t, 0^{u_t}, \vec{\eta}_{ran,j,t}, 0^{z_t})_{\mathbb{B}^*_t} : t = 1, \ldots,$$

$$L),$$

$$k^*_{L,ran,(\tau,l)} := ((-s_{ran,(\tau,l),0}, 0^{u_0}, 0, \vec{\eta}_{ran,(\tau,l),0}, 0^{z_0})_{\mathbb{B}^*_0},$$

$$(s_{ran,(\tau,l),t}\vec{e}_{t,1} + \theta_{ran,(\tau,l),t}\vec{v}_t, 0^{u_t}, \vec{\eta}_{ran,(\tau,l),t}, 0^{z_t})_{\mathbb{B}^*_t} : t =$$

$$1, \ldots, L(s_{ran,(\tau,l),L+1}\vec{e}_{\tau,1}, \vec{\eta}_{ran,(\tau,l),L+1}, 0^{z_\tau})_{\mathbb{B}^*_\tau}),$$

$$k^*_{L,del,(\tau,l)} := ((-s_{del,(\tau,l),0}, 0^{u_0}, 0, \vec{\eta}_{del,(\tau,l),0}, 0^{z_0})_{\mathbb{B}^*_0},$$

$$(s_{del,(\tau,l),t}\vec{e}_{t,1} + \theta_{del,(\tau,l),t}\vec{v}_t, 0^{u_t}, \vec{\eta}_{del,(\tau,l),t}, 0^{z_t})_{\mathbb{B}^*_t} : t =$$

$$1, \ldots,$$

$$L(s_{del,(\tau,l),L+1}\vec{e}_{\tau,1} + \psi\vec{e}_{\tau,l}, 0^{u_\tau}, \vec{\eta}_{del,(\tau,l),L+1}, 0^{z_\tau})_{\mathbb{B}^*_\tau}),$$

$$sk_L := (k^*_{L,dec}, \{k^*_{L,ran,j}\}_{j=1,\ldots,2L},$$

$$\{k^*_{L,ran,(\tau,l)}\}_{\tau=L+1,\ldots,d;(\tau,l)=(\tau,1),\ldots,(\tau,n_\tau)},$$

$$\{k^*_{L,del,(\tau,l)}\}_{\tau=L+1,\ldots,d;(\tau,l)=(\tau,l),\ldots,(\tau,n_\tau)}),$$

return $sk_L$.

The functions and operations of the encryption device 200 will be described.

As shown in FIG. 9, the encryption device 200 includes a master public key acquisition unit 210, an information input unit 220 (second information input unit), a ciphertext generation unit 230, and a data transmission unit 240.

The information input unit 220 includes an attribute information input unit 221 and a message input unit 222. The ciphertext generation unit 230 includes a random number generation unit 231, a ciphertext c1 generation unit 232, and a ciphertext c2 generation unit 233.

Referring to FIG. 14, the process of the Enc algorithm executed by the encryption device 200 will be described.

(S301: Master Public Key Acquisition Step)

Using the communication device and through the network, for example, the master public key acquisition unit 210 obtains the master public key pk generated by the key generation device 100.

(S302: Information Input Step)

Using the input device, the attribute information input unit 221 inputs attribute information $(x_1, \ldots, x_L) := ((x_{1,i} (i=1, \ldots, n_1)), \ldots, (x_{L,i} (i=1, \ldots, n_L)))$. As attribute information, an attribute of a person who can decrypt an encrypted message is input.

Using the input device, the message input unit 222 inputs a message m to be encrypted.

(S303: Random Number Generation Step)

Using the processing device, the random number generation unit 231 generates random numbers $(x^\wedge_{L+1}, \ldots, x_d) := ((x_{L+1,i} (i=1, \ldots, n_{L+1})), \ldots, (x_{d,i} (i=1, \ldots, n_d)))$ and random numbers $\omega, \zeta, \phi_t (t=0, \ldots, d)$, as shown in Formula 141.

$$(\vec{x}_{L+1}, \ldots, \vec{x}_d) :=$$

$$((x_{L+1,1}, \ldots, x_{L+1,n_{L+1}}), \ldots, (x_{d,1}, \ldots, x_{d,n_d})) \xleftarrow{U}$$

$$\mathbb{F}_q^{n_{L+1}} \times \ldots \times \mathbb{F}_q^{n_d},$$

$$\omega, \zeta \xleftarrow{U} \mathbb{F}_q,$$

$$\vec{\varphi}_t := (\varphi_{t,1}, \ldots, \varphi_{t,z_t}) \xleftarrow{U} \mathbb{F}_q^{z_t} (t = 0, \ldots, d)$$  [Formula 141]

(S304: Ciphertext c1 Generation Step)

Using the processing device, the ciphertext c1 generation unit 232 generates a ciphertext $c_1$ which is an element of a ciphertext ct, as shown in Formula 142.

$$c_1 := ((\omega, 0^{u_0}, \zeta, 0^{w_0}, \vec{\phi}_0)_{\mathbb{B}^*_0}, (\omega\vec{x}_t, 0^{u_t},$$

$$0^{w_t}, \vec{\phi}_t)_{\mathbb{B}^*_t} : t=1, \ldots, d)$$  [Formula 142]

As described above, for the basis B and the basis B* shown in Formula 110, Formula 111 is defined. Thus, Formula 142 denotes that coefficients of basis vectors of the basis $B_0$ and the basis $B_t$ (t=1, . . . , d) are set as described below to generate the ciphertext $c_1$.

First, description will be directed to the basis $B_0$. For simplicity of notation, a basis vector $b_{0,i}$ is identified using only the i portion. For example, a basis vector 1 denotes a basis vector $b_{0,1}$. Basis vectors 1, . . . , 3 denote basis vectors $b_{0,1}, \ldots, b_{0,3}$.

$\omega$ is set as a coefficient of a basis vector 1 of the basis $B_0$. 0 is set as a coefficient of each of basis vectors $1+1, \ldots, 1+u_0$. $\zeta$ is set as a coefficient of a basis vector $1+u_0+1$. 0 is set as a coefficient of each of basis vectors $1+u_0+1+1, \ldots, 1+u_0+1+w_0$. $\phi_{0,1}, \ldots, \phi_{0,z0}$ (where z0 denotes $z_0$) are respectively set as coefficients of basis vectors $1+u_0+1+w_0+1, \ldots, 1+u_0+1+w_0+z_0$.

Next, description will be directed to the basis $B_t$ (t=1, . . . , d). For simplicity of notation, a basis vector $b_{t,i}$ is identified using only the i portion. For example, a basis vector 1 denotes a basis vector $b_{t,1}$. Basis vectors 1, . . . , 3 denote basis vectors $b_{t,1}, \ldots, b_{t,3}$.

$\omega x_{t,1}, \ldots, \omega x_{t,nt}$ (where nt denotes $n_t$) are respectively set as coefficients of basis vectors 1, . . . , $n_t$ of the basis $B_t$ (t=1, . . . , d). 0 is set as a coefficient of each of basis vectors $n_t+1, \ldots, n_t+u_t+w_t$. $\phi_{t,1}, \ldots, \phi_{t,zt}$ (where zt denotes $z_t$) are respectively set as coefficients of basis vectors $n_t+u_t+w_t+1, \ldots, n_t+u_t+w_t+z_t$.

(S305: Ciphertext c2 Generation Step)

Using the processing device, the ciphertext c2 generation unit 233 generates a ciphertext $c_2$ which is an element of the ciphertext ct, as shown in Formula 143.

$$c_2 := g_T^\zeta m$$  [Formula 143]

(S306: Data Transmission Step)

Using the communication device and through the network, for example, the data transmission unit 240 transmits to the decryption device 300 the ciphertext ct including the ciphertext $c_1$ and the ciphertext $c_2$. It is obvious that the ciphertext ct may be transmitted to the decryption device 300 by other methods.

To summarize, in (S301) to (S305), the encryption device 200 executes the Enc algorithm shown in Formula 144, and generates the ciphertext ct. Then, in (S306), the encryption device 200 transmits the generated ciphertext ct to the decryption device 300.

$$Enc\left(pk, m \in \mathbb{G}_T, (\vec{x}_1, \ldots, \vec{x}_L)\right) := \quad \text{[Formula 144]}$$

$$((x_{1,1}, \ldots, x_{1,n_1}), \ldots, (x_{L,1}, \ldots, x_{L,n_L})):$$

$$(\vec{x}_{L+1}, \ldots, \vec{x}_d) \xleftarrow{U} \mathbb{F}_q^{n_{L+1}} \times \ldots \times \mathbb{F}_q^{n_d};$$

$$\omega, \zeta \xleftarrow{U} \mathbb{F}_q, \vec{\varphi}_t \xleftarrow{U} \mathbb{F}_q^{z_t} (t = 0, \ldots, d),$$

$$c_1 := \left((\omega, 0^{u_0}, \zeta, 0^{w_0}, \vec{\varphi}_0)_{\mathbb{B}_0},\right.$$

$$\left. (\omega \vec{x}_t, 0^{u_t}, 0^{w_t}, \vec{\varphi}_t)_{\mathbb{B}_t} : t = 1, \ldots, d\right),$$

$$c_2 := g_T^\zeta m,$$

$$ct := (c_1, c_2),$$

return $ct$.

The functions and operations of the decryption device 300 will be described.

As shown in FIG. 10, the decryption device 300 includes a decryption key acquisition unit 310, a data receiving unit 320, a pairing operation unit 330, and a message computation unit 340.

Referring to FIG. 15, the process of the Dec algorithm executed by the decryption device 300 will be described.

(S401: Decryption Key Acquisition Step)

Using the communication device and through the network, for example, the decryption key acquisition unit 310 obtains the decryption key $sk_L$. The decryption key acquisition unit 310 also obtains the master public key pk generated by the key generation device 100.

(S402: Data Receiving Step)

Using the communication device and through the network, for example, the data receiving unit 320 receives the ciphertext ct transmitted by the encryption device 200.

(S403: Pairing Operation Step)

Using the processing device, the pairing operation unit 330 performs a pairing operation shown in Formula 145, and computes a session key $K = g_T^\zeta$.

$$K := e(c_1, k^*_{L,dec}) \quad \text{[Formula 145]}$$

If the inner product of $(v_1, \ldots, v_L)$ and $(x_1, \ldots, x_L)$ is 0, the session key K is computed by computing Formula 145.

(S404: Message Computation Step)

Using the processing device, the message computation unit 340 computes a message m'(=m) by dividing the ciphertext c2 by the session key K.

To summarize, in (S401) to (S404), the decryption device 300 executes the Dec algorithm shown in Formula 146, and computes the message m' (=m).

$$Dec(pk, k^*_{L,dec}, ct) : m' := c_2/e(c_1, k^*_{L,dec}) \text{ return } m'. \quad \text{[Formula 146]}$$

The functions and operations of the key delegation device 400 will be described.

As shown in FIG. 11, the key delegation device 400 includes a decryption key acquisition unit 410, an information input unit 420 (third information input unit), a delegation key generation unit 430, and a key distribution unit 440 (delegation key transmission unit).

The delegation key generation unit 430 includes a random number generation unit 431, a lower-level decryption element generation unit 432, a lower-level randomizing element generation unit 433, and a lower-level delegation element generation unit 434.

Referring to FIG. 16, the process of the Delegate$_L$ algorithm executed by the key delegation device 400 will be described.

(S501: Decryption Key Acquisition Step)

Using the communication device and through the network, for example, the decryption key acquisition unit 410 obtains the decryption key $sk_L$. The decryption key acquisition unit 410 also obtains the master public key pk generated by the key generation device 100.

(S502: Information Input Step)

Using the input device, the information input unit 420 inputs predicate information $v_{L+1} = (v_{L+1,i} (i=1, \ldots, n_{L+1}))$. As predicate information, an attribute of a person to whom the key is delegated is input.

(S503: Random Number Generation Step)

Using the processing device, the random number generation unit 431 generates random numbers $\alpha_{dec,j}$, $\sigma_{dec}$, $\alpha_{ran,j',j}$, $\sigma_{ran,j'}$, $\alpha_{ran,(\tau,\iota)}$, $\sigma_{ran,(\tau,\iota)}$, $\phi_{ran,(\tau,\iota)}$, $\alpha_{del,(\tau,\iota),j}$, $\sigma_{del,(\tau,\iota)}$, $\phi_{del,(\tau,\iota)}$, $\psi'$, $\eta_{dec,(t,i)}$, $\eta_{ran,j',(t,i)}$, $\eta_{ran,(\tau,\iota,(t,i))}$, $\eta_{del,(\tau,\iota),(t,i)}$ for each integer j, j', τ, ι, t, i of j=1, ..., 2L, j'=1, ..., 2(L+1), τ=L+2, ..., d, (τ,ι)=(τ,1), ..., (τ,n$_\tau$), t=0, ..., L+1, τ, (t,i)=(t,1), ..., (t,n$_t$), as shown in Formula 147.

for [Formula 147]

$$j = 1, \ldots, 2L;$$

$$j' = 1, \ldots, 2(L+1);$$

$$\tau = L + 2, \ldots, d;$$

$$(\tau, l) = (\tau, 1), \ldots, (\tau, n_\tau);$$

$$t = 0, \ldots, L+1, \tau;$$

$$(t, i) = (t, 1), \ldots, (t, w_t);$$

$$\alpha_{dec,j}, \sigma_{dec}, \alpha_{ran,j',j}, \sigma_{ran,j'}, \alpha_{ran,(\tau,l),j}, \sigma_{ran,(\tau,l)},$$

$$\phi_{ran,(\tau,l)}, \alpha_{del,(\tau,l),j}, \sigma_{del,(\tau,l)}, \phi_{del,(\tau,l)}, \psi',$$

$$\eta_{dec,(t,i)}, \eta_{ran,j',(t,i)}, \eta_{ran,(\tau,l),(t,i)}, \eta_{del,(\tau,l),(t,i)} \xleftarrow{U} \mathbb{F}_q$$

(S504: Lower-Level Decryption Element Generation Step)

Using the processing device, the lower-level decryption element generation unit 432 generates a lower-level decryption element $k^*_{L+1,dec}$ which is an element of a delegation key $sk_{L+1}$, as shown in Formula 148.

$$k^*_{L+1,dec} := \quad \text{[Formula 148]}$$

$$k^*_{L,dec} + \sum_{j=1}^{2L} \alpha_{dec,j} k^*_{L,ran,j} + \sigma_{dec} \left( \sum_{i=1}^{n_{L+1}} v_{L+1,i} k^*_{L,del,(L+1,i)} \right) +$$

$$\sum_{i=1}^{w_i} \eta_{dec,(0,i)} b^*_{0,1+u_0+1+i} + \sum_{t=1}^{L+1} \sum_{i=1}^{w_t} \eta_{dec,(t,i)} b^*_{t,n_t+u_t+i}$$

(S505: First Lower-Level Randomizing Element Generation Step)

Using the processing device, the lower-level randomizing element generation unit 433 generates a first lower-level randomizing element $k^*_{L+1,ran,j'}$ which is an element of the delegation key $sk_{L+1}$, for each integer j' of j'=1, ..., 2(L+1), as shown in Formula 149.

$$k^*_{L+1,ran,j'} := \qquad\qquad [\text{Formula 149}]$$

$$\sum_{j=1}^{2L} \alpha_{ran,j',j} k^*_{L,ran,j} + \sigma_{ran,j'}\left(\sum_{i=1}^{n_{L+1}} v_{L+1,i} k^*_{L,del,(L+1,i)}\right) +$$

$$\sum_{i=1}^{w_t} \eta_{ran,j',(0,i)} b^*_{0,1+u_0+1+i} + \sum_{t=1}^{L+1}\sum_{i=1}^{w_t} \eta_{ran,j',(t,i)} b^*_{t,n_t+u_t+i}$$

(S506: Second Lower-Level Randomizing Element Generation Step)

Using the processing device, the lower-level randomizing element generation unit 433 generates a second lower-level randomizing element $k^*_{L+1,ran,(\tau,\iota)}$ which is an element of the delegation key $sk_{L+1}$, for each integer $\tau$ of $\tau = L+2, \ldots, d$ and each integer $\iota$ of $\iota = 1, \ldots, n_\tau$ with respect to each integer $\tau$, as shown in Formula 150.

$$k^*_{L+1,ran,(\tau,l)} := \qquad\qquad [\text{Formula 150}]$$

$$\sum_{j=1}^{2L} \alpha_{ran,(\tau,l),j} k^*_{L,ran,j} + \sigma_{ran,(\tau,l)}\left(\sum_{i=1}^{n_{L+1}} v_{L+1,i} k^*_{L,del,(L+1,i)}\right) +$$

$$\phi_{ran,(\tau,l)} k^*_{L,ran,(\tau,l)} + \sum_{i=1}^{w_t} \eta_{ran,(\tau,l),(0,i)} b^*_{0,1+u_0+1+i} +$$

$$\sum_{t=1}^{L+1}\sum_{i=1}^{w_t} \eta_{ran,(\tau,l),(t,i)} b^*_{t,n_t+u_t+i} + \sum_{i=1}^{w_\tau} \eta_{ran,(\tau,l),(\tau,i)} b^*_{\tau,n_\tau+u_\tau+i}$$

(S507: Lower-Level Delegation Element Generation Step)

Using the processing device, the lower-level delegation element generation unit 434 generates a lower-level delegation element $k^*_{L+1,del,(\tau,\iota)}$ which is an element of the delegation key $sk_{L+1}$, for each integer $\tau$ of $\tau = L+2, \ldots, d$ and each integer $\iota$ of $\iota = 1, \ldots, n_\tau$ with respect to each integer $\tau$, as shown in Formula 151.

$$k^*_{L+1,del,(\tau,l)} := \sum_{j=1}^{2L} \alpha_{del,(\tau,l),j} k^*_{L,ran,j} + \qquad [\text{Formula 151}]$$

$$\sigma_{del,(\tau,l)}\left(\sum_{i=1}^{n_{L+1}} v_{L+1,i} k^*_{L,del,(L+1,i)}\right) + \psi' k^*_{L,del,(\tau,i)} +$$

$$\phi_{del,(\tau,l)} k^*_{L,ran,(\tau,l)} + \sum_{i=1}^{w_t} \eta_{del,(\tau,i),(0,i)} b^*_{0,1+u_0+1+i} +$$

$$\sum_{t=1}^{L+1}\sum_{i=1}^{w_t} \eta_{del,(\tau,l),(t,i)} b^*_{t,n_t+u_t+i} + \sum_{i=1}^{w_\tau} \eta_{del,(\tau,l),(\tau,i)} b^*_{\tau,n_\tau+u_\tau+i},$$

(S508: Key Distribution Step)

Using the communication device and through the network, for example, the key distribution unit 150 secretly provides to the lower-level decryption device 300 the delegation key $sk_{L+1}$ (lower-level decryption key) having elements of the lower-level decryption element $k^*_{L+1,dec}$, the first lower-level randomizing element $k^*_{L+1,ran,j'}$ ($j' = 1, \ldots, 2(L+1)$), the second lower-level randomizing element $k^*_{L+1,ran,(\tau,\iota)}$ ($\tau = L+2, \ldots, d$; $(\tau,\iota) = (\tau,1), \ldots, (\tau,n_\tau)$), and the lower-level delegation element $k^*_{L+1,del,(\tau,\iota)}$ ($\tau = L+2, \ldots, d$; $(\tau,\iota) = (\tau,1), \ldots, (\tau,n_\tau)$). It is obvious that the delegation key $sk_{L+1}$ may be provided to the lower-level decryption device 300 by other methods.

To summarize, in (S501) to (S507), the key delegation device 400 executes the $\text{Delegate}_L$ algorithm shown in Formulas 152 and 153, and generates the delegation key $sk_{L+1}$. Then, in (S508), the key delegation device 400 provides the generated delegation key $sk_{L+1}$ to the lower-level decryption device 300.

$$\text{Delegate}_L(pk, sk_L, \vec{v}_{L+1} := (v_{L+1,1}, \ldots, v_{L+1,n_{L+1}})): \quad [\text{Formula 152}]$$

for
$j = 1, \ldots, 2L;$
$j' = 1, \ldots, 2(L+1);$
$\tau = L+2, \ldots, d;$
$(\tau, l) = (\tau, l), \ldots, (\tau, n_\tau);$
$t = 0, \ldots, L+1, \tau;$ $(t, i) = (t, 1), \ldots, (t, w_t);$ $\alpha_{dec,j}, \sigma_{dec}, \alpha_{ran,j',j}, \sigma_{ran,j'}, \alpha_{ran,(\tau,l),j}, \sigma_{ran,(\tau,l)},$ $\phi_{ran,(\tau,l)}, \alpha_{del,(\tau,l),j}, \sigma_{del,(\tau,l)}, \phi_{del,(\tau,l)}, \psi',$ $\eta_{dec,(l,i)}, \eta_{ran,j',(t,i)}, \eta_{ran,(\tau,l),(t,i)}, \eta_{del,(\tau,l),(t,i)} \xleftarrow{U} \mathbb{F}_q,$ $$k^*_{L+1,dec} := \qquad\qquad [\text{Formula 153}]$$

$$k^*_{L,dec} + \sum_{j=1}^{2L} \alpha_{dec,j} k^*_{L,ran,j} + \sigma_{dec}\left(\sum_{i=1}^{n_{L+1}} v_{L+1,i} k^*_{L,del,(L+1,i)}\right) +$$

$$\sum_{i=1}^{w_t} \eta_{dec,(0,i)} b^*_{0,1+u_0+1+i} + \sum_{t=1}^{L+1}\sum_{i=1}^{w_t} \eta_{dec,(t,i)} b^*_{t,n_t+u_t+i},$$

$$k^*_{L+1,ran,j'} :=$$

$$\sum_{j=1}^{2L} \alpha_{ran,j',j} k^*_{L,ran,j} + \sigma_{ran,j'}\left(\sum_{i=1}^{n_{L+1}} v_{L+1,i} k^*_{L,del,(L+1,i)}\right) +$$

$$\sum_{i=1}^{w_t} \eta_{ran,j',(0,i)} b^*_{0,1+u_0+1+i} + \sum_{t=1}^{L+1}\sum_{i=1}^{w_t} \eta_{ran,j',(t,i)} b^*_{t,n_t+u_t+i},$$

$$k^*_{L+1,ran,(\tau,l)} :=$$

$$\sum_{j=1}^{2L} \alpha_{ran,(\tau,l),j} k^*_{L,ran,j} + \sigma_{ran,(\tau,l)}\left(\sum_{i=1}^{n_{L+1}} v_{L+1,i} k^*_{L,del,(L+1,i)}\right) +$$

$$\phi_{ran,(\tau,l)} k^*_{L,ran,(\tau,l)} + \sum_{i=1}^{w_t} \eta_{ran,(\tau,l),(0,i)} b^*_{0,1+u_0+1+i} +$$

$$\sum_{t=1}^{L+1}\sum_{i=1}^{w_t} \eta_{ran,(\tau,l),(t,i)} b^*_{t,n_t+u_t+i} + \sum_{i=1}^{w_\tau} \eta_{ran,(\tau,l),(\tau,i)} b^*_{\tau,n_\tau+u_\tau+i},$$

$$k^*_{L+1,del,(\tau,l)} := \sum_{j=1}^{2L} \alpha_{del,(\tau,l),j} k^*_{L,ran,j} +$$

$$\sigma_{del,(\tau,l)}\left(\sum_{i=1}^{n_{L+1}} v_{L+1,i} k^*_{L,del,(L+1,i)}\right) + \psi' k^*_{L,del,(\tau,l)} +$$

$$\phi_{del,(\tau,l)} k^*_{L,ran,(\tau,l)} + \sum_{i=1}^{w_t} \eta_{del,(\tau,l),(0,i)} b^*_{0,1+u_0+1+i} +$$

$$\sum_{t=1}^{L+1}\sum_{i=1}^{w_t} \eta_{del,(\tau,l),(t,i)} b^*_{t,n_t+u_t+i} + \sum_{i=1}^{w_\tau} \eta_{del,(\tau,l),(\tau,i)} b^*_{\tau,n_\tau+u_\tau+i},$$

$sk_{L+1} := (k^*_{L+1,dec}, \{k^*_{L+1,ran,j'}\}_{j'=1,\ldots,2(L+1)},$ $\{k^*_{L+1,ran,(\tau,l)}, k^*_{L+1,del,(\tau,l)}\}_{\tau=L+2,\ldots,d;(\tau,t)=(\tau,1),\ldots,(\tau,n_\tau)}),$ return $sk_{L+1}$ When the lower-level decryption device 300 executes the Dec algorithm using the delegation key $sk_{L+1}$, the session key K is computed in (S403) of FIG. 15 by computing Formula 145 if the inner product of $(v_1, \ldots, v_{L+1})$ and $(x_1, \ldots, x_{L+1})$ is 0.

As described above, the cryptographic processing system 10 according to the first embodiment implements the HPE scheme for inner products of d levels using the (d+1) number of $N_t$ (t=0, ..., d)-dimensional spaces. Spaces required for the cryptographic processes at the L-th level (1≤L≤d) are the (L+1) number of $N_t$ (t=0, ..., L)-dimensional spaces. Thus, key sizes can be made small, and efficiency of operations and so on can be enhanced. Memory and register areas and so on for storing keys are also made small.

In the above description, dimensions $u_t$, $w_t$, and $z_t$ (t=0, ..., d) are provided for enhanced security. Therefore, at the cost of reduced security, dimensions $u_t$, $w_t$, and $z_t$ (t=0, ..., d) may be omitted by setting $u_t$, $w_t$, and $z_t$ (t=0, ..., d) respectively to 0.

In the above description, $1+u_0+1+w_0+z_0$ is set in $N_0$, and $n_t+u_t+w_t+z_t$ is set in $N_t$. However, $1+u_0+1+w_0+z_0$ may be replaced with $1+1+1+1+1$ so that 5 is set in $N_0$, and $n_t+u_t+w_t+z_t$ may be replaced with $n_t+n_t+n_t+1$ so that $3n_t+1$ is set in $N_t$.

In this case, the Setup algorithm shown in Formula 132 is rewritten as shown in Formula 154. $G_{ob}$ is rewritten as shown in Formula 155.

$\mathrm{Setup}(1^\lambda, \vec{n} := (d; n_1, \ldots, n_d))$: [Formula 154]

$$(param_{\vec{n}}, \{\mathbb{B}_t, \mathbb{B}_t^*\}_{t=0,\ldots,d}) \xleftarrow{R} \mathcal{G}_{ob}(1^\lambda, \vec{n}),$$

$\hat{\mathbb{B}}_0 := (b_{0,1}, b_{0,3}, b_{0,5}), \hat{\mathbb{B}}_t := (b_{t,1}, \ldots, b_{t,n_t}, b_{t,3n_t+1})$
for
$t = 1, \ldots, d$,
$\hat{\mathbb{B}}_0^* := (b_{0,1}^*, b_{0,3}^*), \hat{\mathbb{B}}_t^* := (b_{t,1}^*, \ldots, b_{t,n_t}^*)$
for
$t = 1, \ldots, d$, $pk := (1^\lambda, param_{\vec{n}}, \{\hat{\mathbb{B}}_t\}_{t=0,\ldots,d},$ $b_{0,4}^*, \{b_{t,2n_t+1}^*, \ldots, b_{t,3n_t}^*\}_{t=1,\ldots,d}),$ $sk := \{\hat{\mathbb{B}}_t^*\}_{t=0,\ldots,d},$
return $pk, sk$.

$\mathcal{G}_{ob}(1^\lambda, \vec{n} := (d; n_1, \ldots, n_d))$: [Formula 155]

$N_0 := 5, N_t := 3n_t + 1 \ (t = 1, \ldots, d),$ $param_\mathbb{G} := (q, \mathbb{G}, \mathbb{G}_T, g, e) \xleftarrow{R} \mathcal{G}_{bpg}(1^\lambda),$ $\psi \xleftarrow{U} \mathbb{F}_q^\times,$ For $t = 0, \ldots, d$, $param_{\mathbb{V}_t} := (q, \mathbb{V}_t, \mathbb{G}_T, \mathbb{A}_t, e) := \mathbb{G}_{dpvs}(1^\lambda, N_t, param_\mathbb{G}),$ $X_t := (\chi_{t,i,j})_{i,j} \xleftarrow{U} GL(N_t, \mathbb{F}_q), (v_{t,i,j})_{i,j} := \psi \cdot (X_t^T)^{-1},$ $b_{t,i} := (\chi_{t,i,1}, \ldots, \chi_{t,i,N_t})_{\mathbb{A}_t} = \sum_{j=1}^{N_t} \chi_{t,i,j} a_{t,j},$ $\mathbb{B}_t := (b_{t,1}, \ldots, b_{t,N_t}),$ $b_{t,i}^* := (v_{t,i,1}, \ldots, v_{t,i,N_t})_{\mathbb{A}_t} = \sum_{j=1}^{N_t} v_{t,i,j} a_{t,j},$ $\mathbb{B}_t^* := (b_{t,1}^*, \ldots, b_{t,N_t}^*),$ $g_T := e(g, g)^\psi, param_{\vec{n}} := (\{param_{\mathbb{V}_t}\}_{t=1,\ldots,d}, g_T)$ return $(param_{\vec{n}}, \{\mathbb{B}_t, \mathbb{B}_t^*\}_{t=0,\ldots,d}).$ The KeyGen algorithm shown in Formulas 139 and 140 is rewritten as shown in Formulas 156 and 157.

$KeyGen(pk, sk, (\vec{v}_1, \ldots, \vec{v}_L) := (v_{1,1}, \ldots, v_{1,n_1}), \ldots,$ [Formula 156]

$(v_{L,1}, \ldots, v_{L,n_L})):$ for
$j = 1, \ldots, 2L;$
$\tau = L + 1, \ldots, d;$
$(\tau, l) = (\tau, 1), \ldots, (\tau, n_\tau);$
$\psi, s_{dec,t}, s_{ran,j,t} \xleftarrow{U} \mathbb{F}_q \ (t = 1, \ldots, L);$ $\theta_{dec,t}, \theta_{ran,j,t} \xleftarrow{U} \mathbb{F}_q, \vec{\eta}_{dec,t}, \vec{\eta}_{ran,j,t} \xleftarrow{U} \mathbb{F}_q^{n_t} \ (t = 0, \ldots, L);$ $s_{ran,(\tau,l),t}, s_{del,(\tau,l),t} \xleftarrow{U} \mathbb{F}_q (t = 1, \ldots, L+1);$ $\theta_{ran,(\tau,l),t}, \theta_{del,(\tau,l),t} \xleftarrow{U} \mathbb{F}_q, \vec{\eta}_{ran,(\tau,l),t},$
$\vec{\eta}_{del,(\tau,l),t} \xleftarrow{U} \mathbb{F}_q^{n_t}, (t = 0, \ldots, L+1);$ $s_{dec,0} := \sum_{t=1}^{L} s_{dec,t}, s_{ran,j,0} := \sum_{t=1}^{L} s_{ran,j,t},$ $s_{ran,(\tau,l),0} := \sum_{t=1}^{L+1} s_{ran,(\tau,l),t}, s_{del,(\tau,l),0} := \sum_{t=1}^{L+1} s_{del,(\tau,l),t},$ $k_{L,dec}^* := ((-s_{dec,0}, 0, 1, \eta_{dec,0}, 0)_{\mathbb{B}_0^*},$ [Formula 157]

$(s_{dec,t}\vec{e}_{t,1} + \theta_{dec,t}\vec{v}_t, 0^{n_t}, \vec{\eta}_{dec,t}, 0)_{\mathbb{B}_t^*} := 1, \ldots, L),$ $k_{L,ran,j}^* := ((-s_{ran,j,0}, 0, 0, \eta_{ran,j,0}, 0)_{\mathbb{B}_0^*},$ $(s_{ran,t}\vec{e}_{t,1} + \theta_{ran,j,t}\vec{v}_t, 0^{n_t}, \vec{\eta}_{ran,j,t}, 0)_{\mathbb{B}_t^*} : t = 1, \ldots, L),$ $k_{L,ran,(\tau,l)}^* := ((-s_{ran,(\tau,l),0}0, 0, \eta_{ran,(\tau,l),0}, 0)_{\mathbb{B}_0^*},$ $(s_{ran,(\tau,l),t}\vec{e}_{t,1} + \theta_{ran,(\tau,l),t}\vec{v}_t, 0^{n_t}, \vec{\eta}_{ran,(\tau,l),t}, 0)_{\mathbb{B}_t^*} : t =$ $1, \ldots, L(s_{ran,(\tau,l),L+1}\vec{e}_{\tau,1}, 0^{n_\tau}, \vec{\eta}_{ran,(\tau,l),L+1}, 0)_{\mathbb{B}_\tau^*}),$ $k_{L,del,(\tau,l)}^* := ((-s_{del,(\tau,l),0}, 0, 0, \eta_{del,(\tau,l),0}, 0)_{\mathbb{B}_0^*},$ $(s_{del,(\tau,l),t}\vec{e}_{t,1} + \theta_{del,(\tau,l),t}\vec{v}_t, 0^{n_t}, \vec{\eta}_{del,(\tau,l),t}, 0)_{\mathbb{B}_t^*} : t =$ $1, \ldots,$ $L(s_{del,(\tau,l),L+1}\vec{e}_{\tau,1} + \psi\vec{e}_{\tau,l}, 0^{n_\tau}, \vec{\eta}_{del,(\tau,l),L+1}, 0)_{\mathbb{B}_\tau^*}),$ $sk_L := (k_{L,dec}^*, \{k_{L,ran,j}^*\}_{j=1,\ldots,2L},$ $\{k_{L,ran,(\tau,l)}^*\}_{\tau=L+1,\ldots,d;(\tau,l)=(\tau,1),\ldots,(\tau,n_\tau)},$ $\{k_{L,del,(\tau,l)}^*\}_{\tau=L+1,\ldots,d;(\tau,l)=(\tau,1),\ldots,(\tau,n_\tau)}),$ return $sk_L$.

The Enc algorithm shown in Formula 144 is rewritten as shown in Formula 158.

$$Enc(pk, m \in \mathbb{G}_T, (\vec{x}_1, \ldots, \vec{x}_L)) := \qquad [\text{Formula 158}]$$

$$((x_{1,1}, \ldots, x_{1,n_1}), \ldots, (x_{L,1}, \ldots, x_{L,n_L})):$$

$$(\vec{x}_{L+1}, \ldots, \vec{x}_d) \xleftarrow{U} \mathbb{F}_q^{n_{L+1}} \times \ldots \times \mathbb{F}_q^{n_d};$$

$$\omega, \zeta, \varphi_0, \ldots, \varphi_d \xleftarrow{U} \mathbb{F}_q,$$

$$c_1 := ((\omega, 0, \zeta, 0, \varphi_0)_{\mathbb{B}_0},$$

$$(\omega \vec{x}_t, 0^{n_t}, 0^{n_t}, \varphi_t)_{\mathbb{B}_t} : t = 1, \ldots, d),$$

$$c_2 := g_T^\zeta m,$$

$$ct := (c_1, c_2),$$

return $ct$.

The Delegate$_L$ algorithm shown in Formulas 152 and 153 is rewritten as shown in Formulas 159 and 160.

$$Delegate_L(pk, sk_L, \vec{v}_{L+1} := (v_{L+1,1}, \ldots, v_{L+1,n_{L+1}})): \quad [\text{Formula 159}]$$

for
$j = 1, \ldots, 2L;$
$j' = 1, \ldots 2(L+1);$
$\tau = L+2, \ldots, d;$
$(\tau, l) = (\tau, 1), \ldots, (\tau, n_\tau);$
$t = 0, \ldots, L+1, \tau;$
$(t, i) = (t, 1), \ldots, (t, n_t);$
$\alpha_{dec,j}, \sigma_{dec}, \alpha_{ran,j',j}, \sigma_{ran,j'}, \alpha_{ran,(\tau,l),j}, \sigma_{ran,(\tau,l)},$
$\phi_{ran,(\tau,l)}, \alpha_{del,(\tau,l),j}, \sigma_{del,(\tau,l)}, \phi_{del,(\tau,l)}, \psi',$
$\eta_{dec,(t,i)}, \eta_{ran,j',(t,i)}, \eta_{ran,(\tau,l),(t,i)}, \eta_{del,(\tau,l),(t,i)} \xleftarrow{U} \mathbb{F}_q,$ $$k^*_{L+1,dec} := \qquad [\text{Formula 160}]$$

$$k^*_{L,dec} + \sum_{j=1}^{2L} \alpha_{dec,j} k^*_{L,ran,j} + \sigma_{dec}\left(\sum_{i=1}^{n_{L+1}} v_{L+1,i} k^*_{L,del,(L+1,i)}\right) +$$

$$\eta_{dec,(0,1)} b^*_{0,4} + \sum_{t=1}^{L+1} \sum_{i=1}^{n_t} \eta_{dec,(t,i)} b^*_{t,2n_t+i},$$

$$k^*_{L+1,ran,j'} :=$$

$$\sum_{j=1}^{2L} \alpha_{ran,j',j} k^*_{L,ran,j} + \sigma_{ran,j'}\left(\sum_{i=1}^{n_{L+1}} v_{L+1,i} k^*_{L,del,(L+1,i)}\right) +$$

$$\eta_{ran,j',(0,1)} b^*_{0,4} + \sum_{t=1}^{L+1} \sum_{i=1}^{n_t} \eta_{ran,j',(t,i)} b^*_{t,2n_t+i},$$

$$k^*_{L+1,ran,(\tau,l)} :=$$

$$\sum_{j=1}^{2L} \alpha_{ran,(\tau,l),j} k^*_{L,ran,j} + \sigma_{ran,(\tau,l)}\left(\sum_{i=1}^{n_{L+1}} v_{L+1,i} k^*_{L,del,(L+1,i)}\right) +$$

$$\phi_{ran,(\tau,l)} k^*_{L,ran,(\tau,l)} + \eta_{ran,(\tau,l),(0,1)} b^*_{0,4} +$$

$$\sum_{t=1}^{L+1} \sum_{i=1}^{n_t} \eta_{ran,(\tau,l),(t,i)} b^*_{t,2n_t+i} + \sum_{i=1}^{n_\tau} \eta_{ran,(\tau,l),(\tau,i)} b^*_{\tau,2n_\tau+i},$$

$$k^*_{L+1,del,(\tau,l)} :=$$

$$\sum_{j=1}^{2L} \alpha_{del,(\tau,l),j} k^*_{L,ran,j} + \sigma_{del,(\tau,l)}\left(\sum_{i=1}^{n_{L+1}} v_{L+1,i} k^*_{L,del,(L+1,i)}\right) +$$

$$\psi' k^*_{L,del,(\tau,i)} + \phi_{del,(\tau,l)} k^*_{L,ran,(\tau,l)} + \eta_{del,(\tau,l),(0,1)} b^*_{0,4} +$$

$$\sum_{t=1}^{L+1} \sum_{i=1}^{n_t} \eta_{del,(\tau,l),(t,i)} b^*_{t,2n_t+i} + \sum_{i=1}^{n_\tau} \eta_{del,(\tau,l),(\tau,i)} b^*_{\tau,2n_\tau+i},$$

$$sk_{L+1} := (k^*_{L+1,dec}, \{k^*_{L+1,ran,j'}\}_{j'=1,\ldots,2(L+1)},$$

$$\{k^*_{L+1,ran,(\tau,l)}, k^*_{L+1,del,(\tau,l)}\}_{\tau=L+2,\ldots,d;(\tau,l)=(\tau,1),\ldots,(\tau,n_\tau)}),$$

return $sk_{L+1}$

The Dec algorithm shown in Formula 146 remains the same.

The Setup algorithm needs to be executed once when the cryptographic processing system 10 is set up, and does not have to be executed each time a decryption key is generated. In the above description, the Setup algorithm and the KeyGen algorithm are executed by the key generation device 100. However, the Setup algorithm and the KeyGen algorithm may be executed by different devices.

Second Embodiment

In this embodiment, a generalized version of the HPE scheme for inner products discussed in the first embodiment will be described.

In the HPE scheme for inner products discussed in the first embodiment, a ciphertext ct can be decrypted by a decryption key, as a general rule, if the inner product of attribute information set in the ciphertext ct and predicate information set in the decryption key is 0.

However, in the HPE scheme for inner products to be discussed in the second embodiment, it may be arranged that decryption is possible even if the inner product of the attribute information set in the ciphertext ct and the predicate information set in the decryption key is not 0.

Specifically, in the following description, decryption is possible if the inner product of attribute information $x_t$ and predicate information $v_t$ is 0 for each integer t of $\rho_t$ (t=1, . . . , d) having the value of 0 and if the inner product of the attribute information $x_t$ and the predicate information $v_t$ is not 0 for each integer t of $\rho_t$ (t=1, . . . , d) having the value of 1.

With this arrangement, it is possible to set a positive conditional expression (e.g., attribute information=predicate information) or a negative conditional expression (attribute information≠predicate information) depending on the setting of the value of $\rho_t$ (t=1, . . . , d).

Figure 17:
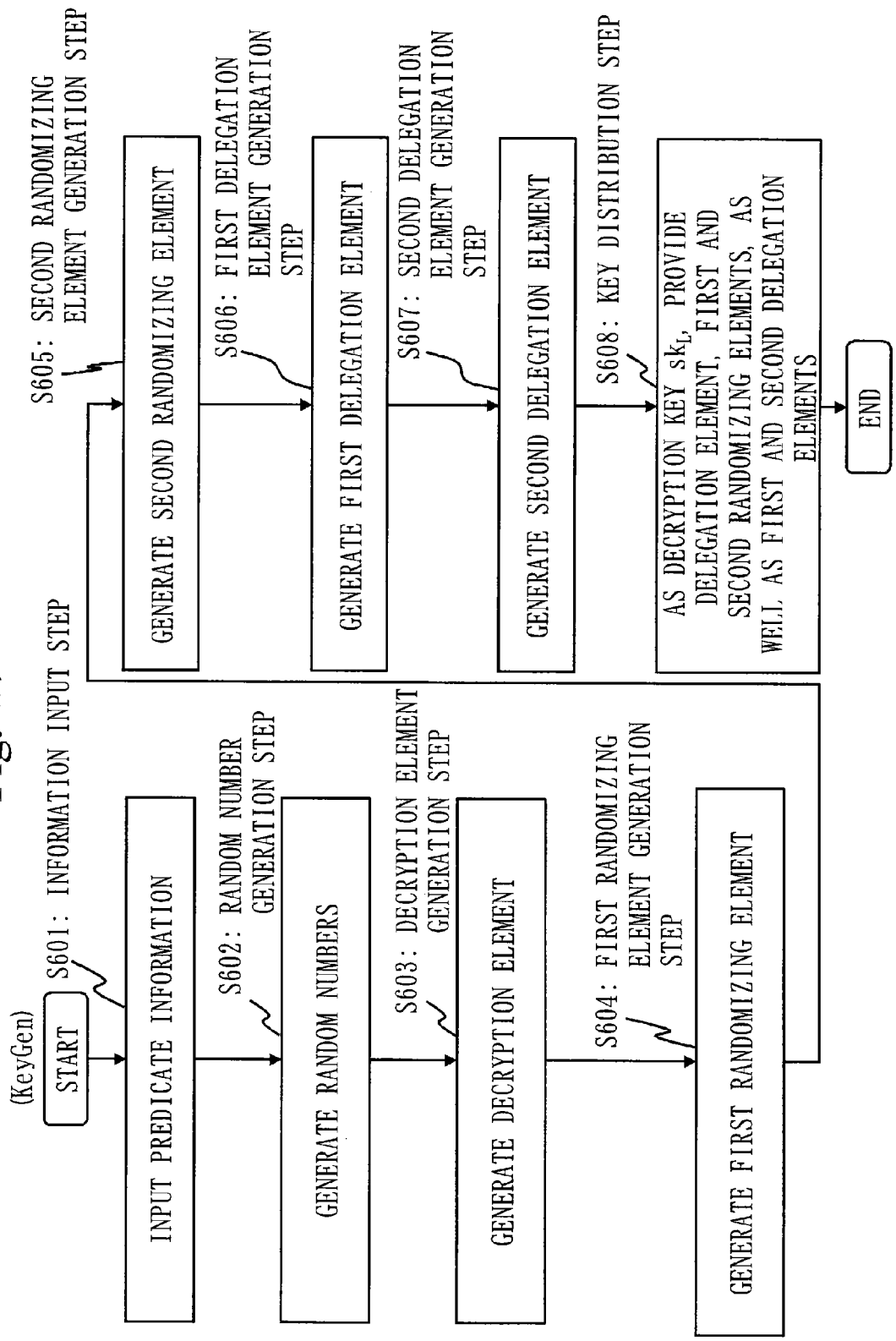
FIG. 17 is a flowchart showing a process of a KeyGen algorithm.
Figure 19:
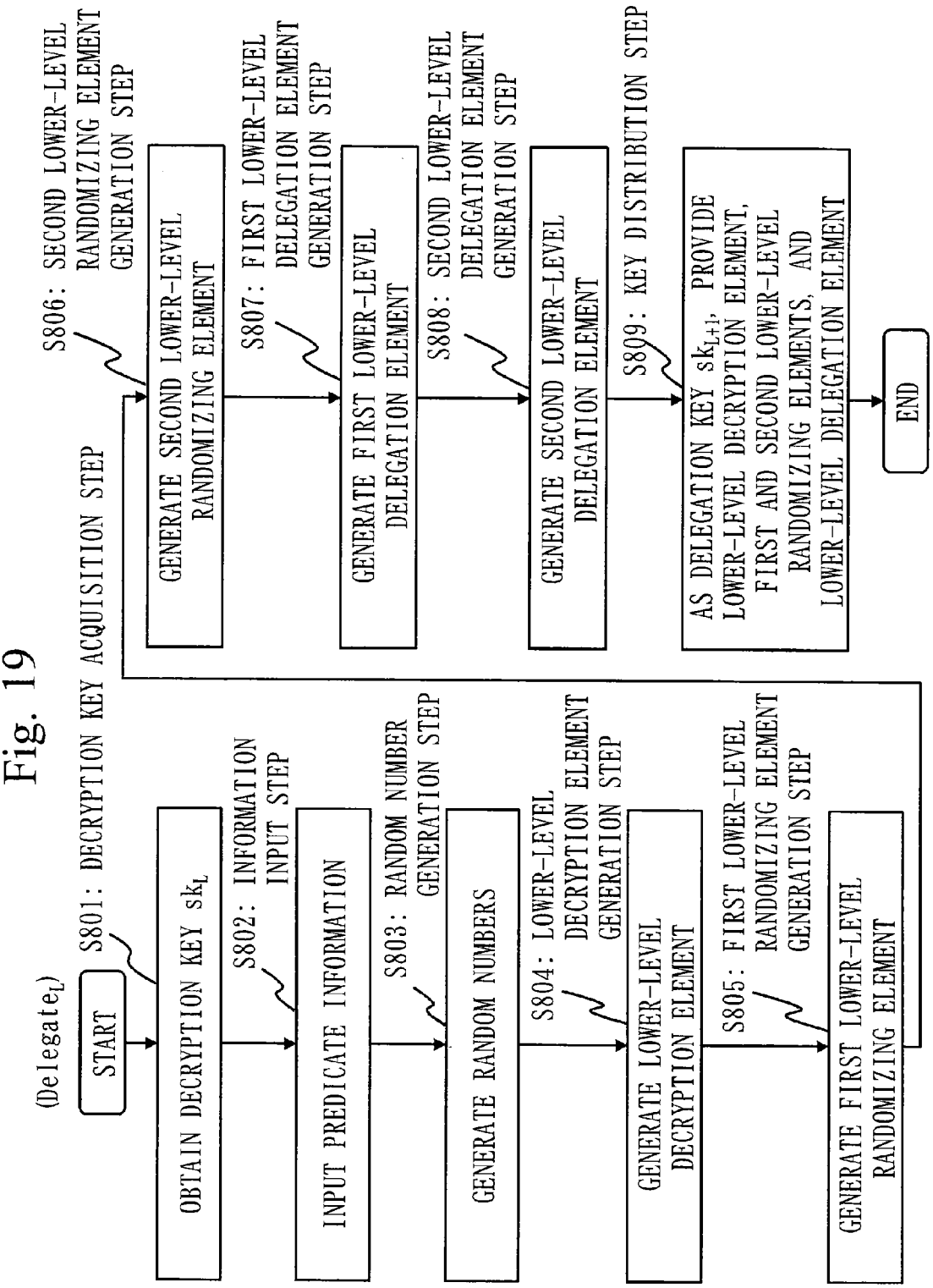
FIG. 19 is a flowchart showing a process of the Delegate$_L$ algorithm.

Referring to FIGS. 17 and 19, the HPE scheme for inner products according to the second embodiment will be described, and functions and operations of the cryptographic processing system 10 that implements the HPE scheme for inner products will be described.

A functional configuration of the cryptographic processing system 10 according to the second embodiment is the same as a functional configuration of the cryptographic processing system 10 according to the first embodiment shown in FIGS. 8 to 11.

Figure 18:
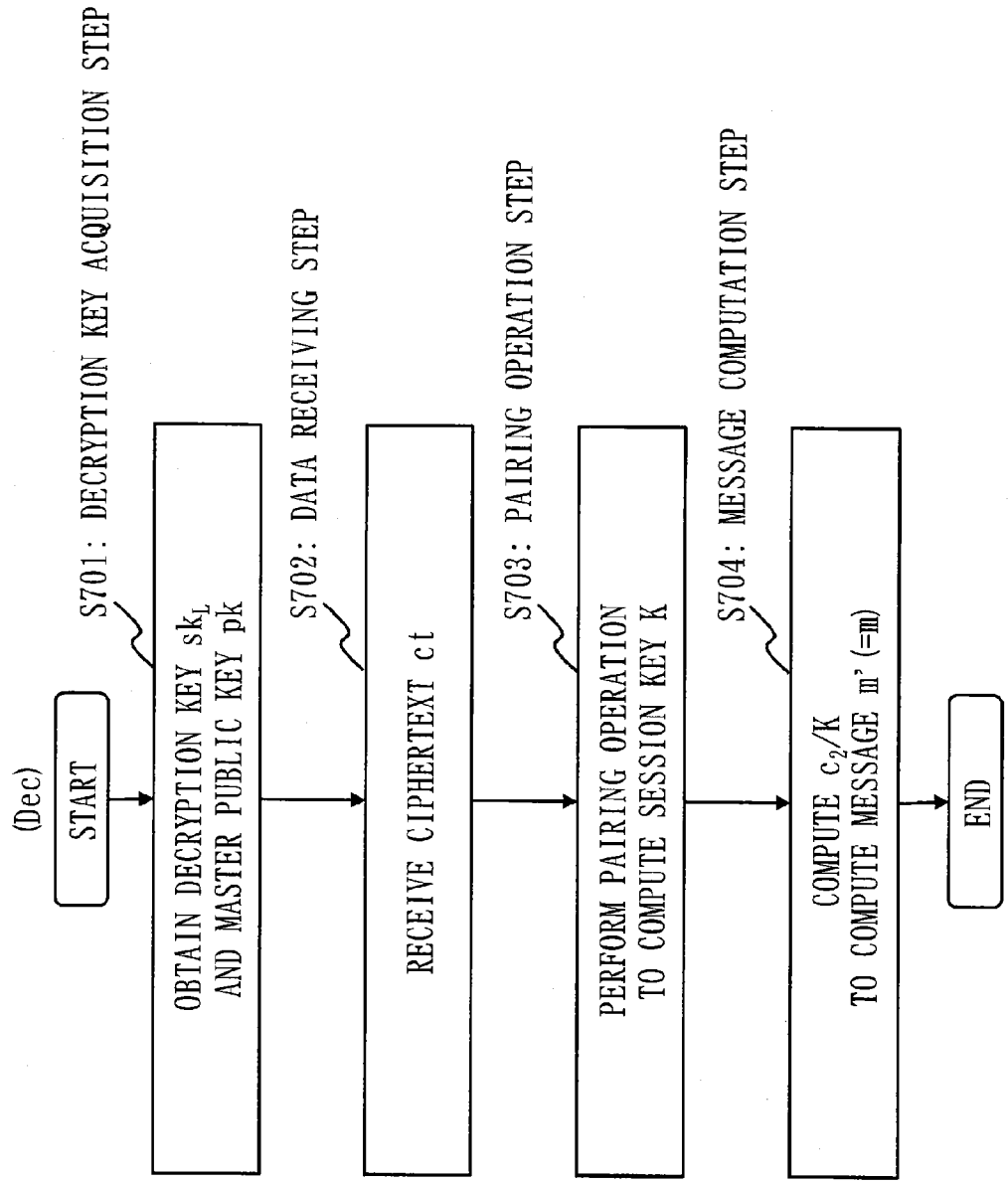
FIG. 18 is a flowchart showing a process of the Dec algorithm.

FIG. 17 is a flowchart showing operations of the key generation device 100 and showing a process of the KeyGen algorithm. FIG. 18 is a flowchart showing operations of the decryption device 300 and showing a process of the Dec algorithm. FIG. 19 is a flowchart showing operations of the key delegation device 400 and showing a process of the Delegate$_L$ algorithm.

Processes of the Setup algorithm and the Enc algorithm according to the second embodiment are the same as the processes of the Setup algorithm and the Enc algorithm according to the first embodiment, so that description will be omitted. In the Enc algorithm, however, a ciphertext ct to be transmitted to the decryption device 300 includes not only ciphertexts $c_1$ and $c_2$ but also attribute information $x_i$ (i=1, ..., L).

Referring to FIG. 17, the process of the KeyGen algorithm executed by the key generation device 100 will be described.

(S601: Information Input Step)

Using the input device, the information input unit 130 inputs predicate information $((v_1, \rho_1), \ldots, (v_L, \rho_L)) := ((v_{1,i} (i=1, \ldots, n_1), \rho_1 \in \{0,1\}), \ldots, (v_{L,i} (i=1, \ldots, n_L), \rho_L \in \{0,1\}))$. As predicate information, an attribute of a user of a key is input.

(S602: Random Number Generation Step)

Using the processing device, the random number generation unit 141 generates a random number $\psi$, random numbers $s_{dec,t}$, $s_{ran,j,t}$ (t=1, ..., L), random numbers $\theta_{dec,t}$, $\theta_{ran,j,t}$, $\eta_{dec,t}$, $\eta_{ran,j,t}$, $\eta_{ran,0,t}$, $\eta_{del,0,t}$, $\eta_{del,1,t}$ (t=0, ..., L), random numbers $s_{ran,0,t}$, $s_{del,0,t}$, $s_{del,1,t}$ (t=0, ..., L+1), random numbers $\theta_{ran,0,t}$, $\theta_{del,0,t}$, $\theta_{del,1,t}$ (t=0, ..., L+1), and random numbers $\eta_{ran,(\tau,\iota)}$, $\eta_{del,0,(\tau,\iota)}$, $\eta_{del,1,(\tau,\iota)}$ for each of integers j, $\tau$, $\iota$ of j=1, ..., 2L, $\tau$=L+1, ..., d, $(\tau,\iota)=(\tau,1), \ldots, (\tau,n_\tau)$, as shown in Formula 161.

[Formula 161]

for
$j = 1, \ldots, 2L;$
$\tau = l+1, \ldots, d;$
$(\tau, l) = (\tau, 1), \ldots, (\tau, n_\tau);$
$\psi, s_{dec,t}, s_{ran,j,t} \xleftarrow{U} \mathbb{F}_q$ ($t = 1, \ldots, L$),
$\theta_{dec,t}, \theta_{ran,j,t} \xleftarrow{U} \mathbb{F}_q$ ($t = 0, \ldots, L$),
$\vec{\eta}_{dec,t} := (\eta_{dec,t,1}, \ldots, \eta_{dec,t,w_t}) \xleftarrow{U} \mathbb{F}_q^{w_t}$ ($t = 0, \ldots, L$),
$\vec{\eta}_{ran,j,t} :=$
$(\eta_{ran,j,t,1}, \ldots, \eta_{ran,j,t,w_t}) \xleftarrow{U} \mathbb{F}_q^{w_t}$ ($t = 0, \ldots, L$),
$\vec{\eta}_{ran,0,t} := (\eta_{ran,0,t,1}, \ldots, \eta_{ran,0,t,w_t}) \xleftarrow{U} \mathbb{F}_q^{w_t}$
($t = 0, \ldots, L$),
$\vec{\eta}_{del,0,t} := (\eta_{del,0,t,1}, \ldots, \eta_{del,0,t,w_t}) \xleftarrow{U} \mathbb{F}_q^{w_t}$ ($t = 0, \ldots, L$),
$\vec{\eta}_{del,1,t} := (\eta_{del,1,t,1}, \ldots, \eta_{del,1,t,w_t}) \xleftarrow{U} \mathbb{F}_q^{w_t}$ ($t = 0, \ldots, L$),
$s_{ran,0,t}, s_{del,0,t}, s_{del,1,t} \xleftarrow{U} \mathbb{F}_q$ ($t = 1, \ldots, L+1$),
$\theta_{ran,0,t}, \theta_{del,0,t}, \theta_{del,1,t} \xleftarrow{U} \mathbb{F}_q$ ($t = 0, \ldots, L+1$),
$\vec{\eta}_{ran,0,(\tau,l)} := (\eta_{ran,0,(\tau,l),1}, \ldots, \eta_{ran,0,(\tau,l),w_l}) \xleftarrow{U} \mathbb{F}_q^{w_t}$,
$\vec{\eta}_{del,0,(\tau,l)} := (\eta_{del,0,(\tau,l),1}, \ldots, \eta_{del,0,(\tau,l),w_l}) \xleftarrow{U} \mathbb{F}_q^{w_t}$,
$\vec{\eta}_{del,1,(\tau,l)} := (\eta_{del,1,(\tau,l),1}, \ldots, \eta_{del,1,(\tau,l),w_l}) \xleftarrow{U} \mathbb{F}_q^{w_t}$ $s_{dec,0}$, $s_{ran,j,0}$, $s_{ran,0,0}$, $s_{del,0,0}$, and $s_{del,1,0}$ are set as shown in Formula 162.

$s_{dec,0} := \sum_{t=1}^{L} s_{dec,t}$ $s_{ran,j,0} := \sum_{t=1}^{L} s_{ran,j,t}$ $s_{ran,0,0} := \sum_{t=1}^{L} s_{ran,0,t}$ $s_{del,0,0} := \sum_{t=1}^{L+1} s_{del,0,t}$ $s_{del,1,0} := \sum_{t=1}^{L+1} s_{del,1,t}$

[Formula 162]

(S603: Decryption Element Generation Step)

Using the processing device, the decryption element generation unit 142 generates a decryption element $k^*_{L,dec}$ which is an element of a decryption key $sk_L$, as shown in Formula 163.

[Formula 163]

$k^*_{L,dec} := \left( (-s_{dec,0}, 0^{u_0}, 1, \vec{\eta}_{dec,0}, 0^{z_0})_{\mathbb{B}^*_0}, \right.$ $\left\{ \begin{array}{ll} (s_{dec,t}\vec{e}_{t,1} + \theta_{dec,t}\vec{v}_t, 0^{u_t}, \vec{\eta}_{dec,t}, 0^{z_t})_{\mathbb{B}^*_t}, & \text{if } \rho_t = 0 \\ (s_{dec,t}\vec{v}_t, 0^{u_t}, \vec{\eta}_{dec,t}, 0^{z_t})_{\mathbb{B}^*_t}, & \text{if } \rho_t = 1 \end{array} \right\} :$ $\left. t = 1, \ldots, L \right)$ As described above, for the basis B and the basis B* shown in Formula 110, Formula 111 is defined. Thus, Formula 163 denotes that coefficients of basis vectors of the basis $B^*_0$ and the basis $B^*_t$ (t=1, ..., L) are set as described below to generate the decryption element $k^*_{L,dec}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{dec,0}$ is set as a coefficient of a basis vector 1 of the basis $B^*_0$. 0 is set as a coefficient of each of basis vectors $1+1, \ldots, 1+u_0$. 1 is set as a coefficient of a basis vector $1+u_0+1$. $\eta_{dec,0,1}, \ldots, \eta_{dec,0,w0}$ (where w0 denotes $w_0$) are respectively set as coefficients of basis vectors $1+u_0+1+1, \ldots, 1+u_0+1+w_0$. 0 is set as a coefficient of each of basis vectors $1+u_0+1+w_0+1, \ldots, 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, \ldots, b^*_{t,3}$. Settings of the basis $B^*_t$ (t=1, ..., L) vary depending on whether the value of $\rho_t$ is 0 or 1.

When the value of $\rho_t$ is 0, $s_{dec,t}+\theta_{dec,t}v_{t,1}$ is set as a coefficient of a basis vector 1 of the basis $B^*_t$ (t=1, ..., L). $\theta_{dec,t}v_{t,2}, \ldots, \theta_{dec,t}v_{t,nt}$ (where nt denotes $n_t$) are respectively set as coefficients of basis vectors $2, \ldots, n_t$. 0 is set as a coefficient of each of basis vectors $n_t+1, \ldots, n_t+u_t$. $\eta_{dec,t,1}, \ldots, \eta_{dec,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

On the other hand, when the value of $\rho_t$ is 1, $s_{dec,t}v_{t,1}, \ldots, s_{dec,t}v_{t,nt}$ (where nt denotes $n_t$) are respectively set as coefficients of basis vectors $1, \ldots, n_t$ of the basis $B^*_t$ (t=1, ..., L). 0 is set as a coefficient of each of basis vectors $n_t+1, \ldots, n_t+u_t$. $\eta_{dec,t,1}, \ldots, \eta_{dec,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

(S604: First Randomizing Element Generation Step)

Using the processing device, the randomizing element generation unit 143 generates a first randomizing element $k^*_{L,ran,j}$ which is an element of the decryption key $sk_L$, for each integer j of j=1, ..., 2L, as shown in Formula 164.

$$k^*_{L,ran,j} := \left( (-s_{ran,j,0}, 0^{u_0}, 0, \vec{\eta}_{ran,j,0}, 0^{z_0})_{\mathbb{B}^*_0}, \right.$$ [Formula 164]

$$\left\{ \begin{array}{ll} (s_{ran,j,t}\vec{e}_{t,1} + \theta_{ran,j,t}\vec{v}_t, 0^{u_t}, \vec{\eta}_{ran,j,t}, 0^{z_t})_{\mathbb{B}^*_t}, & \text{if } \rho_t = 0 \\ (s_{ran,j,t}\vec{v}_t, 0^{u_t}, \vec{\eta}_{ran,j,t}, 0^{z_t})_{\mathbb{B}^*_t}, & \text{if } \rho_t = 1 \end{array} \right\} :$$

$$\left. t = 1, \ldots, L \right)$$

As described above, for the basis B and the basis B* shown in Formula 110, Formula 111 is defined. Thus, Formula 164 denotes that coefficients of basis vectors of the basis $B^*_0$ and the basis $B^*_t$ (t=1, ..., L) are set as described below to generate the first randomizing element $k^*_{L,ran,j}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{ran,j,0}$ is set as a coefficient of a basis vector 1 of the basis $B^*_0$. 0 is set as a coefficient of each of basis vectors $1+1, \ldots, 1+u_0+1$. $\eta_{ran,j,0,1}, \ldots, \eta_{ran,j,0,w0}$ (where w0 denotes $w_0$) are respectively set as coefficients of basis vectors $1+u_0+1+1, \ldots, 1+u_0+1+w_0$. 0 is set as a coefficient of each of basis vectors $1+u_0+1+w_0+1, \ldots, 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, b^*_{t,3}$. Settings of the basis $B^*_t$ (t=1, ..., L) vary depending on whether the value of $\rho_t$ is 0 or 1.

When the value of $\rho_t$ is 0, $s_{ran,j,t} + \theta_{ran,j,t}v_{t,1}$ is set as a coefficient of a basis vector 1 of the basis $B^*_t$ (t=1, ..., L). $\theta_{ran,j,t}v_{t,2}, \ldots, \theta_{ran,j,t}v_{t,nt}$ (where nt denotes $n_t$) are respectively set as coefficients of basis vectors 2, ..., $n_t$. 0 is set as a coefficient of each of basis vectors $n_t+1, \ldots, n_t+u_t$. $\eta_{ran,j,t,1}, \ldots, \eta_{ran,j,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

On the other hand, when the value of $\rho_t$ is 1, $s_{ran,j,t}v_{t,1}, \ldots, s_{ran,j,t}v_{t,nt}$ (where nt denotes $n_t$) are respectively set as coefficients of basis vectors 1, ..., $n_t$ of the basis $B^*_t$ (t=1, ..., L). 0 is set as a coefficient of each of basis vectors $n_t+1, \ldots, n_t+u_t$. $\eta_{ran,j,t,1}, \ldots, \eta_{ran,j,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

(S605: Second Randomizing Element Generation Step)

Using the processing device, the randomizing element generation unit 143 generates a second randomizing element $k^*_{L,ran,(\tau,\iota,0)}$ which is an element of the decryption key $sk_L$, for each integer $\tau$ of $\tau$=L+1, ..., d and each integer $\iota$ of $\iota$=1, ..., $n_\tau$ with respect to each integer $\tau$, as shown in Formula 165.

$$k^*_{L,ran,(\tau,\iota,0)} := \left( (-s_{ran,0,0}, 0^{u_0}, 0, \vec{\eta}_{ran,0,0}, 0^{z_0})_{\mathbb{B}^*_0}, \right.$$ [Formula 165]

$$\left\{ \begin{array}{ll} (s_{ran,0,t}\vec{e}_{t,1} + \theta_{ran,0,t}\vec{v}_t, 0^{u_t}, \vec{\eta}_{ran,0,t}, 0^{z_t})_{\mathbb{B}^*_t}, & \text{if } \rho_t = 0 \\ (s_{ran,0,t}\vec{v}_t, 0^{u_t}, \vec{\eta}_{ran,0,t}, 0^{z_t})_{\mathbb{B}^*_t}, & \text{if } \rho_t = 1 \end{array} \right\} :$$

$$t = 1, \ldots, L,$$

$$(s_{ran,0,L+1}\vec{e}_{\tau,1}, 0^{u_\tau}, \vec{\eta}_{ran,0,(\tau,\iota)}, 0^{z_\tau})_{\mathbb{B}^*_\tau} \right)$$

As described above, for the basis B and the basis B* shown in Formula 110, Formula 111 is defined. Thus, Formula 165 denotes that coefficients of basis vectors of the basis $B^*_0$, the basis $B^*_t$ (t=1, ..., L) and the basis $B^*_\tau$ are set as described below to generate the second randomizing element $k^*_{L,ran,(\tau,\iota,0)}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{ran,0,0}$ is set as a coefficient of a basis vector 1 of the basis $B^*_0$. 0 is set as a coefficient of each of basis vectors $1+1, \ldots, 1+u_0+1$. $\eta_{ran,0,0,1}, \ldots, \eta_{ran,0,0,w0}$ (where w0 denotes $w_0$) are respectively set as coefficients of basis vectors $1+u_0+1+1, \ldots, 1+u_0+1+w_0$. 0 is set as a coefficient of each of basis vectors $1+u_0+1+w_0+1, \ldots, 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, \ldots, b^*_{t,3}$. Settings of the basis $B^*_t$ (t=1, ..., L) vary depending on whether the value of $\rho_t$ is 0 or 1.

When the value of $\rho_t$ is 0, $s_{ran,0,t} + \theta_{ran,0,t}v_{t,1}$ is set as a coefficient of a basis vector 1 of the basis $B^*_t$ (t=1, ..., L). $\theta_{ran,0,t}v_{t,2}, \ldots, \theta_{ran,0,t}v_{t,nt}$ (where nt denotes $n_t$) are respectively set as coefficients of basis vectors 2, ..., $n_t$. 0 is set as a coefficient of each of basis vectors $n_t+1, \ldots, n_t+u_t$. $\eta_{ran,0,t,1}, \ldots, \eta_{ran,0,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

On the other hand, when the value of $\rho_t$ is 1, $s_{ran,0,t}v_{t,1}, \ldots, s_{ran,0,t}v_{t,nt}$ (where nt denotes $n_t$) are respectively set as coefficients of basis vectors 1, ..., $n_t$ of basis $B^*_t$ (t=1, ..., L). 0 is set as a coefficient of each of basis vectors $n_t+1, \ldots, n_t+u_t$. $\eta_{ran,0,t,1}, \ldots, \eta_{ran,0,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

Next, description will be directed to the basis $B^*_\tau$. For simplicity of notation, a basis vector $b^*_{\tau,i}$ is identified using only the i portion. For example, a basis vector 1 denotes a basis vector $b^*_{\tau,1}$. Basis vectors 1, ..., 3 denote basis vectors $b^*_{\tau,1}, \ldots, b^*_{\tau,3}$.

$s_{ran,0,L+1}$ is set as a coefficient of a basis vector 1 of the basis $B^*_\tau$. 0 is set as a coefficient of each of basis vectors 2, ..., $n_\tau, \ldots, n_\tau + u_\tau$. $\eta_{ran,0,(\tau,\iota),1}, \ldots, \eta_{ran,0,(\tau,\iota)s,w\tau}$ (where w$\tau$ denotes $w_\tau$) are respectively set as coefficients of basis vectors $n_\tau + u_\tau + 1, \ldots, n_\tau + u_\tau + w_\tau$. 0 is set as a coefficient of each of basis vectors $n_\tau + u_\tau + w_\tau + 1, \ldots, n_\tau + u_\tau + w_\tau + z_\tau$.

(S606: First Delegation Element Generation Step)

Using the processing device, the delegation element generation unit 144 generates a first delegation element $k^*_{L,del,(\tau,\iota,0)}$ which is an element of the decryption key $sk_L$, for each integer $\tau$ of $\tau=L+1, \ldots, d$ and each integer $\iota$ of $\iota=1, \ldots, n_\tau$ with respect to each integer $\tau$, as shown in Formula 166.

[Formula 166]
$$k^*_{L,del,(\tau,\iota,0)} := \left( (-s_{del,0,0}, 0^{u_0}, 0, \vec{\eta}_{del,0,0}, 0^{z_0})_{\mathbb{B}^*_0}, \right.$$
$$\left\{ \begin{array}{ll} (s_{del,0,t}\vec{e}_{t,1} + \theta_{del,0,t}\vec{v}_t, 0^{u_t}, \vec{\eta}_{del,0,t}, 0^{z_t})_{\mathbb{B}^*_t}, & \text{if } \rho_t = 0 \\ (s_{del,0,t}\vec{v}_t, 0^{u_t}, \vec{\eta}_{del,0,t}, 0^{z_t})_{\mathbb{B}^*_t}, & \text{if } \rho_t = 1 \end{array} \right\} :$$
$$t = 1, \ldots, L \Bigg\},$$
$$(s_{del,0,L+1}\vec{e}_{\tau,1}, +\psi \vec{e}_{\tau,\iota}, 0^{u_\tau}, \vec{\eta}_{del,0,(\tau,\iota)}, 0^{z_\tau})_{\mathbb{B}^*_\tau} \Big)$$

As described above, for the basis B and the basis B* shown in Formula 110, Formula 111 is defined. Thus, Formula 166 denotes that coefficients of basis vectors of the basis $B^*_0$, the basis $B^*_t$ (t=1, ..., L), and the basis $B^*_\tau$ are set as described below to generate the first delegation element $k^*_{L,del,(\tau,\iota,0)}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{del,0,0}$ is set as a coefficient of a basis vector 1 of the basis $B^*_0$. 0 is set as a coefficient of each of basis vectors $1+1, \ldots, 1+u_0+1$. $\eta_{del,0,0,1}, \ldots, \eta_{del,0,0,w0}$ (where w0 denotes $w_0$) are respectively set as coefficients of basis vectors $1+u_0+1+1, \ldots, 1+u_0+1+w_0$. 0 is set as a coefficient of each of basis vectors $1+u_0+1+w_0+1, \ldots, 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denote basis vectors $b^*_{t,1}, \ldots, b^*_{t,3}$. Settings of the basis $B^*_t$ (t=1, ..., L) vary depending on whether the value of $\rho_t$ is 0 or 1.

When the value of $\rho_t$ is 0, $s_{del,0,t}+\theta_{del,0,t}v_{t,1}$ is set as a coefficient of a basis vector 1 of the basis $B^*_t$ (t=1, ..., L). $\theta_{del,0,t}v_{t,2}, \ldots, \theta_{del,0,t}v_{t,nt}$ (where nt denotes $n_t$) are respectively set as coefficients of basis vectors 2, ..., $n_t$. 0s is set as a coefficient of each of basis vectors $n_t+1, \ldots, n_t+u_t$. $\eta_{del,0,t,1}, \ldots, \eta_{del,0,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

On the other hand, when the value of $\rho_t$ is 1, $s_{del,0,t}v_{t,1}, \ldots, s_{del,0,t}v_{t,nt}$ (where nt denotes $n_t$) are respectively set as coefficients of basis vectors 1, ..., $n_t$ of the basis $B^*_t$ (t=1, ..., L). 0 is set as a coefficient of each of basis vectors $n_t+1, \ldots, n_t+u_t$. $\eta_{del,0,t,1}, \ldots, \eta_{del,0,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

Next, description will be directed to the basis $B^*_\tau$. For simplicity of notation, a basis vector $b^*_{\tau,i}$ is identified using only the i portion. For example, a basis vector 1 denotes a basis vector $b^*_{\tau,1}$. Basis vectors 1, ..., 3 denote basis vectors $b^*_{\tau,1}, \ldots, b^*_{\tau,3}$.

$s_{del,0,L+1}e_{\tau,1}+\psi e_{\tau,\iota}$ is set as a coefficient of basis vectors 1, ..., $n_\tau$ of the basis $B^*_\tau$. 0 is set as a coefficient of each of basis vectors $n_\tau+1, \ldots, n_\tau+u_\tau$. $\eta_{del,0,(\tau,\iota),1}, \ldots, \eta_{del,0,(\tau,\iota),w\tau}$ (where w$\tau$ denotes $w_\tau$) are respectively set as coefficients of basis vectors $n_\tau+u_\tau+1, \ldots, n_\tau+u_\tau+w_\tau$. 0 is set as a coefficient of each of basis vectors $n_\tau+u_\tau+w_\tau+1, \ldots, n_\tau+u_\tau+w_\tau+z_\tau$.

(S607: Second Delegation Element Generation Step)

Using the processing device, the delegation element generation unit 144 generates a second delegation element $k^*_{L,del,(\tau,\iota,1)}$ which is an element of the decryption key $sk_L$, for each integer $\tau$ of $\tau=L+1, \ldots, d$ and each integer $\iota$ of $\iota=1, \ldots, n_\tau$ with respect to each integer $\tau$, as shown in Formula 167.

[Formula 167]
$$k^*_{L,del,(\tau,\iota,1)} := \left( (-s_{del,1,0}, 0^{u_0}, 0, \vec{\eta}_{del,1,0}, 0^{z_0})_{\mathbb{B}^*_0}, \right.$$
$$\left\{ \begin{array}{ll} (s_{del,1,t}\vec{e}_{t,1} + \theta_{del,1,t}\vec{v}_t, 0^{u_t}, \vec{\eta}_{del,1,t}, 0^{z_t})_{\mathbb{B}^*_t}, & \text{if } \rho_t = 0 \\ (s_{del,1,t}\vec{v}_t, 0^{u_t}, \vec{\eta}_{del,1,t}, 0^{z_t})_{\mathbb{B}^*_t}, & \text{if } \rho_t = 1 \end{array} \right\} :$$
$$t = 1, \ldots, L \Bigg\},$$
$$(s_{del,1,L+1}\vec{e}_{\tau,1}, 0^{u_\tau}, \vec{\eta}_{del,1,(\tau,\iota)}, 0^{z_\tau})_{\mathbb{B}^*_\tau} \Big)$$

As described above, for the basis B and the basis B* shown in Formula 110, Formula 111 is defined. Thus, Formula 167 denotes that coefficients of basis vectors of the basis $B^*_0$, the basis $B^*_t$ (t=1, ..., L) and the basis $B^*_\tau$ are set as described below to generate the second delegation element $k^*_{L,del,(\tau,\iota,1)}$.

First, description will be directed to the basis $B^*_0$. For simplicity of notation, a basis vector $b^*_{0,i}$ is identified using only the i portion. For example, a basis vector 1 denotes a basis vector $b^*_{0,1}$. Basis vectors 1, ..., 3 denote basis vectors $b^*_{0,1}, \ldots, b^*_{0,3}$.

$-s_{del,1,0}$ is set as a coefficient of a basis vector 1 of the basis $B^*_0$. 0 is set as a coefficient of each of basis vectors $1+1, \ldots, 1+u_0+1$. $\eta_{del,1,0,1}, \ldots, \eta_{del,1,0,w0}$ (where w0 denotes $w_0$) are respectively set as coefficients of basis vectors $1+u_0+1+1, \ldots, 1+u_0+1+w_0$. 0 is set as a coefficient of each of basis vectors $1+u_0+1+w_0+1, \ldots, 1+u_0+1+w_0+z_0$.

Next, description will be directed to the basis $B^*_t$ (t=1, ..., L). For simplicity of notation, a basis vector $b^*_{t,i}$ is identified using only the i portion. For example, a basis vector 1 denotes a basis vector $b^*_{t,1}$. Basis vectors 1, ..., 3 denotes basis vectors $b^*_{t,1}, \ldots, b^*_{t,3}$. Settings of the basis $B^*_t$ (t=1, ..., L) vary depending on whether the value of $\rho_t$ is 0 or 1.

When the value $\rho_t$ is 0, $s_{del,1,t}+\theta_{del,1,t}v_{t,1}$ is set as a coefficient of a basis vector 1 of the basis $B^*_t$ (t=1, ..., L). $\theta_{del,1,t}v_{t,2}, \ldots, \theta_{del,1,t}v_{t,nt}$ (where nt denotes $n_t$) are respectively set as coefficients of basis vectors 2, ..., $n_t$. 0 is set as a coefficient of each of basis vectors $n_t+1, \ldots, n_t+u_t$. $\eta_{del,1,t,1}, \ldots, \eta_{del,1,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

On the other hand, when the value of $\rho_t$ is 1, $s_{del,1,t}v_{t,1}, \ldots, s_{del,1,t}v_{t,nt}$ (where nt denotes $n_t$) are respectively set as coefficients of basis vectors 1, ..., $n_t$ of the basis $B^*_t$ (t=1, ..., L). 0 is set as a coefficient of each of basis vectors $n_t+1, \ldots, n_t+u_t$. $\eta_{del,1,t,1}, \ldots, \eta_{del,1,t,wt}$ (where wt denotes $w_t$) are respectively set as coefficients of basis vectors $n_t+u_t+1, \ldots, n_t+u_t+w_t$. 0 is set as a coefficient of each of basis vectors $n_t+u_t+w_t+1, \ldots, n_t+u_t+w_t+z_t$.

Next, description will be directed to the basis $B^*_\tau$. For simplicity of notation, a basis vector $b^*_{\tau,i}$ is identified using only the i portion. For example, a basis vector 1 denotes a basis vector $b^*_{\tau,1}$. Basis vectors 1, ..., 3 denote basis vectors $b^*_{\tau,1}, \ldots, b^*_{\tau,3}$.

$s_{del,1,L+1}e_{\tau,t}$ is set as a coefficient of basis vectors 1, ..., $n_\tau$ of the basis $B^*_\tau$. 0 is set as a coefficient of each of basis vectors $n_\tau+1, \ldots, n_\tau+u_\tau$. $\eta_{del,1,(\tau,\iota),1}, \ldots, \eta_{del,1,(\tau,\iota),w\tau}$ (where $w\tau$ denotes $w_\tau$) are respectively set as coefficients of basis vectors $n_\tau+u_\tau+1, \ldots, n_\tau+u_\tau+w_\tau$. 0 is set as a coefficient of each of basis vectors $n_\tau+u_\tau+w_\tau+1, \ldots, n_\tau+u_\tau+w_\tau+z_\tau$.

(S608: Key Distribution Step)

Using the communication device and through the network, for example, the key distribution unit 150 secretly provides to the decryption device 300 the decryption key $sk_L$ having elements of the decryption element $k^*_{L,dec}$, the first randomizing element $k^*_{L,ran,j}$ (j=1, ..., 2L), the second randomizing element $k^*_{L,ran,(\tau,\iota,0)}$ ($\tau$=L+1, ..., d; $(\tau,\iota)=(\tau,1), \ldots, (\tau,n_\tau)$), the first delegation element $k^*_{L,del,(\tau,\iota,0)}$ ($\tau$=L+1, ..., d; $(\tau,\iota)=(\tau,1), \ldots, (\tau,n_\tau)$), and the second delegation element $k^*_{L,del,(\tau,\iota,1)}$ ($\tau$=L+1, ..., d; $(\tau,\iota)=(\tau,1), \ldots, (\tau,n_\tau)$). It is obvious that the decryption key $sk_L$ may be provided to the decryption device 300 by other methods.

To summarize, in (S601) to (S607), the key generation device 100 executes the KeyGen algorithm shown in Formulas 168 and 169, and generates the decryption key $sk_L$. Then, in (S608), the key generation device 100 provides the generated decryption key $sk_L$ to the decryption device 300.

[Formula 168]
$$KeyGen(pk, sk, (\vec{v}_1, \rho_1), \ldots, (\vec{v}_L, \rho_L)) :=$$
$$(((v_{1,1}, \ldots, v_{1,n_1}) \in \mathbb{F}_q^{n_1}, \rho_1 \in \{0,1\}), \ldots,$$
$$((v_{L,1}, \ldots, v_{L,n_L}) \in \mathbb{F}_q^{n_L}, \rho_L \in \{0,1\})):$$

for $j = 1, \ldots, 2L; \tau = L+1 \ldots,$
$$d; (\tau, \iota) = (\tau, 1), \ldots, (\tau, n_\tau);$$

$$\psi, s_{dec,t}, s_{ran,j,t} \xleftarrow{U} \mathbb{F}_q (t = 1, \ldots, L);$$

$$\theta_{dec,t}, \theta_{ran,j,t} \xleftarrow{U} \mathbb{F}_q,$$

$$\vec{\eta}_{dec,t}, \vec{\eta}_{ran,j,t}, \vec{\eta}_{ran,0,t},$$

$$\vec{\eta}_{del,0,t}, \vec{\eta}_{del,1,t} \xleftarrow{U} \mathbb{F}_q^{w_t} (t = 0, \ldots, L);$$

$$s_{ran,0,t}, s_{del,0,t}, s_{del,1,t} \xleftarrow{U} \mathbb{F}_q,$$

$$\theta_{ran,0,t}, \theta_{del,0,t}, \theta_{del,1,t} \xleftarrow{U} \mathbb{F}_q,$$

$$\vec{\eta}_{ran,0,(\tau,\iota)}, \vec{\eta}_{del,0,(\tau,\iota)}, \vec{\eta}_{del,1,(\tau,\iota)} \xleftarrow{U} \mathbb{F}_q^{w_t},$$
$$(t = 0, \ldots, L+1);$$

$$s_{dec,0} := \sum_{t=1}^{L} s_{dec,t}, s_{ran,j,0} := \sum_{t=1}^{L} s_{ran,j,t},$$

$$s_{ran,0,0} := \sum_{t=1}^{L} s_{ran,0,t}, s_{del,0,0} := \sum_{t=1}^{L+1} s_{del,0,t},$$

$$s_{del,1,0} := \sum_{t=1}^{L+1} s_{del,1,t},$$

-continued $$k^*_{L,dec} := \left( (-s_{dec,0}, 0^{u_0}, 1, \vec{\eta}_{dec,0}, 0^{z_0})_{\mathbb{B}^*_0}, \right.$$
$$\left. \begin{cases} (s_{dec,t}\vec{e}_{t,1} + \theta_{dec,t}\vec{v}_t, 0^{u_t}, \vec{\eta}_{dec,t}, 0^{z_t})_{\mathbb{B}^*_t}, & \text{if } \rho_t = 0 \\ (s_{dec,t}\vec{v}_t, 0^{u_t}, \vec{\eta}_{dec,t}, 0^{z_t})_{\mathbb{B}^*_t}, & \text{if } \rho_t = 1 \end{cases} \right.$$
$$t = 1, \ldots, L \right)$$

$$k^*_{L,ran,j} := \left( (-s_{ran,j,0}, 0^{u_0}, 0, \vec{\eta}_{ran,j,0}, 0^{z_0})_{\mathbb{B}^*_0}, \right.$$
$$\left. \begin{cases} (s_{ran,j,t}\vec{e}_{t,1} + \theta_{ran,j,t}\vec{v}_t, 0^{u_t}, \vec{\eta}_{ran,j,t}, 0^{z_t})_{\mathbb{B}^*_t}, & \text{if } \rho_t = 0 \\ (s_{ran,j,t}\vec{v}_t, 0^{u_t}, \vec{\eta}_{ran,j,t}, 0^{z_t})_{\mathbb{B}^*_t}, & \text{if } \rho_t = 1 \end{cases} \right.$$
$$t = 1, \ldots, L \right)$$

[Formula 169]
$$k^*_{L,ran,(\tau,\iota,0)} := \left( (-s_{ran,0,0}, 0^{u_0}, 0, \vec{\eta}_{ran,0,0}, 0^{z_0})_{\mathbb{B}^*_0}, \right.$$
$$\left. \begin{cases} (s_{ran,0,t}\vec{e}_{t,1} + \theta_{ran,0,t}\vec{v}_t, 0^{u_t}, \vec{\eta}_{ran,0,t}, 0^{z_t})_{\mathbb{B}^*_t}, & \text{if } \rho_t = 0 \\ (s_{ran,0,t}\vec{v}_t, 0^{u_t}, \vec{\eta}_{ran,0,t}, 0^{z_t})_{\mathbb{B}^*_t}, & \text{if } \rho_t = 1 \end{cases} \right.$$
$$t = 1, \ldots, L \right),$$

$$(s_{ran,0,L+1}\vec{e}_{\tau,1}, 0^{u_\tau}, \vec{\eta}_{ran,0,(\tau,\iota)}, 0^{z_\tau})_{\mathbb{B}^*_\tau}),$$

$$k^*_{L,del,(\tau,\iota,1)} := \left( (-s_{del,1,0}, 0^{u_0}, 0, \vec{\eta}_{del,1,0}, 0^{z_0})_{\mathbb{B}^*_0}, \right.$$
$$\left. \begin{cases} (s_{del,1,t}\vec{e}_{t,1} + \theta_{del,1,t}\vec{v}_t, 0^{u_t}, \vec{\eta}_{del,1,t}, 0^{z_t})_{\mathbb{B}^*_t}, & \text{if } \rho_t = 0 \\ (s_{del,1,t}\vec{v}_t, 0^{u_t}, \vec{\eta}_{del,1,t}, 0^{z_t})_{\mathbb{B}^*_t}, & \text{if } \rho_t = 1 \end{cases} \right.$$
$$t = 1, \ldots, L \right),$$

$$(s_{del,1,L+1}\vec{e}_{\tau,1}, 0^{u_\tau}, \vec{\eta}_{del,1,(\tau,\iota)}, 0^{z_\tau})_{\mathbb{B}^*_\tau}),$$

$$sk_{L+1} := ((\vec{v}_1, \rho_1), \ldots, (\vec{v}_L, \rho_L));$$
$$k^*_{L,dec}, \{k^*_{L,ran,j}\}_{j=1,\ldots,2(L)},$$
$$\{k^*_{L,ran,(\tau,\iota,0)}, k^*_{L,del,(\tau,\iota,0)},$$
$$k^*_{L,del,(\tau,\iota,1)}\}_{\tau=L+1,\ldots,d;(\tau,\iota)=(\tau,1),\ldots,(\tau,n_\tau)}),$$

return $sk_L$.

Referring to FIG. 18, the process of the Dec algorithm executed by the decryption device 300 will be described.

(S701: Decryption Key Acquisition Step)

Using the communication device and through the network, for example, the decryption key acquisition unit 310 obtains the decryption key $sk_L$. The decryption key acquisition unit 310 also obtains the master public key pk generated by the key generation device 100.

(S702: Data Receiving Step)

Using the communication device and through the network, for example, the data receiving unit 320 receives the ciphertext ct transmitted by the encryption device 200.

(S703: Pairing Operation Step)

Using the processing device, the pairing operation unit 330 performs a pairing operation shown in Formula 170, and computes a session key $K = g_T^\zeta$.

$$K := e(c_{1,0}, k^*_{L,dec,0}) \cdot \prod_{1 \leq t \leq d \wedge \rho_t = 0} e(c_{1,t}, k^*_{L,dec,t}) \cdot \prod_{1 \leq t \leq d \wedge \rho_t = 1} e(c_{1,t}, k^*_{L,dec,t})^{1/(\vec{v}_t \cdot \vec{x}_t)}$$ [Formula 170]

Here, Formula 171 is defined.

$$(k^*_{L,dec,0} \in \langle \mathbb{B}^*_0 \rangle, \ldots, k^*_{L,dec,d} \in \langle \mathbb{B}^*_d \rangle) := k^*_{L,dec}, (c_{1,0} \in \langle \mathbb{B}^*_0 \rangle, \ldots, c_{1,d} \in \langle \mathbb{B}^*_d \rangle) := c_1$$ [Formula 171]

The session key K is computed by computing Formula 170 if the inner product of $v_t$ and $x_t$ is 0 for each integer t of $\rho_t=0$ and if the inner product of $v_t$ and $x_t$ is not 0 for each integer t of $\rho_t=1$ with respect to each integer t of $t=1, \ldots, L$.

(S704: Message Computation Step)

Using the processing device, the message computation unit 340 divides the ciphertext c2 by the session key K, and thereby computes a message m' (=m).

To summarize, in (S701) to (S704), the decryption device 300 executes the Dec algorithm shown in Formula 172, and computes the message m' (=m).

$$Dec(pk, sk_L, ct):$$ [Formula 172]

$$K := e(c_{1,0}, k^*_{L,dec,0}) \cdot \prod_{1 \leq t \leq d \wedge \rho_t = 0} e(c_{1,t}, k^*_{L,dec,t}) \cdot$$

$$\prod_{1 \leq t \leq d \wedge \rho_t = 1} e(c_{1,t}, k^*_{L,dec,t})^{1/(\vec{v}_t \cdot \vec{x}_t)},$$

where $(k^*_{L,dec,0} \in \langle \mathbb{B}^*_0 \rangle, \ldots, k^*_{L,dec,d} \in \langle \mathbb{B}^*_d \rangle) := k^*_{L,dec},$ $(c_{1,0} \in \langle \mathbb{B}^*_0 \rangle, \ldots, c_{1,d} \in \langle \mathbb{B}^*_d \rangle) := c_1,$ $m' := c_2 / K,$ return $m'$.

Referring to FIG. 19, the process of the Delegate$_L$ algorithm executed by the key delegation device 400 will be described.

(S801: Decryption Key Acquisition Step)

Using the communication device and through the network, for example, the decryption key acquisition unit 410 obtains the decryption key $sk_L$. The decryption key acquisition unit 410 also obtains the master public key pk generated by the key generation device 100.

(S802: Information Input Step)

Using the input device, the information input unit 420 inputs predicate information $(v_{L+1}, \rho_{L+1}) := (v_{L+1,i} (i=1, \ldots, n_{L+1}), \rho_{L+1} \in \{0,1\})$. As predicate information, an attribute of a person to whom the key is delegated is input.

(S803: Random Number Generation Step)

Using the processing device, the random number generation unit 431 generates random numbers $\alpha_{dec,j}, \sigma_{dec}, \alpha_{ran,j',j}, \sigma_{ran,j'}, \alpha_{ran,(\tau,\iota,0),j}, \sigma_{ran,(\tau,\iota,0)}, \phi_{ran,(\tau,\iota,0)}, \alpha_{del,(\tau,\iota,0),j}, \sigma_{del,(\tau,\iota,0)}, \phi_{del,(\tau,\iota,0)}, \alpha_{del,(\tau,\iota,1),j}, \sigma_{del,(\tau,\iota,1)}, \phi_{del,(\tau,\iota,1)}, \eta_{dec,(t,i)}, \eta_{ran,j',(t,i)}, \eta_{ran,(\tau,\iota,0),(t,i)}, \eta_{del,(\tau,\iota,0),(t,i)}, \eta_{del,(\tau,\iota,1),(t,i)}, \psi_0, \psi_1$, for each integer j, j', τ, ι, t, i of $j=1, \ldots, 2L, j'=1, \ldots, 2(L+1), \tau=L+2, \ldots, d, (\tau,\iota)=(\tau,1), \ldots, (\tau,n_\tau), t=0, \ldots, L+1, \tau, (t,i)=(t,1), \ldots, (t,n_t)$, as shown in Formula 173.

for $j = 1, \ldots, 2L; j' = 1, \ldots, 2(L+1);$ [Formula 173]

$\tau = L+2, \ldots, d; (\tau, \iota) = (\tau, 1), \ldots, (\tau, n_\tau);$ $t = 0, \ldots, L+1, \tau; (t, i) = (t, 1), \ldots, (t, w_t);$ $\alpha_{dec,j}, \sigma_{dec}, \alpha_{ran,j',j}, \sigma_{ran,j'}, \alpha_{ran,(\tau,\iota,0),j},$ $\sigma_{ran,(\tau,\iota,0)}, \phi_{ran,(\tau,\iota,0)}, \alpha_{del,(\tau,\iota,0),j}, \sigma_{del,(\tau,\iota,0)},$ $\phi_{del,(\tau,\iota,0)}, \alpha_{del,(\tau,\iota,1),j}, \sigma_{del,(\tau,\iota,1)}, \phi_{del,(\tau,\iota,1)},$ $\eta_{dec,(t,i)}, \eta_{ran,j',(t,i)}, \eta_{ran,(\tau,\iota,0),(t,i)}, \eta_{del,(\tau,\iota,0),(t,i)},$ $\eta_{del,(\tau,\iota,1),(t,i)}, \psi_0, \psi_1, \xleftarrow{U} \mathbb{F}_q$ (S804: Lower-Level Decryption Element Generation Step)

Using the processing device, the lower-level decryption element generation unit 432 generates a lower-level decryption element $k^*_{L+1,dec}$ which is an element of a delegation key $sk_{L+1}$, as shown in Formula 174.

$$k^*_{L+1,dec} := k^*_{L,dec} + \sum_{j=1}^{2L} \alpha_{dec,j} k^*_{L,ran,j} +$$ [Formula 174]

$$\left\{ \begin{array}{ll} \left(\sigma_{dec}\left(\sum_{i=1}^{n_{L+1}} v_{L+1,i} k^*_{L,del,(L+1,i,0)}\right) \text{ if } \rho_t = 0 \right. \\ (\sigma_{dec}([k^*_{L,del,(L+1,i,1)}]^L + \quad \text{if } \rho_t = 1 \\ \sum_{i=1}^{n_{L+1}} v_{L+1,i} [k^*_{L,del,(L+1,i,1)}]_L \right) \end{array} \right\} +$$

$$\sum_{i=1}^{w_t} \eta_{dec,(0,i)} b^*_{0,1+u_0+1+i} + \sum_{t=1}^{L+1} \sum_{i=1}^{w_t} \eta_{dec,(t,i)} b^*_{t,n_t+u_t+i}$$

(S805: First Lower-Level Randomizing Element Generation Step)

Using the processing device, the lower-level randomizing element generation unit 433 generates a first lower-level randomizing element $k^*_{L+1,ran,j'}$ which is an element of the delegation key $sk_{L+1}$, for each integer j' of $j'=1, \ldots, 2(L+1)$, as shown in Formula 175.

$$k^*_{L+1,ran,j'} := \sum_{j=1}^{2L} \alpha_{ran,j',j} k^*_{L,ran,j} +$$ [Formula 175]

$$\left\{ \begin{array}{ll} \sigma_{ran,j'}\left(\sum_{i=1}^{n_{L+1}} v_{L+1,i} k^*_{L,del,(L+1,i,0)}\right) & \text{if } \rho_t = 0 \\ \sigma_{ran,j'}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L \end{array} \right\} +$$

-continued $$\sum_{i=1}^{w_t} \eta_{ran,j',(0,i)} b^*_{0,1+u_0+1+i} + \sum_{t=1}^{L+1} \sum_{i=1}^{w_t} \eta_{ran,j',(t,i)} b^*_{t,n_t+u_t+i}$$

(S806: Second Lower-Level Randomizing Element Generation Step)

Using the processing device, the lower-level randomizing element generation unit 433 generates a second lower-level randomizing element $k^*_{L+1,ran,(\tau,\iota)}$ which is an element of the delegation key $sk_{L+1}$, for each integer $\tau$ of $\tau=L+2, \ldots, d$ and each integer $\iota$ of $\iota=1, \ldots, n_\tau$ with respect to each integer $\tau$, as shown in Formula 176.

$$k^*_{L+1,ran,(\tau,\iota,0)} := \sum_{j=1}^{2L} \alpha_{ran,(\tau,\iota),j} k^*_{L,ran,j} + \phi_{ran,(\tau,\iota,0)} k^*_{L,ran,(\tau,\iota,0)} +$$

[Formula 176]

$$\begin{cases} \sigma_{ran,(\tau,\iota,0)} \left( \sum_{i=1}^{n_{L+1}} v_{L+1,i} k^*_{L,del,(L+1,i,0)} \right) & \text{if } \rho_t = 0 \\ \sigma_{ran,(\tau,\iota,0)} ([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L ) \end{cases} +$$

$$\sum_{i=1}^{w_t} \eta_{del,(\tau,\iota,0),(0,i)} b^*_{0,1+u_0+1+i} +$$

$$\sum_{t=1}^{L+1} \sum_{i=1}^{w_t} \eta_{del,(\tau,\iota,0),(t,i)} b^*_{t,n_t+u_t+i} + \sum_{i=1}^{w_\tau} \eta_{del,(\tau,\iota,0),(\tau,i)} b^*_{\tau,n_\tau+u_\tau+i}$$

(S807: First Lower-Level Delegation Element Generation Step)

Using the processing device, the lower-level delegation element generation unit 434 generates a first lower-level delegation element $k^*_{L+1,del,(\tau,\iota,0)}$ which is an element of the delegation key $sk_{L+1}$, for each integer $\tau$ of $\tau=L+2, \ldots, d$ and each integer $\iota$ of $\iota=1, \ldots, n_\tau$ with respect to each integer $\tau$, as shown in Formula 177.

$$k^*_{L+1,del,(\tau,\iota,0)} :=$$

[Formula 177]

$$\sum_{j=1}^{2L} \alpha_{del,(\tau,\iota,0),j} k^*_{L,ran,j} + \phi_{del,(\tau,\iota,0)} k^*_{L,ran,(\tau,\iota,0)} + \psi_0 k^*_{L,del,(\tau,\iota,0)} +$$

$$\begin{cases} \sigma_{del,(\tau,\iota,0)} \left( \sum_{i=1}^{n_{L+1}} v_{L+1,i} k^*_{L,del,(L+1,i,0)} \right) & \text{if } \rho_t = 0 \\ \sigma_{del,(\tau,\iota,0)} ([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L ) \end{cases} +$$

$$\sum_{i=1}^{w_t} \eta_{del,(\tau,\iota,0),(0,i)} b^*_{0,1+u_0+1+i} +$$

$$\sum_{t=1}^{L+1} \sum_{i=1}^{w_t} \eta_{del,(\tau,\iota,0),(t,i)} b^*_{t,n_t+u_t+i} + \sum_{i=1}^{w_\tau} \eta_{del,(\tau,\iota,0),(\tau,i)} b^*_{\tau,n_\tau+u_\tau+i}$$

(S808: Second Lower-Level Delegation Element Generation Step)

Using the processing device, the lower-level delegation element generation unit 434 generates a second lower-level delegation element $k^*_{L+1,del,(\tau,\iota,1)}$ which is an element of the delegation key $sk_{L+1}$, for each integer $\tau$ of $\tau=L+2, \ldots, d$ and each integer $\iota$ of $\iota=1, \ldots, n_\tau$ with respect to each integer $\tau$, as shown in Formula 178.

$$k^*_{L+1,del,(\tau,\iota,1)} := \sum_{j=1}^{2L} \alpha_{del,(\tau,\iota,1),j} k^*_{L,ran,j} + \psi_1 k^*_{L,del,(\tau,\iota,1)} +$$

[Formula 178]

$$\begin{cases} \sigma_{del,(\tau,\iota,1)} \left( \sum_{i=1}^{n_{L+1}} v_{L+1,i} k^*_{L,del,(L+1,i,0)} \right) & \text{if } \rho_t = 0 \\ \sigma_{del,(\tau,\iota,1)} ([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L ) \end{cases} +$$

$$\sum_{i=1}^{w_t} \eta_{del,(\tau,\iota,1),(0,i)} b^*_{0,1+u_0+1+i} +$$

$$\sum_{t=1}^{L+1} \sum_{i=1}^{w_t} \eta_{del,(\tau,\iota,1),(t,i)} b^*_{t,n_t+u_t+i} + \sum_{i=1}^{w_\tau} \eta_{del,(\tau,\iota,1),(\tau,i)} b^*_{\tau,n_\tau+u_\tau+i}$$

(S809: Key Distribution Step)

Using the communication device and through the network, for example, the key distribution unit 150 secretly provides to the lower-level decryption device 300 the delegation key $sk_{L+1}$ having elements of the lower-level decryption element $k^*_{L+1,dec}$, the first lower-level randomizing element $k^*_{L+1,ran,j'}$ (j'=1, \ldots, 2(L+1)), the second lower-level randomizing element $k^*_{L+1,ran,(\tau,\iota,0)}$ ($\tau$=L+2, \ldots, d; $(\tau,\iota)$=$(\tau,1), \ldots, (\tau,n_\tau)$), the first lower-level delegation element $k^*_{L+2,del,(\tau,\iota,0)}$ ($\tau$=L+2, \ldots, d; $(\tau,\iota)$=$(\tau,1), \ldots, (\tau,n_\tau)$), and the second lower-level delegation element $k^*_{L+2,del,(\tau,\iota,1)}$ ($\tau$=L+2, \ldots, d; $(\tau,\iota)$=$(\tau,1), \ldots, (\tau,n_\tau)$). It is obvious that the delegation key $sk_{L+1}$ may be provided to the lower-level decryption device 300 by other methods.

To summarize, in (S501) to (S507), the key delegation device 400 executes the $Delegate_L$ algorithm shown in Formulas 179 and 180, and generates the delegation key $sk_{L+1}$. Then, in (S508), the key delegation device 400 provides the generated delegation key $sk_{L+1}$ to the lower-level decryption device 300.

$Delegate_L(pk, sk_L,$  [Formula 179]

$(\vec{v}_{L+1}, \rho_{L+1}) := ((v_{L+1,1}, \ldots, v_{L+1,n_{L+1}}), \rho_{L+1}))$:

for $j = 1, \ldots, 2L; j' = 1, \ldots, 2(L+1);$ $\tau = L+2, \ldots, d; (\tau, \iota) = (\tau, 1), \ldots, (\tau, n_\tau);$ $t = 0, \ldots, L+1, \tau; (t, i) = (t=1), \ldots, (t, w_t);$ $\alpha_{dec,j}, \sigma_{dec}, \alpha_{ran,j',j}, \sigma_{ran,j'}, \alpha_{ran,(\tau,\iota,0),j},$ $\sigma_{ran,(\tau,\iota,0)}, \phi_{ran,(\tau,\iota,0)}, \alpha_{del,(\tau,\iota,0),j}, \sigma_{del,(\tau,\iota,0)},$ $\phi_{del,(\tau,\iota,0)}, \alpha_{del,(\tau,\iota,1),j}, \sigma_{del,(\tau,\iota,1)}, \phi_{del,(\tau,\iota,1)},$ $\eta_{dec,(t,i)}, \eta_{ran,j',(t,i)}, \eta_{ran,(\tau,\iota,0),(t,i)}, \eta_{del,(\tau,\iota,0),(t,i)},$ $\eta_{del,(\tau,\iota,1),(t,i)}, \psi_0, \psi_1, \xleftarrow{U} \mathbb{F}_q,$ -continued $$k^*_{L+1,dec} := k^*_{L,dec} + \sum_{j=1}^{2L} \alpha_{dec,j} k^*_{L,ran,j} +$$

$$\begin{Bmatrix} \sigma_{dec}\left(\sum_{i=1}^{n_{L+1}} v_{L+1,i} k^*_{L,del,(L+1,i,0)}\right) & \text{if } \rho_t = 0 \\ (\sigma_{dec}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L) \end{Bmatrix} +$$

$$\sum_{i=1}^{w_t} \eta_{dec,(0,i)} b^*_{0,1+u_0+1+i} + \sum_{t=1}^{L+1}\sum_{i=1}^{w_t} \eta_{dec,(t,i)} b^*_{t,n_t+u_t+i},$$

$$k^*_{L+1,ran,j'} := \sum_{j=1}^{2L} \alpha_{ran,j',j} k^*_{L,ran,j} +$$

$$\begin{Bmatrix} \sigma_{ran,j'}\left(\sum_{i=1}^{n_{L+1}} v_{L+1,i} k^*_{L,del,(L+1,i,0)}\right) & \text{if } \rho_t = 0 \\ \sigma_{ran,j'}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L) \end{Bmatrix} +$$

$$\sum_{i=1}^{w_t} \eta_{ran,j',(0,i)} b^*_{0,1+u_0+1+i} + \sum_{t=1}^{L+1}\sum_{i=1}^{w_t} \eta_{ran,j',(t,i)} b^*_{t,n_t+u_t+i},$$

$$k^*_{L+1,ran,(\tau,l,0)} := \sum_{j=1}^{2L} \alpha_{ran,(\tau,l)j} k^*_{L,ran,j} + \phi_{ran,(\tau,l,0)} k^*_{L,ran,(\tau,l,0)} +$$

$$\begin{Bmatrix} \sigma_{ran,(\tau,l,0)}\left(\sum_{i=1}^{n_{L+1}} v_{L+1,i} k^*_{L,del,(L+1,i,0)}\right) & \text{if } \rho_t = 0 \\ \sigma_{ran,(\tau,l,0)}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L) \end{Bmatrix} +$$

$$\sum_{i=1}^{w_t} \eta_{del,(\tau,l,0),(0,i)} b^*_{0,1+u_0+1+i} +$$

$$\sum_{t=1}^{L+1}\sum_{i=1}^{w_t} \eta_{del,(\tau,l,0),(t,i)} b^*_{t,n_t+u_t+i} + \sum_{i=1}^{w_\tau} \eta_{del,(\tau,l,0),(\tau,i)} b^*_{\tau,n_\tau+u_\tau+i},$$

$$k^*_{L+1,del,(\tau,l,0)} :=$$ [Formula 180]

$$\sum_{j=1}^{2L} \alpha_{del,(\tau,l,0),j} k^*_{L,ran,j} + \phi_{del,(\tau,l,0)} k^*_{L,ran(\tau,l,0)} + \psi_0 k^*_{L,del(\tau,l,0)} +$$

$$\begin{Bmatrix} \sigma_{del,(\tau,l,0)}\left(\sum_{i=1}^{n_{L+1}} v_{L+1,i} k^*_{L,del,(L+1,i,0)}\right) & \text{if } \rho_t = 0 \\ \sigma_{del,(\tau,l,0)}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L) \end{Bmatrix} +$$

$$\sum_{i=1}^{w_t} \eta_{del,(\tau,l,0),(0,i)} b^*_{0,1+u_0+1+i} +$$

$$\sum_{t=1}^{L+1}\sum_{i=1}^{w_t} \eta_{del,(\tau,l,0),(t,i)} b^*_{t,n_t+u_t+i} + \sum_{i=1}^{w_\tau} \eta_{del,(\tau,l,0),(\tau,i)} b^*_{\tau,n_\tau+u_\tau+i},$$

$$k^*_{L+1,del,(\tau,l,1)} := \sum_{j=1}^{2L} \alpha_{del,(\tau,l,1),j} k^*_{L,ran,j} + \psi_1 k^*_{L,del(\tau,l,1)} +$$

$$\begin{Bmatrix} \sigma_{del,(\tau,l,1)}\left(\sum_{i=1}^{n_{L+1}} v_{L+1,i} k^*_{L,del,(L+1,i,0)}\right) & \text{if } \rho_t = 0 \\ \sigma_{del,(\tau,l,1)}([k^*_{L,del,(L+1,i,1)}]^L + & \text{if } \rho_t = 1 \\ \sum_{i=1}^{n_{L+1}} v_{L+1,i} [k^*_{L,del,(L+1,i,1)}]_L) \end{Bmatrix} +$$

$$\sum_{i=1}^{w_t} \eta_{del,(\tau,l,1),(0,i)} b^*_{0,1+u_0+1+i} +$$

$$\sum_{t=1}^{L+1}\sum_{i=1}^{w_t} \eta_{del,(\tau,l,1),(t,i)} b^*_{t,n_t+u_t+i} + \sum_{i=1}^{w_\tau} \eta_{del,(\tau,l,1),(\tau,i)} b^*_{\tau,n_\tau+u_\tau+i},$$

$$sk_{L+1} := \bigl((\vec{v}_1, \rho_1), \ldots, (\vec{v}_{L+1}, \rho_{L+1})\bigr);$$

$$k^*_{L+1,dec}, \{k^*_{L+1,ran,j'}\}_{j'=1,\ldots,2(L+1)},$$

$$\{k^*_{L+1,ran,(\tau,l,0)}, k^*_{L+1,del,(\tau,l,0)},$$

$$k^*_{L+1,del,(\tau,l,1)}\}_{\tau=L+2,\ldots,d;(\tau,l)=(\tau,1),\ldots,(\tau,n_\tau)}\bigr),$$

return $sk_{L+1}$.

When the lower-level decryption device 300 executes the Dec algorithm using the delegation key $sk_{L+1}$, the session key K is computed by computing Formula 170 if the inner product of $(v_1, \ldots, v_{L+1})$ and $(x_1, \ldots, x_{L+1})$ is 0 in (S403) of FIG. 15.

As described above, the cryptographic processing system 10 according to the second embodiment realizes the HPE scheme for inner products that allows decryption if the inner product of the attribute information and the predicate information is 0 for some portions and if the inner product of the attribute information and the predicate information is not 0 for the remaining portions. Therefore, it is possible to set a combination of positive and negative conditions and so on, for example.

In the above description, dimensions $u_t$, $w_t$, and $z_t$ (t=0, ..., d) are provided for enhanced security. Therefore, at the cost of reduced security, dimensions $u_t$, $w_t$, and $z_t$ (t=0, ..., d) may be omitted by setting $u_t$, $w_t$, and $z_t$ (t=0, ..., d) respectively to 0.

In the above description, $1+u_0+1+w_0+z_0$ is set in $N_0$ and $n_t+u_t+w_t+z_t$ is set in $N_t$. However, $1+u_0+1+w_0+z_0$ may be replaced with $1+1+1+1+1$ so that 5 is set in $N_0$, and $n_t+u_t+w_t+z_t$ may be replaced with $n_t+n_t+n_t+1$ so that $3n_t+1$ is set in $N_t$.

In this case, the KeyGen algorithm shown in Formulas 168 and 169 are rewritten as shown in Formulas 181 and 182.

$$KeyGen(pk, sk, (\vec{v}_1, \rho_1), \ldots, (\vec{v}_L, \rho_L)) :=$$ [Formula 181]

$$(((v_{1,1}, \ldots, v_{1,n_1}) \in \mathbb{F}_q^{n_1}, \rho_1 \in \{0, 1\}), \ldots,$$

$$((v_{L,1}, \ldots, v_{L,n_L}) \in \mathbb{F}_q^{n_L}, \rho_L \in \{0, 1\})):$$

for $$j = 1, \ldots, 2L;$$

$$\tau = L+1, \ldots, d; (\tau, l) = (\tau, 1), \ldots, (\tau, n_\tau);$$

$$\psi, s_{dec,t}, s_{ran,j,t} \xleftarrow{U} \mathbb{F}_q (t=1,\ldots,L);$$

$$\theta_{dec,t}, \theta_{ran,j,t} \xleftarrow{U} \mathbb{F}_q,$$

$$\vec{\eta}_{dec,t}, \vec{\eta}_{ran,j,t}, \vec{\eta}_{ran,0,t}, \vec{\eta}_{del,0,t}, \vec{\eta}_{del,1,t} \xleftarrow{U} \mathbb{F}_q^{n_t} \ (t=0,\ldots,L);$$

$$s_{ran,0,t}, s_{del,0,t}, s_{del,1,t} \xleftarrow{U} \mathbb{F}_q,$$

$$\theta_{ran,0,t}, \theta_{del,0,t}, \theta_{del,1,t} \xleftarrow{U} \mathbb{F}_q,$$

$$\vec{\eta}_{ran,0,(\tau,1)}, \vec{\eta}_{del,0,(\tau,1)}, \vec{\eta}_{del,1,(\tau,1)} \xleftarrow{U} \mathbb{F}_q^{n_t}, (t=0,\ldots,L+1);$$

$$s_{dec,0} := \sum_{t=1}^{L} s_{dec,t}, \quad s_{ran,j,0} := \sum_{t=1}^{L} s_{ran,j,t}, \quad s_{ran,0,0} := \sum_{t=1}^{L} s_{ran,0,t},$$

$$s_{del,0,0} := \sum_{t=1}^{L+1} s_{del,0,t}, \quad s_{del,1,0} := \sum_{t=1}^{L+1} s_{del,1,t},$$

$$k^*_{L,dec} := ((-s_{dec,0}, 0, 1, \eta_{dec,0}, 0)_{\mathbb{B}_0^*},$$

$$\left\{ \begin{array}{ll} (s_{dec,t}\vec{e}_{t,1} + \theta_{dec,t}\vec{v}_t, 0^{n_t}, \vec{\eta}_{dec,t}, 0)_{\mathbb{B}_t^*}, & \text{if } \rho_t = 0 \\ (s_{dec,t}\vec{v}_t, 0^{n_t}, \vec{\eta}_{dec,t}, 0)_{\mathbb{B}_t^*}, & \text{if } \rho_t = 1 \end{array} \right\} : t = 1,\ldots,L \Bigg\rangle,$$

$$k^*_{L,ran,j} := ((-s_{ran,j,0}, 0, 0, \eta_{ran,j,0}, 0)_{\mathbb{B}_0^*},$$

$$\left\{ \begin{array}{ll} (s_{ran,j,t}\vec{e}_{t,1} + \theta_{ran,j,t}\vec{v}_t, 0^{n_t}, \vec{\eta}_{ran,j,t}, 0)_{\mathbb{B}_t^*}, & \text{if } \rho_t = 0 \\ (s_{ran,j,t}\vec{v}_t, 0^{n_t}, \vec{\eta}_{ran,j,t}, 0)_{\mathbb{B}_t^*}, & \text{if } \rho_t = 1 \end{array} \right\} : t = 1,\ldots,L \Bigg\rangle,$$

$$k^*_{L,ran,(\tau,l,0)} := ((-s_{ran,0,0}, 0, 0, \eta_{ran,0,0}, 0)_{\mathbb{B}_0^*}, \quad \text{[Formula 182]}$$

$$\left\{ \begin{array}{ll} (s_{ran,0,t}\vec{e}_{t,1} + \theta_{ran,0,t}\vec{v}_t, 0^{n_t}, \vec{\eta}_{ran,0,t}, 0)_{\mathbb{B}_t^*}, & \text{if } \rho_t = 0 \\ (s_{ran,0,t}\vec{v}_t, 0^{n_t}, \vec{\eta}_{ran,0,t}, 0)_{\mathbb{B}_t^*}, & \text{if } \rho_t = 1 \end{array} \right\} : t = 1,\ldots,L \Bigg\rangle,$$

$$(s_{ran,0,L+1}\vec{e}_{\tau,1}, 0^{n_\tau}, \vec{\eta}_{ran,0,(\tau,l)}, 0)_{\mathbb{B}_\tau^*}),$$

$$k^*_{L,del,(\tau,l,0)} := ((-s_{del,0,0}, 0, 0, \eta_{del,0,0}, 0)_{\mathbb{B}_0^*},$$

$$\left\{ \begin{array}{ll} (s_{del,0,t}\vec{e}_{t,1} + \theta_{del,0,t}\vec{v}_t, 0^{n_t}, \vec{\eta}_{del,0,t}, 0)_{\mathbb{B}_t^*}, & \text{if } \rho_t = 0 \\ (s_{del,0,t}\vec{v}_t, 0^{n_t}, \vec{\eta}_{del,0,t}, 0)_{\mathbb{B}_t^*}, & \text{if } \rho_t = 1 \end{array} \right\} : t = 1,\ldots,L \Bigg\rangle,$$

$$(s_{del,0,L+1}\vec{e}_{\tau,l}, \psi\vec{e}_{\tau,l}, 0^{n_\tau}, \vec{\eta}_{del,0,(\tau,l)}, 0)_{\mathbb{B}_\tau^*})$$

$$k^*_{L,del,(\tau,l,1)} := ((-s_{del,1,0}, 0, 0, \eta_{del,1,0}, 0)_{\mathbb{B}_0^*},$$

$$\left\{ \begin{array}{ll} (s_{del,1,t}\vec{e}_{t,1} + \theta_{del,1,t}\vec{v}_t, 0^{n_t}, \vec{\eta}_{del,1,t}, 0)_{\mathbb{B}_t^*}, & \text{if } \rho_t = 0 \\ (s_{del,1,t}\vec{v}_t, 0^{n_t}, \vec{\eta}_{del,1,t}, 0)_{\mathbb{B}_t^*}, & \text{if } \rho_t = 1 \end{array} \right\} : t = 1,\ldots,L \Bigg\rangle,$$

$$(s_{del,1,L+1}\vec{e}_{\tau,l}, 0^{n_\tau}, \vec{\eta}_{del,1,(\tau,l)}, 0)_{\mathbb{B}_\tau^*}),$$

$$sk_L :=$$

$$\left( \begin{array}{l} ((\vec{v}_1,\rho_1),\ldots,(\vec{v}_L,\rho_L)); k^*_{L,dec}, \{k^*_{L,ran,j}\}_{j=1,\ldots,2L}, \\ \left\{ \begin{array}{l} k^*_{L,ran,(\tau,l,0)}, k^*_{L,del,(\tau,l,0)}, \\ k^*_{L,del,(\tau,l,1)} \end{array} \right\}_{\tau=L+1,\ldots,d;(\tau,l)=(\tau,1),\ldots,(\tau,n_\tau)} \end{array} \right),$$

return $sk_L$.

The Delegate$_L$ algorithm shown in Formulas 179 and 180 are rewritten as shown in Formulas 183 and 184.

[Formula 183]

$$\text{Delegate}_L(pk, sk_L, (\vec{v}_{L+1}, \rho_{L+1}) := ((v_{L+1},\ldots,v_{L+1,n_{L+1}}), \rho_{L+1})):$$

for $j = 1,\ldots,2L;$ $j' = 1,\ldots,2(L+1);$ $\tau = L+2,\ldots,d;$ $(\tau, l) = (\tau, 1),\ldots,(\tau, n_\tau);$ $t = 0,\ldots,L+1,\tau;$ $(t, i) = (t, 1),\ldots,(t, n_t);$ $\alpha_{dec,j}, \sigma_{dec}, \alpha_{ran,j',j}, \sigma_{ran,j'}, \alpha_{ran,(\tau,l,0),j}, \sigma_{ran,(\tau,l,0)}, \phi_{ran,(\tau,l,0)},$ $\alpha_{del,(\tau,l,0)}, \sigma_{del,(\tau,l,0)}, \phi_{del,(\tau,l,0)}, \alpha_{del,(\tau,l,1),j}, \sigma_{del,(\tau,l,1)}, \phi_{del,(\tau,l,1)},$ $\eta_{dec,(t,i)}, \eta_{ran,j',(t,i)}, \eta_{ran,(\tau,l,0),(t,i)}, \eta_{del,(\tau,l,0),(t,i)}, \eta_{del,(\tau,l,1),(t,i)},$ $\psi_0, \psi_1, \xleftarrow{U} \mathbb{F}_q,$ -continued $$k^*_{L+1,dec} := k^*_{L,dec} + \sum_{j=1}^{2L} \alpha_{dec,j} k^*_{L,ran,j} + \begin{cases} \left(\sigma_{dec}\left(\sum_{i=1}^{n_{L+1}} v_{L+1,i} k^*_{L,del,(L+1,i,0)}\right)\right) & \text{if } \rho_t = 0 \\ \left(\sigma_{dec}\left([k^*_{L,del,(L+1,i,1)}]^L + \sum_{i=1}^{n_{L+1}} v_{L+1,i} [k^*_{L,del,(L+1,i,1)}]_L\right)\right) & \text{if } \rho_t = 1 \end{cases} + \eta_{dec,(0,1)} b^*_{0,4} + \sum_{t=1}^{L+1}\sum_{i=1}^{n_t} \eta_{dec,(t,i)} b^*_{t,2n_t+i},$$

$$k^*_{L+1,ran,j'} :=$$

$$\sum_{j=1}^{2L} \alpha_{ran,j',j} k^*_{L,ran,j} + \begin{cases} \sigma_{ran,j'}\left(\sum_{i=1}^{n_{L+1}} v_{L+1,i} k^*_{L,del(L+1,i,0)}\right) & \text{if } \rho_t = 0 \\ \sigma_{ran,j'}\left([k^*_{L,del,(L+1,i,1)}]^L + \sum_{i=1}^{n_{L+1}} v_{L+1,i} [k^*_{L,del,(L+1,i,1)}]_L\right) & \text{if } \rho_t = 1 \end{cases} + \eta_{ran,j',(0,1)} b^*_{0,4} + \sum_{t=1}^{L+1}\sum_{i=1}^{n_t} \eta_{ran,j',(t,i)} b^*_{t,2n_t+i},$$

$$k^*_{L+1,ran,(\tau,l,0)} := \sum_{j=1}^{2L} \alpha_{ran,(\tau,l),j} k^*_{L,ran,j} + \phi_{ran,(\tau,l,0)} k^*_{L,ran,(\tau,l,0)} + \begin{cases} \sigma_{ran,(\tau,l,0)}\left(\sum_{i=1}^{n_{L+1}} v_{L+1,i} k^*_{L,del,(L+1,i,0)}\right) & \text{if } \rho_t = 0 \\ \sigma_{ran,(\tau,l,0)}\left([k^*_{L,del,(L+1,i,1)}]^L + \sum_{i=1}^{n_{L+1}} v_{L+1,i} [k^*_{L,del,(L+1,i,1)}]_L\right) & \text{if } \rho_t = 1 \end{cases} +$$

$$\eta_{del,(\tau,l,0),(0,1)} b^*_{0,4} + \sum_{t=1}^{L+1}\sum_{i=1}^{n_t} \eta_{del,(\tau,l,0),(t,i)} b^*_{t,2n_t+i} + \sum_{i=1}^{n_\tau} \eta_{del,(\tau,l,0),(\tau,i)} b^*_{\tau,2n_\tau+i},$$

[Formula 184]

$$k^*_{L+1,del,(\tau,l,0)} := \sum_{j=1}^{2L} \alpha_{del,(\tau,l,0),j} k^*_{L,ran,j} + \phi_{del,(\tau,l,0)} k^*_{L,ran(\tau,l,0)} + \psi_0 k^*_{L,del(\tau,l,0)} + \begin{cases} \sigma_{del,(\tau,l,0)}\left(\sum_{i=1}^{n_{L+1}} v_{L+1,i} k^*_{L,del,(L+1,i,0)}\right) & \text{if } \rho_t = 0 \\ \sigma_{del,(\tau,l,0)}\left([k^*_{L,del,(L+1,i,1)}]^L + \sum_{i=1}^{n_{L+1}} v_{L+1,i} [k^*_{L,del,(L+1,i,1)}]_L\right) & \text{if } \rho_t = 1 \end{cases} +$$

$$\eta_{del,(\tau,l,0),(0,1)} b^*_{0,4} + \sum_{t=1}^{L+1}\sum_{i=1}^{n_t} \eta_{del,(\tau,l,0),(t,i)} b^*_{t,2n_t+i} + \sum_{i=1}^{n_\tau} \eta_{del,(\tau,l,0),(\tau,i)} b^*_{\tau,2n_\tau+i},$$

$$k^*_{L+1,del,(\tau,l,1)} := \sum_{j=1}^{2L} \alpha_{del,(\tau,l,1),j} k^*_{L,ran,j} + \psi_1 k^*_{L,del(\tau,l,1)} + \begin{cases} \sigma_{del,(\tau,l,1)}\left(\sum_{i=1}^{n_{L+1}} v_{L+1,i} k^*_{L,del,(L+1,i,0)}\right) & \text{if } \rho_t = 0 \\ \sigma_{del,(\tau,l,1)}\left([k^*_{L,del,(L+1,i,1)}]^L + \sum_{i=1}^{n_{L+1}} v_{L+1,i} [k^*_{L,del,(L+1,i,1)}]_L\right) & \text{if } \rho_t = 1 \end{cases} +$$

$$\eta_{del,(\tau,l,1),(0,1)} b^*_{0,4} + \sum_{t=1}^{L+1}\sum_{i=1}^{n_t} \eta_{del,(\tau,l,1),(t,i)} b^*_{t,2n_t+i} + \sum_{i=1}^{n_\tau} \eta_{del,(\tau,l,1),(\tau,i)} b^*_{\tau,2n_\tau+i},$$

$$sk_{L+1} := ((({\vec{v}_1}, \rho_1), \ldots, ({\vec{v}_{L+1}}, \rho_{L+1})); k^*_{L+1,dec}, \{k^*_{L+1,ran,j'}\}_{j'=1,\ldots,2(L+1)},$$
$$\{k^*_{L+1,ran,(\tau,l,0)}, k^*_{L+1,del,(\tau,l,0)}, k^*_{L+1,del,(\tau,l,1)}\}_{\tau=L+2,\ldots,d;(\tau,l)=(\tau,1),\ldots,(\tau,n_\tau)}),$$

return $sk_{L+1}$.

The Dec algorithm shown in Formula 172 remains the same.

The Setup algorithm needs to be executed once when the cryptographic processing system 10 is set up, and does not have to be executed each time a decryption key is generated. In the above description, the Setup algorithm and the KeyGen algorithm are executed by the key generation device 100. However, the Setup algorithm and the KeyGen algorithm may be executed by different devices.

Third Embodiment

In the above embodiments, the methods for implementing the cryptographic processes in dual vector spaces have been described. In this embodiment, a method for implementing the cryptographic processes in dual modules will be described.

That is, in the above embodiments, the cryptographic processes are implemented in cyclic groups of prime order q. However, when a ring R is expressed using a composite number M as shown in Formula 185, the cryptographic processes described in the above embodiments can be adapted to a module having the ring R as a coefficient.

$$\mathbb{R} := \mathbb{Z}/M\mathbb{Z} \quad \text{[Formula 185]}$$

where $\mathbb{Z}$: integer,

M: composite number.

When the HPE scheme described in the first embodiment is implemented in the module having the R as the coefficient, the HPE scheme is represented as shown in Formulas 186 to 193.

$$\text{Setup}(1^\lambda, \vec{n} := (d; n_1, \ldots, n_d, \quad \text{[Formula 186]}$$
$$u_0, \ldots, u_d, w_0, \ldots, w_d, z_0, \ldots, z_d)):$$
$$(param_{\vec{n}}, \{\mathbb{B}_t, \mathbb{B}^*_t\}_{t=0,\ldots,d}) \xleftarrow{R} \mathcal{G}_{ob}(1^\lambda, \vec{n}),$$

-continued $\hat{\mathbb{B}}_0 := (b_{0,1}, b_{0,1+u_0+1}, b_{0,1+u_0+1+w_0+1}, \ldots, b_{0,1+u_0+1+w_0+z_0}),$ $\hat{\mathbb{B}}_t := (b_{t,1}, \ldots, b_{t,n_t}, b_{t,n_t+u_t+w_t+1}, \ldots, b_{t,n_t+u_t+w_t+z_t})$ for $t = 1, \ldots, d,$ $\quad \hat{\mathbb{B}}_0^* := (b_{0,1}^*, b_{0,1+u_0+1}^*),$ $\quad \hat{\mathbb{B}}_t^* := (b_{t,1}^*, \ldots, b_{t,n_t}^*)$ $\quad$ for $t = 1, \ldots, d,$ $pk := (1^\lambda, param_{\vec{n}}, \{\hat{\mathbb{B}}_t\}_{t=0,\ldots,d}, b_{0,1+u_0+1+1}^*, \ldots,$
$\qquad b_{0,1+u_0+1+w_0}^*, \{b_{t,n_t+u_t+1}^*, \ldots, b_{t,n_t+u_t+w_t}^*\}_{t=1,\ldots,d}),$ $sk := \{\hat{\mathbb{B}}_t^*\}_{t=0,\ldots,d},$ return $pk, sk.$ $\mathcal{G}_{ob}(1^\lambda, \vec{n} := (d; \vec{n} := (d; n_1, \ldots, n_d,$   [Formula 187]
$\qquad u_0, \ldots, u_d, w_0, \ldots, w_d, z_0, \ldots, z_d)$ $N_0 := 1 + u_0 + 1 + w_0 + z_0, N_t := n_t + u_t + w_t + z_t$ for $t = 1, \ldots, d,$ $\quad param_{\mathbb{G}} := (q, \mathbb{G}, \mathbb{G}_T, g, e) \xleftarrow{R} \mathcal{G}_{bpg}(1^\lambda),$ $\psi \xleftarrow{U} \mathbb{R}^\times,$ For $t = 0, \ldots, d,$ $param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}}),$ $X_t := (\chi_{t,i,j})_{i,j} \xleftarrow{U} GL(N_t, \mathbb{R}), (\nu_{t,i,j})_{i,j} := \psi \cdot (X_t^T)^{-1},$ $b_{t,i} := (\chi_{t,i,1}, \ldots, \chi_{t,i,N_t})_{\mathbb{A}_t} = \sum_{j=1}^{N_t} \chi_{t,i,j} a_{t,j},$ $\mathbb{B}_t := (b_{t,1}, \ldots, b_{t,N_t}),$ $b_{t,i}^* := (\nu_{t,i,1}, \ldots, \nu_{t,i,N_t})_{\mathbb{A}_t} = \sum_{j=1}^{N_t} \nu_{t,i,j} a_{t,j},$ $\mathbb{B}_t^* := (b_{t,1}^*, \ldots, b_{t,N_t}^*), g_T := e(g,g)^\psi,$ $param_{\vec{n}} := (\{param_{\mathbb{V}_t}\}_{t=0,\ldots,d}, g_T)$ return $(param_{\vec{n}}, \{\mathbb{B}_t, \mathbb{B}_t^*\}_{t=0,\ldots,d}).$ $KeyGen(pk, sk, \vec{v}_1, \ldots, \vec{v}_L) := (\nu_{1,1}, \ldots, \nu_{1,n_1}), \ldots,$   [Formula 188]
$\qquad\qquad\qquad\qquad\qquad (\nu_{L,1}, \ldots, \nu_{L,n_L})) :$ for $j = 1, \ldots, 2L;$ $\tau = L + 1, \ldots, d;$ $(\tau, l) = (\tau, 1), \ldots, (\tau, n_\tau);$ $\psi, s_{dec,t}, s_{ran,j,t} \xleftarrow{U} \mathbb{R}(t = 1, \ldots, L);$ $\theta_{dec,t}, \theta_{ran,j,t} \xleftarrow{U} \mathbb{R}, \vec{\eta}_{dec,t}, \vec{\eta}_{ran,j,t} \xleftarrow{U} \mathbb{R}^{w_t} (t = 0, \ldots, L);$ $s_{ran,(\tau,l),t}, s_{del,(\tau,l),t} \xleftarrow{U} \mathbb{R}(t = 1, \ldots, L+1);$ $\theta_{ran,(\tau,l),t}, \theta_{del,(\tau,l),t} \xleftarrow{U} \mathbb{R}, \vec{\eta}_{ran,(\tau,l),t},$ $\vec{\eta}_{del,(\tau,l),t} \xleftarrow{U} \mathbb{R}^{w_t}, (t = 0, \ldots, L+1);$ $s_{dec,0} := \sum_{t=1}^{L} s_{dec,t}, s_{ran,j,0} := \sum_{t=1}^{L} s_{ran,j,t},$ $s_{ran,(\tau,l),0} := \sum_{t=1}^{L+1} s_{ran,(\tau,l),t}, s_{del,(\tau,l),0} := \sum_{t=1}^{L+1} s_{del,(\tau,l),t},$ $k_{L,dec}^* := ((-s_{dec,0}, 0^{u_0}, 1, \vec{\eta}_{dec,0}, 0^{z_0})_{\mathbb{B}_0^*},$   [Formula 189]

$\qquad (s_{dec,t} \vec{e}_{t,1} + \theta_{dec,t} \vec{v}_t, 0^{u_t}, \vec{\eta}_{dec,t}, 0^{z_t})_{\mathbb{B}_t^*} : t = 1, \ldots, L),$ $k_{L,ran,j}^* := ((-s_{ran,j,0}, 0^{u_0}, 0, \vec{\eta}_{ran,j,0}, 0^{z_0})_{\mathbb{B}_0^*},$ $\qquad (s_{ran,j,t} \vec{e}_{t,1} + \theta_{ran,j,t} \vec{v}_t, 0^{u_t}, \vec{\eta}_{ran,j,t}, 0^{z_t})_{\mathbb{B}_t^*} : t = 1, \ldots, L),$ $k_{L,ran,(\tau,l)}^* := ((-s_{ran,(\tau,l),0}, 0^{u_0}, 0, \vec{\eta}_{ran,(\tau,l),0}, 0^{z_0})_{\mathbb{B}_0^*},$ $\qquad (s_{ran,(\tau,l),t} \vec{e}_{t,1} + \theta_{ran,(\tau,l),t} \vec{v}_t, 0^{u_t}, \vec{\eta}_{ran,(\tau,l),t}, 0^{z_t})_{\mathbb{B}_t^*} : t =$ $\qquad 1, \ldots, L, (s_{ran,(\tau,l),L+1} \vec{e}_{\tau,1}, 0^{u_\tau}, \vec{\eta}_{ran,(\tau,l),L+1}, 0^{z_\tau})_{\mathbb{B}_\tau^*}),$ $k_{L,del,(\tau,l)}^* := ((-s_{del,(\tau,l),0}, 0^{u_0}, 0, \vec{\eta}_{del,(\tau,l),0}, 0^{z_0})_{\mathbb{B}_0^*},$ $\qquad (s_{del,(\tau,l),t} \vec{e}_{t,1} + \theta_{del,(\tau,l),t} \vec{v}_t, 0^{u_t}, \vec{\eta}_{del,(\tau,l),t}, 0^{z_t})_{\mathbb{B}_t^*} : t = 1, \ldots,$ $\qquad L, (s_{del,(\tau,l),L+1} \vec{e}_{\tau,1} + \psi \vec{e}_{\tau,l}, 0^{u_\tau}, \vec{\eta}_{del,(\tau,l),L+1}, 0^{z_\tau})_{\mathbb{B}_\tau^*}),$ $sk_L := (k_{L,dec}^*, \{k_{L,ran,j}^*\}_{j=1,\ldots,2L},$ $\qquad \{k_{L,ran,(\tau,l)}^*\}_{\tau=L+1,\ldots,d;(\tau,l)=(\tau,1),\ldots,(\tau,n_\tau)},$ $\qquad \{k_{L,del,(\tau,l)}^*\}_{\tau=L+1,\ldots,d;(\tau,1)=(\tau,1),\ldots,(\tau,n_\tau)}),$ return $sk_L.$ $Enc(pk, m \in \mathbb{G}_T, (\vec{x}_1, \ldots, \vec{x}_L) :=$   [Formula 190]

$\qquad ((x_{1,1}, \ldots, x_{1,n_1}), \ldots, (x_{L,1}, \ldots, x_{L,n_L})) :$ $\qquad (\vec{x}_{L+1}, \ldots, \vec{x}_d) \xleftarrow{U} \mathbb{R}^{n_{L+1}} \times \ldots \times \mathbb{R}^{n_d};$ $\omega, \zeta \xleftarrow{U} \mathbb{R}, \vec{\varphi}_t \xleftarrow{U} \mathbb{R}^{z_t} (t = 0, \ldots, d),$ $c_1 := ((\omega, 0^{u_0}, \zeta, 0^{w_0}, \vec{\varphi}_0)_{\mathbb{B}_0},$ $\qquad (\omega \vec{x}_t, 0^{u_t}, 0^{w_t}, \vec{\varphi}_t)_{\mathbb{B}_t} : t = 1, \ldots, d),$ $c_2 := g_T^\zeta m,$ $ct := (c_1, c_2),$ return $ct.$ $Dec(pk, k_{L,dec}^*, ct) : m' := c_2/e(c_1, k_{L,dec}^*)$   [Formula 191]

return $m'.$ $Delegate_L(pk, sk_L, \vec{v}_{L+1} := (\nu_{L+1,1}, \ldots, \nu_{L+1,n_{L+1}})) ;$   [Formula 192]

for $\quad j = 1, \ldots, 2L;$ $\quad j' = 1, \ldots, 2(L+1);$ $\quad \tau = L + 2, \ldots, d;$ $\quad (\tau, l) = (\tau, l), \ldots, (\tau, n_\tau);$ $\quad t = 0, \ldots, L + 1, \tau;$ $\quad (t, i) = (t, 1), \ldots, (t, w_t);$ $\quad \alpha_{dec,j}, \sigma_{dec}, \alpha_{ran,j',j}, \sigma_{ran,j'}, \alpha_{ran,(\tau,l),j}, \sigma_{ran,(\tau,l)},$ -continued $\phi_{ran,(\tau,l)}, \alpha_{del,(\tau,l),j}, \sigma_{del,(\tau,l)}, \phi_{del,(\tau,l)}, \psi',$ $\eta_{dec,(t,i)}, \eta_{ran,(t,i)}, \eta_{ran,(\tau,l),(t,i)}, \eta_{del,(\tau,l),(t,i)} \xleftarrow{U} \mathbb{R},$

[Formula 193]

$$k^*_{L+1,dec} := k^*_{L,dec} + \sum_{j=1}^{2L} \alpha_{dec,j} k^*_{L,ran,j} + \sigma_{dec}\left(\sum_{i=1}^{n_{L+1}} v_{L+1,i} k^*_{L,del,(L+1,i)}\right) +$$
$$\sum_{i=1}^{w_t} \eta_{dec,(0,i)} b^*_{0,1+u_0+1+i} + \sum_{t=1}^{L+1}\sum_{i=1}^{w_t} \eta_{dec,(t,i)} b^*_{t,n_t+u_t+i},$$

$$k^*_{L+1,ran,j'} := \sum_{j=1}^{2L} \alpha_{ran,j',j} k^*_{L,ran,j} + \sigma_{ran,j'}\left(\sum_{i=1}^{n_{L+1}} v_{L+1,i} k^*_{L,del,(L+1,i)}\right) +$$
$$\sum_{i=1}^{w_t} \eta_{ran,j',(0,i)} b^*_{0,1+u_0+1+i} + \sum_{t=1}^{L+1}\sum_{i=1}^{w_t} \eta_{ran,j',(t,i)} b^*_{t,n_t+u_t+i},$$

$$k^*_{L+1,ran,(\tau,l)} := \sum_{j=1}^{2L} \alpha_{ran,(\tau,l),j} k^*_{L,ran,j} + \sigma_{ran,(\tau,l)}\left(\sum_{i=1}^{n_{L+1}} v_{L+1,i} k^*_{L,del,(L+1,i)}\right) +$$
$$\phi_{ran,(\tau,l)} k^*_{L,ran,(\tau,l)} + \sum_{i=1}^{w_t} \eta_{ran,(\tau,l),(0,i)} b^*_{0,1+u_0+1+i} +$$
$$\sum_{t=1}^{L+1}\sum_{i=1}^{w_t} \eta_{ran,(\tau,l),(t,i)} b^*_{t,n_t+u_t+i} + \sum_{i=1}^{w_\tau} \eta_{ran,(\tau,l),(\tau,i)} b^*_{\tau,n_\tau+u_\tau+i},$$

$$k^*_{L+1,del,(\tau,l)} := \sum_{j=1}^{2L} \alpha_{del,(\tau,i),j} k^*_{L,ran,j} +$$
$$\sigma_{del,(\tau,l)}\left(\sum_{i=1}^{n_{L+1}} v_{L+1,i} k^*_{L,del,(L+1,i)}\right) + \psi' k^*_{L,del,(\tau,l)} +$$
$$\phi_{del,(\tau,l)} k^*_{L,ran(\tau,l)} + \sum_{i=1}^{w_t} \eta_{del,(\tau,l),(0,i)} b^*_{0,1+u_0+1+i} +$$
$$\sum_{t=1}^{L+1}\sum_{i=1}^{w_t} \eta_{del,(\tau,l),(t,i)} b^*_{t,n_t+u_t+i} + \sum_{i=1}^{w_\tau} \eta_{del,(\tau,l),(\tau,i)} b^*_{\tau,n_\tau+u_\tau+i},$$

$sk_{L+1} := \left(k^*_{L+1,dec}, \{k^*_{L+1,ran,j'}\}_{j'=1,\ldots,2(L+1)}, \right.$
$\left.\{k^*_{L+1,ran,(\tau,l)}, k^*_{L+1,del,(\tau,l)}\}_{\tau=L+2,\ldots,d;(\tau,l)=(\tau,1),\ldots,(\tau,n_\tau)}\right),$ return $sk_{L+1}$ When the HPE scheme described in the second embodiment is implemented in the module having the ring R as the coefficient, the HPE scheme is expressed as shown in Formulas 194 to 199. The Setup algorithm and the $G_{ob}$ algorithm are as shown in Formulas 186 and 187 respectively.

[Formula 194]

$KeyGen(pk, sk, (\vec{v}_1, \rho_1), \ldots, (\vec{v}_L, \rho_L)) := (((v_{1,1}, \ldots, v_{1,n_1}) \in \mathbb{R}^{n_1}, \rho_1 \in \{0,1\}), \ldots, ((v_{L,1}, \ldots, v_{L,n_L}) \in \mathbb{R}^{n_L}, \rho_L \in \{0,1\})):$ for
$j = 1, \ldots, 2L;$
$\tau = L+1, \ldots, d;$
$(\tau, l) = (\tau, 1), \ldots, (\tau, n_\tau);$
$\psi, s_{dec,t}, s_{ran,j,t} \xleftarrow{U} \mathbb{R}(t = 1, \ldots, L);$
$\theta_{dec,t}, \theta_{ran,j,t} \xleftarrow{U} \mathbb{R},$
$\vec{\eta}_{dec,t}, \vec{\eta}_{ran,j,t}, \vec{\eta}_{ran,0,t}, \vec{\eta}_{del,0,t}, \vec{\eta}_{del,1,t} \xleftarrow{U} \mathbb{R}^{w_t} (t = 0, \ldots, L);$
$s_{ran,0,t}, s_{del,0,t}, s_{del,1,t} \xleftarrow{U} \mathbb{R},$
$\theta_{ran,0,t}, \theta_{del,0,t}, \theta_{del,1,t} \xleftarrow{U} \mathbb{R},$ $\vec{\eta}_{ran,0,(\tau,l)}, \vec{\eta}_{del,0,(\tau,l)}, \vec{\eta}_{del,1,(\tau,l)} \xleftarrow{U} \mathbb{R}^{w_t}, (t = 0, \ldots, L+1);$ $s_{dec,0} := \sum_{t=1}^{L} s_{dec,t}, \quad s_{ran,j,0} := \sum_{t=1}^{L} s_{ran,j,t}, \quad s_{ran,0,0} := \sum_{t=1}^{L} s_{ran,0,t},$ $s_{del,0,0} := \sum_{t=1}^{L+1} s_{del,0,t}, \quad s_{del,1,0} := \sum_{t=1}^{L+1} s_{del,1,t},$ $k^*_{L,dec} := \left(\left(-s_{dec,0}, 0^{u_0}, 1, \vec{\eta}_{dec,0}, 0^{z_0}\right)_{\mathbb{B}^*_0}, \begin{cases} \left(s_{dec,t}\vec{e}_{t,1} + \theta_{dec,t}\vec{v}_t, 0^{u_t}, \vec{\eta}_{dec,t}, 0^{z_t}\right)_{\mathbb{B}^*_t}, & \text{if } \rho_t = 0 \\ \left(s_{dec,t}\vec{v}_t, 0^{u_t}, \vec{\eta}_{dec,t}, 0^{z_t}\right)_{\mathbb{B}^*_t}, & \text{if } \rho_t = 1 \end{cases} : t = 1, \ldots, L\right),$ $k^*_{L,ran,j} := \left(\left(-s_{ran,j,0}, 0^{u_0}, 0, \vec{\eta}_{ran,j,0}, 0^{z_0}\right)_{\mathbb{B}^*_0}, \begin{cases} \left(s_{ran,j,t}\vec{e}_{t,1} + \theta_{ran,j,t}\vec{v}_t, 0^{u_t}, \vec{\eta}_{ran,j,t}, 0^{z_t}\right)_{\mathbb{B}^*_t}, & \text{if } \rho_t = 0 \\ \left(s_{ran,j,t}\vec{v}_t, 0^{u_t}, \vec{\eta}_{ran,j,t}, 0^{z_t}\right)_{\mathbb{B}^*_t}, & \text{if } \rho_t = 1 \end{cases} : t = 1, \ldots, L\right),$ -continued $$k^*_{L,ran,(\tau,l,0)} := \left( \left(-s_{ran,0,0}, 0^{u_0}, 0, \vec{\eta}_{ran,0,0}, 0^{z_0}\right)_{\mathbb{B}^*_0}, \left\{ \begin{array}{ll} \left(s_{ran,0,t}\vec{e}_{t,1} + \theta_{ran,0,t}\vec{v}_t, 0^{u_t}, \vec{\eta}_{ran,0,t}, 0^{z_t}\right)_{\mathbb{B}^*_t}, & \text{if } \rho_t = 0 \\ \left(s_{ran,0,t}\vec{v}_t, 0^{u_t}, \vec{\eta}_{ran,0,t}, 0^{z_t}\right)_{\mathbb{B}^*_t}, & \text{if } \rho_t = 1 \end{array} \right\} : t = 1, \ldots, L \right),$$

$$\left(s_{ran,0,L+1}\vec{e}_{\tau,1}, 0^{u_\tau}, \vec{\eta}_{ran,0,(\tau,l)}, 0^{z_\tau}\right)_{\mathbb{B}^*_\tau},$$

$$k^*_{L,del,(\tau,l,0)} := \left( \left(-s_{del,0,0}, 0^{u_0}, 0, \vec{\eta}_{del,0,0}, 0^{z_0}\right)_{\mathbb{B}^*_0}, \left\{ \begin{array}{ll} \left(s_{del,0,t}\vec{e}_{t,1} + \theta_{del,0,t}\vec{v}_t, 0^{u_t}, \vec{\eta}_{del,0,t}, 0^{z_t}\right)_{\mathbb{B}^*_t}, & \text{if } \rho_t = 0 \\ \left(s_{del,0,t}\vec{v}_t, 0^{u_t}, \vec{\eta}_{del,0,t}, 0^{z_t}\right)_{\mathbb{B}^*_t}, & \text{if } \rho_t = 1 \end{array} \right\} : t = 1, \ldots, L \right),$$

$$\left(s_{del,0,L+1}\vec{e}_{\tau,1}, +\psi\vec{e}_{\tau,l}, 0^{u_\tau}, \vec{\eta}_{del,0,(\tau,l)}, 0^{z_\tau}\right)_{\mathbb{B}^*_\tau},$$

[Formula 195]

$$k^*_{L,del,(\tau,t,1)} := \left( \left(-s_{del,1,0}0^{u_0}, 0, \vec{\eta}_{del,1,0}, 0^{z_0}\right)_{\mathbb{B}^*_0}, \left\{ \begin{array}{ll} \left(s_{del,1,t}\vec{e}_{t,1} + \theta_{del,1,t}\vec{v}_t, 0^{u_t}, \vec{\eta}_{del,1,t}, 0^{z_t}\right)_{\mathbb{B}^*_t} & \text{if } \rho_t = 0 \\ \left(s_{del,1,t}\vec{v}_t, 0^{u_t}, \vec{\eta}_{del,1,t}, 0^{z_t}\right)_{\mathbb{B}^*_t}, & \text{if } \rho_t = 1 \end{array} \right\} : t = 1, \ldots, L \right),$$

$$\left(s_{del,1,L+1}\vec{e}_{\tau,l}, 0^{u_\tau}, \vec{\eta}_{del,1,(\tau,l)}, 0^{z_t}\right)_{\mathbb{B}^*_\tau},$$

$$sk_L := \left( \begin{array}{c} ((\vec{v}_1, \rho_1), \ldots, (\vec{v}_L, \rho_L)); k^*_{L,dec}, \{k^*_{L,ran,j}\}_{j=1,\ldots,2L}, \\ \left\{ \begin{array}{c} k^*_{L,ran,(\tau,l,0)}, k^*_{L,del,(\tau,l,0)}, \\ k^*_{L,del,(\tau,l,1)} \end{array} \right\}_{\tau=L+1,\ldots,d;(\tau,l)=(\tau,1),\ldots,(\tau,n_\tau)} \end{array} \right),$$

return $sk_L$.

$$Enc(pk, m \in \mathbb{G}_T, (\vec{x}_1, \ldots, \vec{x}_L) := ((x_{1,1}, \ldots, x_{1,n_1}), \ldots, (x_{L,1}, \ldots, x_{L,n_L}))):$$ [Formula 196]

$$(\vec{x}_{L+1}, \ldots, \vec{x}_d) \xleftarrow{U} \mathbb{R}^{n_{L+1}} \times \ldots \times \mathbb{R}^{n_d};$$

$$\omega, \zeta \xleftarrow{U} \mathbb{R}, \vec{\varphi}_t \xleftarrow{U} \mathbb{R}^{z_t}(t = 0, \ldots, d),$$

$$c_1 := \left( (\omega, 0^{u_0}, \zeta, 0^{w_0}, \vec{\varphi}_0)_{\mathbb{B}_0}, (\omega\vec{x}_t, 0^{u_t}, 0^{w_t}, \vec{\varphi}_t)_{\mathbb{B}_t} : t = 1, \ldots, d \right),$$

$$c_2 := g_T^\zeta m,$$

$$ct := ((\vec{x}_1, \ldots, \vec{x}_L); c_1, c_2),$$

return $ct$.

$$Dec(pk, sk_L, ct) : K := e(c_{1,0}, k^*_{L,dec,0}) \cdot \prod_{1 \leq t \leq d \wedge \rho_t=0} e(c_{1,t}, k^*_{L,dec,t}) \cdot \prod_{1 \leq t \leq d \wedge \rho_t=1} e(c_{1,t}, k^*_{L,dec,t})^{1/(\vec{v}_t \cdot \vec{x}_t)},$$ [Formula 197]

where $(k^*_{L,dec,0} \in \langle \mathbb{B}^*_0 \rangle, \ldots, k^*_{L,dec,d} \in \langle \mathbb{B}^*_d \rangle) := k^*_{L,dec},$ $(c_{1,0} \in \langle \mathbb{B}^*_0 \rangle, \ldots, c_{1,d} \in \langle \mathbb{B}^*_d \rangle) := c_1,$ $m' := c_2/K,$ return $m'$.

-continued $Delegate_L(pk, sk_L, \vec{v}_{L+1,\rho_{L+1}}) := ((v_{L+1,1}, \ldots, v_{L+1,n_{L+1}}), \rho_{L+1}))$:  [Formula 198]

for $j = 1, \ldots, 2L;$ $j' = 1, \ldots, 2(L+1);$ $\tau = L+2, \ldots, d;$ $(\tau, l) = (\tau, 1), \ldots, (\tau, n_\tau);$ $t = 0, \ldots, L+1, \tau;$ $(t, i) = (t, 1), \ldots, (t, w_t);$ $\alpha_{dec,j}, \sigma_{dec}, \alpha_{ran,j',j}, \sigma_{ran,j'}, \alpha_{ran,(\tau,l,0),j}, \sigma_{ran,(\tau,l,0)}, \phi_{ran,(\tau,l,0)},$ $\alpha_{del,(\tau,l,0),j}, \sigma_{del,(\tau,l,0)}, \phi_{del,(\tau,l,0)}, \alpha_{del,(\tau,l,1),j}, \sigma_{del,(\tau,l,1)}, \phi_{del,(\tau,l,1)},$ $\eta_{dec,(t,i)}, \eta_{ran,j',(t,i)}, \eta_{ran,(\tau,l,0),(t,i)}, \eta_{del,(\tau,l,0),(t,i)}, \eta_{del,(\tau,l,1),(t,i)},$ $\psi_0, \psi_1, \xleftarrow{U} \mathbb{R},$ $$k_{L+1,dec}^* := k_{L,dec}^* + \sum_{j=1}^{2L} \alpha_{dec,j} k_{L,ran,j}^* +$$

$$\begin{cases} \left(\sigma_{dec}\left(\sum_{i=1}^{n_{L+1}} v_{L+1,i} k_{L,del,(L+1,i,0)}^*\right)\right) & \text{if } \rho_t = 0 \\ \left(\sigma_{dec}\left([k_{L,del,(L+1,i,1)}^*]^L + \sum_{i=1}^{n_{L+1}} v_{L+1,i}[k_{L,del,(L+1,i,1)}^*]_L\right)\right) & \text{if } \rho_t = 1 \end{cases} + \sum_{i=1}^{w_t} \eta_{dec,(0,i)} b_{0,1+u_0+1+i}^* + \sum_{t=1}^{L+1} \sum_{i=1}^{w_t} \eta_{dec,(t,i)} b_{t,n_t+u_t+i}^*,$$

$$k_{L+1,ran,j'}^* := \sum_{j=1}^{2L} \alpha_{ran,j',j} k_{L,ran,j}^* + \begin{cases} \sigma_{ran,j'}\left(\sum_{i=1}^{n_{L+1}} v_{L+1,i} k_{L,del,(L+1,i,0)}^*\right) & \text{if } \rho_t = 0 \\ \sigma_{ran,j'}\left([k_{L,del,(L+1,i,1)}^*]^L + \sum_{i=1}^{n_{L+1}} v_{L+1,i}[k_{L,del,(L+1,i,1)}^*]_L\right) & \text{if } \rho_t = 1 \end{cases} +$$

$$\sum_{i=1}^{w_t} \eta_{ran,j',(0,i)} b_{0,1+u_0+1+i}^* + \sum_{t=1}^{L+1} \sum_{i=1}^{w_t} \eta_{ran,j',(t,i)} b_{t,n_t+u_t+i}^*,$$

$$k_{L+1,ran,(\tau,l,0)}^* := \sum_{j=1}^{2L} \alpha_{ran,(\tau,l,0),j} k_{L,ran,j}^* + \phi_{ran,(\tau,l,0)} k_{L,ran,(\tau,l,0)}^* + \begin{cases} \sigma_{ran,(\tau,l,0)}\left(\sum_{i=1}^{n_{L+1}} v_{L+1,i} k_{L,del,(L+1,i,0)}^*\right) & \text{if } \rho_t = 0 \\ \sigma_{ran,(\tau,l,0)}\left([k_{L,del,(L+1,i,1)}^*]^L + \sum_{i=1}^{n_{L+1}} v_{L+1,i}[k_{L,del,(L+1,i,1)}^*]_L\right) & \text{if } \rho_t = 1 \end{cases} +$$

$$\sum_{i=1}^{w_t} \eta_{del,(\tau,l,0)} b_{0,1+u_0+1+i}^* + \sum_{t=1}^{L+1} \sum_{i=1}^{w_t} \eta_{del,(\tau,l,0),(t,i)} b_{t,n_t+u_t+i}^* + \sum_{i=1}^{w_\tau} \eta_{del,(\tau,l,0),(\tau,i)} b_{\tau,n_\tau+u_\tau+i}^*,$$

$k_{L+1,del,(\tau,l,0)}^* :=$  [Formula 199]

$$\sum_{j=1}^{2L} \alpha_{del,(\tau,l,0),j} k_{L,ran,j}^* + \phi_{del,(\tau,l,0)} k_{L,ran(\tau,l,0)}^* + \psi_0 k_{L,del(\tau,l,0)}^* + \begin{cases} \sigma_{del,(\tau,l,0)}\left(\sum_{i=1}^{n_{L+1}} v_{L+1,i} k_{L,del,(L+1,i,0)}^*\right) & \text{if } \rho_t = 0 \\ \sigma_{del,(\tau,l,0)}\left([k_{L,del,(L+1,i,1)}^*]^L + \sum_{i=1}^{n_{L+1}} v_{L+1,i}[k_{L,del,(L+1,i,1)}^*]_L\right) & \text{if } \rho_t = 1 \end{cases} +$$

$$\sum_{i=1}^{w_t} \eta_{del,(\tau,l,0),(0,i)} b_{0,1+u_0+1+i}^* + \sum_{t=1}^{L+1} \sum_{i=1}^{w_t} \eta_{del,(\tau,l,0),(t,i)} b_{t,n_t+u_t+i}^* + \sum_{i=1}^{w_\tau} \eta_{del,(\tau,l,0),(\tau,i)} b_{\tau,n_\tau+u_\tau+i}^*,$$

$$k_{L+1,del,(\tau,l,1)}^* := \sum_{j=1}^{2L} \alpha_{del,(\tau,l,1),j} k_{L,ran,j}^* + \psi_1 k_{L,del(\tau,l,1)}^* + \begin{cases} \sigma_{del,(\tau,l,1)}\left(\sum_{i=1}^{n_{L+1}} v_{L+1,i} k_{L,del,(L+1,i,0)}^*\right) & \text{if } \rho_t = 0 \\ \sigma_{del,(\tau,l,1)}\left([k_{L,del,(L+1,i,1)}^*]^L + \sum_{i=1}^{n_{L+1}} v_{L+1,i}[k_{L,del,(L+1,i,1)}^*]_L\right) & \text{if } \rho_t = 1 \end{cases} +$$

$$\sum_{i=1}^{w_t} \eta_{del,(\tau,l,1),(0,i)} b_{0,1+u_0+1+i}^* + \sum_{t=1}^{L+1} \sum_{i=1}^{w_t} \eta_{del,(\tau,l,1),i} b_{t,n_t+u_t+i}^* + \sum_{i=1}^{w_\tau} \eta_{del,(\tau,l,1),(\tau,i)} b_{\tau,n_\tau+u_\tau+i}^*,$$

$sk_{L+1} := (((\vec{v}_1, \rho_1), \ldots, (\vec{v}_{L+1}, \rho_{L+1})); k_{L+1,dec}^*, \{k_{L+1,ran,j'}^*\}_{j'=1,\ldots,2(L+1)},$ $\{k_{L+1,ran,(\tau,l,0)}^*, k_{L+1,del,(\tau,l,0)}^*, k_{L+1,del,(\tau,l,1)}^*\}_{\tau=L+2,\ldots,d;(\tau,l)=(\tau,1),\ldots,(\tau,n_\tau)}),$ return $sk_{L+1}$.

A hardware configuration of the cryptographic processing system 10 (the key generation device 100, the encryption device 200, the decryption device 300, the key delegation device 400) in the embodiments will now be described.

Figure 20:
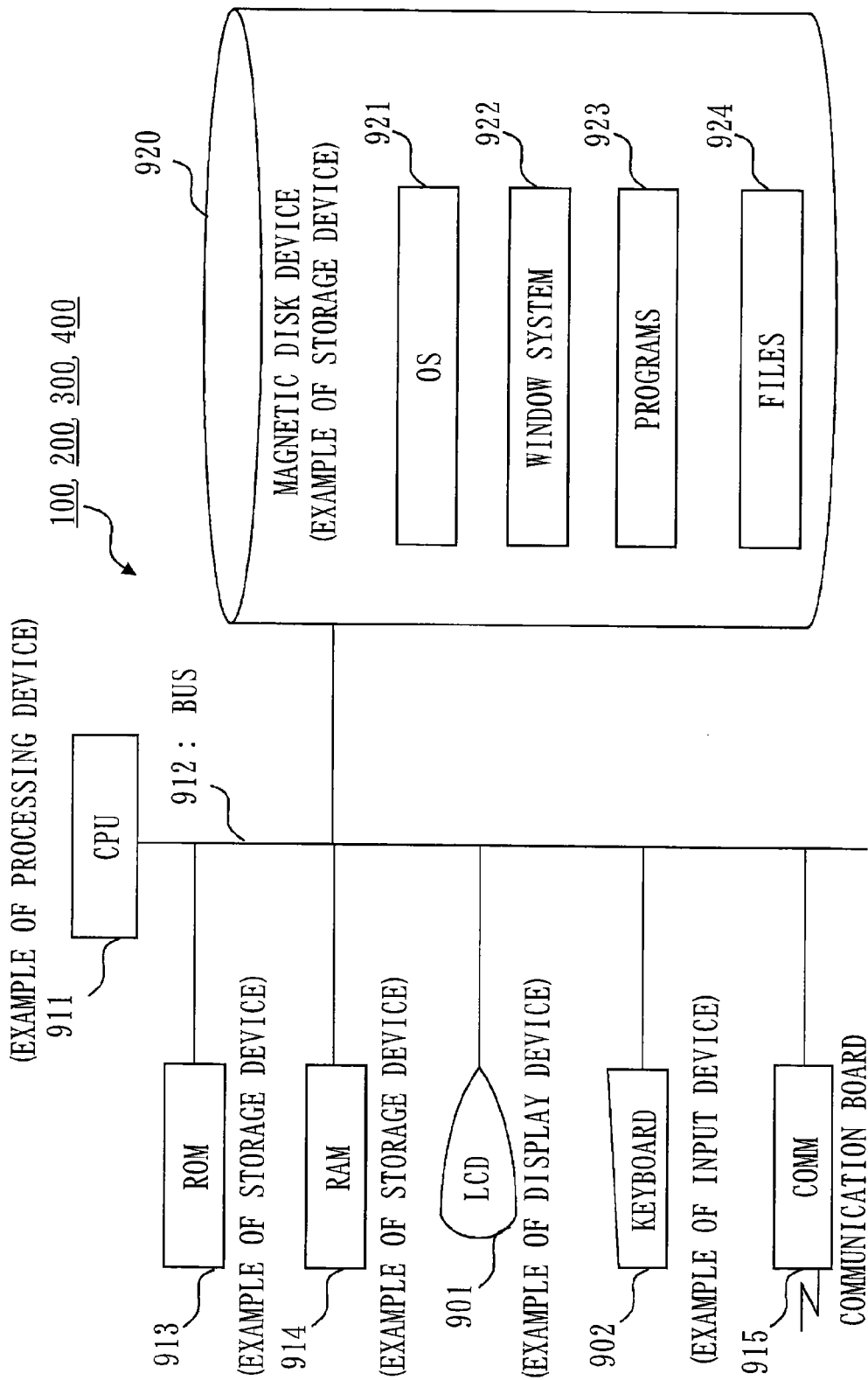
FIG. 20 is a diagram showing an example of a hardware configuration of the key generation device 100, the encryption device 200, and the decryption device 300.

FIG. 20 is a diagram showing an example of a hardware configuration of the key generation device 100, the encryption device 200, the decryption device 300, and the key delegation device 400.

As shown in FIG. 20, the key generation device 100, the encryption device 200, the decryption device 300, and the key delegation device 400 each include the CPU 911 (central processing unit, also called a processing unit, an arithmetic unit, a microprocessor, a microcomputer, or a processor). The CPU 911 is connected through a bus 912 with the ROM 913, the RAM 914, the LCD 901 (liquid crystal display), the keyboard 902 (K/B), the communication board 915, and the magnetic disk device 920, and controls these hardware devices. The magnetic disk device 920 (fixed disk device) may be replaced with a storage device such as an optical disk device or a memory card read/write device. The magnetic disk device 920 is connected through a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of a storage device (memory). The keyboard 902 and the communication board 915 are examples of an input device. The communication board 915 is an example of a communication device. The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software or programs for executing the functions described hereinabove as "the master key generation unit 110", "the master key storage unit 120", "the information input unit 130", "the decryption key generation unit 140", "the key distribution unit 150", "the master public key acquisition unit 210", "the information input unit 220", "the ciphertext generation unit 230", "the data transmission unit 240", "the decryption key acquisition unit 310", "the data receiving unit 320", "the pairing operation unit 330", "the message computation unit 340", "the decryption key acquisition unit 410", "the information input unit 420", "the delegation key generation unit 430", "the key distribution unit 440" and so on, as well as other programs. The programs are read and executed by the CPU 911.

The files 924 store information, data, signal values, variable values, and parameters, such as "the master public key pk", "the master secret key sk", "the decryption key $sk_L$", "the delegation key $sk_{L+1}$", "the ciphertext ct", "the attribute information", "the predicate information", and "the message m" described hereinabove, each of which is stored as an item of a "file" or a "database". The "file" or "database" is stored in a storage device such as a disk or memory. The information, data, signal values, variable values, and parameters stored in the storage device such as the disk or memory are read by the CPU 911 through a read/write circuit to a main memory or a cache memory, and are used for operations of the CPU 911 such as extraction, search, reference, comparison, calculation, computation, processing, output, printing, and display. The information, data, signal values, variable values, and parameters are temporarily stored in the main memory, the cache memory, or a buffer memory during the operations of the CPU 911 such as extraction, search, reference, comparison, calculation, computation, processing, output, printing, and display.

In the flowcharts described hereinabove, an arrow mainly represents an input/output of data or a signal, and each data or signal value is stored in the RAM 914, or other types of storage medium such as an optical disk, or an IC chip. The data or signal is transferred online through the bus 912, a signal line, a cable, other types of transfer medium, or a radio wave.

What is described hereinabove as " . . . unit" may be " . . . circuit", " . . . device", " . . . equipment", " . . . means", or " . . . function", and may also be " . . . step", " . . . procedure", or " . . . process". What is described as " . . . device" may be " . . . circuit", " . . . equipment", " . . . means", or " . . . function", and may also be " . . . step", " . . . procedure", or " . . . process". What is described as " . . . process" may be " . . . step". That is, what is described as " . . . unit" may be implemented by firmware stored in the ROM 913. Alternatively, " . . . unit" may be implemented solely by software, or solely by hardware such as elements, devices, boards, and wiring, or by a combination of software and hardware, or by a combination including firmware. Firmware or software is stored as a program in a storage medium such as the ROM 913. The programs are read by the CPU 911 and executed by the CPU 911. That is, each program causes a computer or the like to function as " . . . unit" described above. Alternatively, each program causes the computer or the like to execute a procedure or a method of " . . . unit" described above.

LIST OF REFERENCE SIGNS

10: cryptographic processing system, 100: key generation device, 110: master key generation unit, 120: master key storage unit, 130: information input unit, 140: decryption key generation unit, 141: random number generation unit, 142: decryption element generation unit, 143: randomizing element generation unit, 144: delegation element generation unit, 150: key distribution unit, 200: encryption device, 210: master public key acquisition unit, 220: information input unit, 221: attribute information input unit, 222: message input unit, 230: ciphertext generation unit, 231: random number generation unit, 232: ciphertext c1 generation unit, 233: ciphertext c2 generation unit, 240: data transmission unit, 300: decryption device, 310: decryption key acquisition unit, 320: data receiving unit, 330: pairing operation unit, 340: message computation unit, 400: key delegation device, 410: decryption key acquisition unit, 420: information input unit, 430: delegation key generation unit, 431: random number generation unit, 432: lower-level decryption element generation unit, 433: lower-level randomizing element generation unit, 434: lower-level delegation element generation unit, 440: key distribution unit

The invention claimed is:

1. A cryptographic processing system that performs a cryptographic process using a basis $B_t$ and a basis $B^*_t$ for each integer t of t=1, . . . , L+1 (L being an integer of 1 or more), the cryptographic processing system comprising:

an encryption device having a processor to execute a program, and a corresponding memory to store the program, which when executed by the processor generates, as a ciphertext ct, a vector in which attribute information $x_t$ is embedded in a basis vector of the basis $B_t$ for at least some integer t of t=1, . . . , L;

a decryption device having a processor to execute a program, and a corresponding memory to store the program, which when executed by the processor of the decryption device uses, as a decryption key $sk_L$, a vector in which predicate information $v_t$ is embedded in a basis vector of the basis $B^*_t$ for each integer t of t=1, . . . , L, performs a pairing operation on the ciphertext ct generated by the encryption device and the decryption key $sk_L$, and decrypts the ciphertext ct;

a key delegation device having a processor to execute a program, and a corresponding memory to store the program, which when executed by the processor of the key delegation device generates a lower-level decryption key $sk_{L|1}$ of the decryption key $sk_L$, based on a vector in which predicate information $v_{L+1}$ is embedded in a basis vector of a basis $B^*_{L+1}$ and the decryption key $sk_L$ used by the decryption device;

a key generation device including a processor and a corresponding memory that stores a program that is executed by the processor that generates the decryption key $sk_L$, wherein the processor of the key generation device further executes instructions which:

input predicate information $v_t:=(v_{t,i})(i=1, \ldots, n_t)$ for each integer t of t=1, . . . , L;

generate a decryption element using the predicate information $v_t$ input, a predetermined value $\Delta$, a predetermined value $\theta_{dec,t}$ for each integer t of t=1, . . . , L, and a predetermined value $s_{dec,t}$ for each integer t of t=0, . . . , L such that $s_{dec,0}=\Sigma_{t=1}^{L} s_{dec,t}$, generates the decryption element $k^*_{L,dec}$ in which $-s_{dec,0}$ is set as a coefficient of a basis vector $b^*_{0,p}$ (p being a predetermined value) of a basis $B^*_0$, the $\Delta$ is set as a coefficient of a basis vector $b^*_{0,q}$ (q being a predetermined value) of the basis $B^*_0$, and $s_{dec,t}e_{t,1}+\theta_{dec,t}v_{t,i}$ (i=1, . . . , $n_t$) is set as a coefficient of a basis vector $b^*_{t,i}$ (i=1, . . . , $n_t$) of the basis $B^*_t$ for each integer t of t=1, . . . , L; and transmit to the decryption device the decryption key $sk_L$ including the decryption element $k^*_{L,dec}$, wherein the processor of the encryption device further executes instructions which:

input attribute information $x_t:=(x_{t,i})$ (i=1, . . . , $n_t$) for at least some integer t of t=1, . . . , L;

generate a ciphertext c1, using the attribute information $x_t$ and predetermined values $\omega$ and $\zeta$, generates a ciphertext c1 in which the $\omega$ is set as a coefficient of a basis vector $b_{0,p}$ of a basis $B_0$, the $\zeta$ is set as a coefficient of a basis vector $b_{0,q}$ of the basis $B_0$, and $\omega x_{t,i}$ (i=1, . . . , $n_t$) is set as a coefficient of a basis vector $b_{t,i}$ (i=1, . . . , $n_t$) of the basis $B_t$ for the at least some integer t; and transmits to the decryption device the ciphertext ct including the ciphertext $c_1$, and wherein the processor of the decryption device further executes instructions which perform a pairing operation $e(c_1, k^*_{L,dec})$ on the ciphertext $c_1$ included in the ciphertext ct and the decryption element $k^*_{L,dec}$ included in the decryption key $sk_L$.

2. The cryptographic processing system of claim 1, wherein the processor of the encryption device further generates a ciphertext $c_2$ by multiplying a message m by $g_T^{\Delta\zeta}$ obtained by a value $g_T=e(b_{0,1}, b^*_{0,1})$, the $\Delta$, and the $\zeta$, wherein the transmitting performed by the processor of the encryption device transmits to the decryption device the ciphertext ct including the ciphertext $c_2$ and the ciphertext $c_1$, wherein the performing of the pairing performs the pairing operation e ($c_1, k^*_{L,dec}$) and computes a session key $K:=g_T^{\Delta\zeta}$, and wherein the processor of the decryption further computes the message m by dividing the ciphertext $c_2$ by the session key K.

3. The cryptographic processing system of claim 1, wherein the processor of the of the key generation device further performs generating a delegation element $k^*_{L,del,(\tau,\iota)}$ for an integer $\tau$ of $\tau=L+1$ and each integer $\iota$ of $\iota=1, \ldots, n_\tau$, the generating of the delegation element $k^*_{L,del,(\tau,\iota)}$ performed by using a predetermined value $\theta_{del,(\tau,\iota),t}$ for each integer t of t=1, . . . , L, a predetermined value $\psi$, and a predetermined value $s_{del,(\tau,\iota),t}$ for each integer t of t=0, . . . , L+1 such that $s_{del,(\tau,\iota),0}=\Sigma_{t-1}^{L+1} s_{del,(\tau,\iota),t}$, and by setting $-s_{del,(\tau,\iota),0}$ as the coefficient of the basis vector $b^*_{0,p}$ of the basis $B^*_0$, setting $s_{del,(\tau,\iota),t}e_{t,1}+\theta_{del,(\tau,\iota),t}v_{t,i}$ (i=1, . . . , $n_t$) as the coefficient of the basis vector $b^*_{t,i}$(i=1, . . . , $n_t$) of the basis $B^*_t$ for each integer t of t=1, . . . , L, and setting $s_{del,(\tau,\iota),L+1}e_{\tau,1}+\psi e_{\tau,\iota}$(i=1, . . . , $n_\tau$) as a coefficient of a basis vector $b^*_{\tau,i}$ (i=1, . . . , $n_\tau$) of a basis $B^*_\tau$, wherein the transmitting by the processor of the key generation device further includes transmitting to the key delegation device the decryption key $sk_L$ including the delegation element $k^*_{L,del,(\tau,\iota)}$ and the decryption element $k^*_{L,dec}$, and wherein the processor of the key delegation device further inputs predicate information $v_{L+1}:=(v_{L+1,i})(i=1, \ldots, n_{L+1})$;

using the predicate information $v_{L+1}$ and the decryption key $sk_L$, generates a lower-level decryption element $k^*_{L+1,dec}$ including a vector shown in Formula 1; and transmits to a lower-level decryption device a lower-level decryption key $sk_{L+1}$ including the lower-level decryption element $k^*_{L+1,dec}$ $$k^*_{L,dec}+\Sigma_{i=1}^{n_{L+1}} v_{L+1,i} k^*_{L,del,(L+1,i)}.$$ [Formula 1]

4. The cryptographic processing system of claim 3, wherein the cryptographic processing system performs the cryptographic process using the basis $B_0$ having at least a basis vector $b_{0,i}$ (i=1, . . . , $1+n_0, 1+n_0+1, \ldots, 1+n_0+1+u_0, \ldots, 1+n_0+130 u_0+w_0, \ldots, 1+n_0+1+u_0+w_0+z_0$)($n_0, u_0, w_0$, and $z_0$ respectively being an integer of 1 or more), the basis $B^*_0$ having at least a basis vector $b^*_{0,i}$ (i=1, . . . , $1+n_0, 1+n_0+1, \ldots, 1+n_0+1+u_0, \ldots, 1+n_0+1+u_0+w_0, \ldots, 1+n_0+1+u_0+w_0+z_0$)($n_0, u_0, w_0$, and $z_0$ respectively being an integer of 1 or more), the basis $B_t$(t=1, . . . , L+1) having at least a basis vector $b_{t,i}$ (i=1, . . . , $n_t, \ldots, n_t+u_t, \ldots, n_t+u_t+w_t, \ldots, n_t+u_t+w_t+z_t$) ($u_t, w_t$, and $z_t$ respectively being an integer of 1 or more), and the basis $B^*_t$ (t=1, . . . , L+1) having at least a basis vector $b^*_{t,i}$ (i=1, . . . , $n_t, \ldots, n_t+u_t, \ldots, n_t+u_t+w_t, \ldots, n_t+u_t+w_t+z_t$), wherein the processor of the key delegation device generates the decryption element $k^*_{L,dec}$ as shown in Formula 2, based on a random number $\eta_{dec,t}:=(\eta_{dec,t,i})(i=1, \ldots, w_t)$ for each integer t of t=0, . . . , L, and wherein the processor of the encryption device generates the ciphertext $c_1$ as shown in Formula 3, based on a random number $\phi_t:=(\phi_{t,i})(i=1, \ldots, z_t)$ for each integer t of t=0, . . . , L $$k^*_{L,dec}:=((-s_{dec,0}, 0^{u_0}, \Delta, \vec{\eta}_{dec,0}, 0^{z_0})B^*_0, (s_{dec,t}\vec{e}_{t,1}+\theta_{dec,t}\vec{v}_t, 0^{u_t}, \vec{\eta}_{dec,t}, 0^{z_t})B^*_t; t=1, \ldots, L)$$ [Formula 2]

$$c_1:=((\omega, 0^{u_0}, \zeta, 0^{w_0}, \vec{\phi}_0))B_0O, (\omega \vec{x}_t, 0^{u_t}, 0^{w_t}, \vec{\phi}_t)BtO: t=1, \ldots, L).$$ [Formula 3]

5. The cryptographic processing system of claim 4,
wherein the processor of the key generation device further executes instructions which:

generate a first randomizing element $k^*_{L,ran,j}$ for each integer j of j=1, ..., 2L, and generates a second randomizing element $k^*_{L,ran,(\tau,\iota)}$ for each integer τ of τ=L+1, ..., d (d being an integer of L+1 or more) and each integer ι of ι=1, ..., $n_\tau$ with respect to each integer τ, generate the first randomizing element $k^*_{L,ran,j}$ as shown in Formula 4, based on a predetermined value $\theta_{ran,j,t}$ for each integer t of t=1, ..., L, a predetermined value $s_{ran,j,t}$ for t=0, ..., L such that $s_{ran,j,0}=\Sigma_{t=1}^L s_{ran,j,t}$, and a random number $\eta_{ran,j,t}:=(\eta_{ran,j,t,i})(i=1, ..., w_t)$ for each integer t of t=0, ..., L, and generate the second randomizing element $k^*_{L,ran,(\tau,\iota)}$ as shown in Formula 5, based on a predetermined value $\theta_{ran,(\tau,\iota),t}$ for each integer t of t=1, ..., L, a predetermined value $s_{ran(\tau,\iota),t}$ for t=0, ..., L+1 such that $s_{ran,(\tau,\iota),0}=\Sigma_{t=1}^{L+1}s_{ran,(\tau,\iota),t}$, and a random number $\eta_{ran,(\tau,\iota),t}:=(\eta_{ran,(\tau,\iota),t,i})(i=1, ..., w_t)$ for each integer t of t=0, ..., L+1, wherein the processor of the of the key generation device further performs generating of the delegation element $k^*_{L,del,(\tau,\iota)}$ as shown in Formula 6 for each integer τ of τ=L+1, ..., d and each integer ι of ι=1, ..., $n_\tau$ with respect to each integer τ, based on a random number $\eta_{del,(\tau,\iota),t}:=(\eta_{del,(\tau,\iota)t,i})(i=1, ..., w_t)$ for each integer t of t=0, ..., L+1, wherein the processor of the key generation device further transmits to the key delegation device the decryption key $sk_L$ including the first randomizing element $k^*_{L,ran,j}$ and the second randomizing element $k^*_{L,ran,j,(\tau,\iota)}$, the delegation element $k^*_{L,del,(\tau,\iota)}$, and the decryption element $k^*_{L,dec}$, and wherein the generating of the lower-level decryption element $k^*_{L+1,dec}$ generates the lower-level decryption element $k^*_{L+1,dec}$ as shown in Formula 7, using the predicate information $v_{L+1}$, the decryption key $sk_L$, a random number $\alpha_{dec,j}$ for each integer j of j=1, ..., 2L, a random number $\sigma_{dec}$, and a random number $\eta_{dec,(t,i)}$ for each integer t of t=0, ..., L+1 and each integer i of i=1, ..., $w_t$ $$k^*_{L,ran,j} := \left((-s_{ran,j,0}, 0^{u_0}, 0, \vec{\eta}_{ran,j,0}, 0^{z_0})_{B_0^*},\right. \quad \text{[Formula 4]}$$
$$\left.(s_{ran,j,t}\vec{e}_{t,1} + \theta_{ran,j,t}\vec{v}_t, 0^{u_t}, \vec{\eta}_{ran,j,t}, 0^{z_t})_{B_t^*} : t = 1, ..., L\right)$$

$$k^*_{L,ran,(\tau,\iota)} := \left((-s_{ran,(\tau,\iota),0}, 0^{u_0}, 0, \vec{\eta}_{ran,(\tau,\iota),0}, 0^{z_0})_{B_0^*},\right. \quad \text{[Formula 5]}$$
$$(s_{ran,(\tau,\iota),t}\vec{e}_{t,1} + \theta_{ran,(\tau,\iota),t}\vec{v}_t, 0^{u_t}, \vec{\eta}_{ran,(\tau,\iota),t}, 0^{z_t})_{B_t^*} : t = 1,$$
$$..., L, (s_{ran,(\tau,\iota),L+1}\vec{e}_{\tau,1}, 0^{u_\tau}, \vec{\eta}_{ran,(\tau,\iota)L+1}, 0^{z_\tau})_{B_\tau^*}\bigr)$$

$$k^*_{L,del,(\tau,\iota)} := \left((-s_{del,(\tau,\iota),0}, 0^{u_0}, 0, \vec{\eta}_{del,(\tau,\iota),0}, 0^{z_0})_{B_0^*},\right. \quad \text{[Formula 6]}$$
$$(s_{del,(\tau,\iota),t}\vec{e}_{t,1} + \theta_{del,(\tau,\iota),t}\vec{v}_t, 0^{u_t}, \vec{\eta}_{del,(\tau,\iota),t}, 0^{z_t})_{B_t^*} : t =$$
$$1, ..., L(s_{del,(\tau,\iota),L+1}\vec{e}_{\tau,1} + \psi\vec{e}_{\tau,1}, 0^{u_\tau}, \vec{\eta}_{del,(\tau,\iota),L+1}, 0^{z_\tau})_{B_\tau^*}\bigr)$$

$$k^*_{L+1,dec} := \quad \text{[Formula 7]}$$
$$k^*_{L,dec} + \sum_{j=1}^{2L+1} \alpha_{dec,j}k^*_{L,ran,j} + \sigma_{dec}\left(\sum_{i=1}^{n_{L+1}} v_{L+1,i}k^*_{L,del,(L+1,i)}\right) +$$
$$\sum_{i=1}^{w_1} \eta_{dec,(0,i)}b^*_{0,1+u_0+1+i} + \sum_{t=1}^{L+1}\sum_{i=1}^{w_t} \eta_{dec,(t,i)}b^*_{t,n_t+u_t+i}.$$

6. The cryptographic processing system of claim 5,
wherein the processor of the key delegation device further
generates a first lower-level randomizing element $k^*_{L+ran,j'}$ for each integer j' of j'=1, ..., 2(L+1), and generates a second lower-level randomizing element $k^*_{L+1,ran,(\tau,\iota)}$ for each integer τ of τ=L+2, ..., d (d being an integer of L+2 or more) and each integer ι of ι=1, ..., $n_\tau$ with respect to each integer τ, the first lower-level randomizing element $k^*_{L+1,ran,j'}$ being as shown in Formula 8, based on the predicate information $v_{L+1}$, the decryption key $sk_L$, a random number $\sigma_{ran,j',j}$ for each integer j of j=1, ..., 2L and each integer j' of j'=1, ..., 2(L+1), a random number $\sigma_{ran,j'}$ for each integer j' of j'=1, ..., 2(L+1), and a random number $\eta_{ran,j',(t,i)}$ for each integer t of t=0, ..., L+1 and each integer i of i=1, ..., $w_t$, and generates the second lower-level randomizing element $k^*_{L+1,ran,(\tau,\iota)}$ as shown in Formula 9, based on the predicate information $v_{L+1}$, the decryption key $sk_L$, a random number $\alpha_{ran,(\tau,\iota),j}$ for each integer j of j=1, ..., 2L, a random number $\sigma_{ran,(\tau,\iota)}$, a random number $\phi_{ran,(\tau,\iota)}$, and a random number $\eta_{ran,(\tau,\iota)(t,i)}$ for each integer t of t=0, ..., L+1, τ and each integer i of i=1, ..., $w_t$; and generates a lower-level delegation element $k^*_{L+1,del,(\tau,\iota)}$ for each integer τ of τ=L+2, ..., d (d being an integer of L+2 or more) and each integer ι of ι=1, ..., $n_\tau$ with respect to each integer τ, the lower-level delegation element $k^*_{L+1,del,(\tau,\iota)}$ being generated as shown in Formula 10, based on the predicate information $v_{L+1}$, the decryption key $sk_L$, a random number $\alpha_{del,(\tau,\iota),j}$ for each integer j of j=1, ..., 2L, a random number $\sigma_{del,(\tau,\iota)}$, a random number $\psi'$, a random number $\phi_{del,(\tau,\iota)}$, and a random number $\eta_{del,(\tau,\iota),(t,i)}$ for each integer t of t=0, ..., L+1, τ and each integer i of i=1, ..., $w_t$, and wherein the processor of the key delegation device further transmits to a lower-level delegation device a lower-level decryption key $sk_{L+1}$ including the lower-level decryption element $k^*_{L+1,dec}$, the first lower-level randomizing element $k^*_{L+1,ran,j'}$ and the second lower-level randomizing element $k^*_{L+1,ran,(\tau,\iota)}$, and the lower-level delegation element $k^*_{L+1,del,(\tau,\iota)}$ $$k^*_{L+1,ran,j'} := \quad \text{[Formula 8]}$$
$$\sum_{j=1}^{2L+1} \alpha_{ran,j',j}k^*_{L,ran,j} + \sigma_{ran,j'}\left(\sum_{i=1}^{n_{L+1}} v_{L+1,i}k^*_{L,del,(L+1,i)}\right) +$$
$$\sum_{i=1}^{w_1} \eta_{ran,j',(0,i)}b^*_{0,1+u_0+1+i} + \sum_{t=1}^{L+1}\sum_{i=1}^{w_t} \eta_{ran,j',(t,i)}b^*_{t,n_t+u_t+i}$$

-continued $$k^*_{L+1,ran,(\tau,\iota)} := \qquad \text{[Formula 9]}$$

$$\sum_{j=1}^{2L+1} \alpha_{ran,(\tau,\iota),j} k^*_{L,ran,j} + \sigma_{ran,(\tau,\iota)}\left(\sum_{i=1}^{n_{L+1}} v_{L+1,i} k^*_{L,del,(L+1,i)}\right) +$$

$$\phi_{ran,(\tau,\iota)} k^*_{L,ran,(\tau,\iota)} + \sum_{i=1}^{w_i} \eta_{ran,(\tau,\iota),(0,i)} b^*_{0,1+u_0+1+i} +$$

$$\sum_{t=1}^{L+1}\sum_{i=1}^{w_t} \eta_{ran,(\tau,\iota),(t,i)} b^*_{t,n_t+u_t+i} + \sum_{i=1}^{w_\tau} \eta_{ran,(\tau,\iota),(\tau,i)} b^*_{\tau,n_\tau+u_\tau+i}$$

$$k^*_{L+1,del,(\tau+\iota)} := \qquad \text{[Formula 10]}$$

$$\sum_{j=1}^{2L+1} \alpha_{del,(\tau,\iota),j} k^*_{L,ran,j} + \sigma_{del,(\tau,\iota)}\left(\sum_{i=1}^{n_{L+1}} v_{L+1,i} k^*_{L,del,(L+1,i)}\right) +$$

$$\psi' k^*_{L,del,(\tau,\iota)} + \phi_{del,(\tau,\iota)} k^*_{L,ran,(\tau,\iota)} +$$

$$\sum_{i=1}^{w_i} \eta_{del,(\tau,\iota),(0,i)} b^*_{0,1+u_0+1+i} + \sum_{t=1}^{L+1}\sum_{i=1}^{w_t} \eta_{del,(\tau,\iota),(t,i)} b^*_{t,n_t+u_t+i} +$$

$$\sum_{i=1}^{w_\tau} \eta_{del,(\tau,\iota),(\tau,i)} b^*_{\tau,n_\tau+u_\tau+i}.$$

7. The cryptographic processing system of claim 1, wherein the processor of the key generation device further executes instructions which:
input predicate information $(v_t := (v_{t,i}))$ $(i=1, \ldots, n_t)$, $\rho_t \in \{0, 1\}$) for each integer t of $t=1, \ldots, L$, and
generate the decryption element $k^*_{L,dec}$ in which $-s_{dec,0}$ is set as the coefficient of the basis vector $b^*_{0,1}$, the $\Delta$ is set as the coefficient of the basis vector $b^*_{0,q}$, and $s_{dec,t} e_{t,1} + \theta_{dec,t} v_{t,i}$ $(i=1, \ldots, n_t)$ when $\rho_t$ is 0 or $s_{dec,t} v_{t,i}$ $(i=1, \ldots, n_t)$ when $\rho_t$ is 1 is set as the coefficient of the basis vector $b^*_{t,i}$ for each integer t of $t=1, \ldots, L$.

8. The cryptographic processing system of claim 7, wherein the processor of the key generation device further executes instruction which:
generate a first delegation element $k^*_{L,del,(\tau,\iota,0)}$ and a second delegation element $k^*_{L,del,(\tau,\iota,1)}$ for an integer $\tau$ of $\tau=L+1$ and each integer $\iota$ of $\iota=1, \ldots, n_\tau$;
the first delegation element $k^*_{L,del,(\tau,\iota,0)}$ being generated by using a predetermined value $\theta_{del,0,t}$ for each integer t of $t=1, \ldots, L$, a predetermined value $\psi$, and a predetermined value $s_{del,0,t}$ for $t=0, \ldots, L+1$ such that $s_{del,0,0} = \Sigma_{t=1}^{L+1} s_{del,0,t}$, and by setting $-s_{del,0,0}$ as the coefficient of the basis vector $b^*_{0,1}$ of the basis $B^*_0$, setting $s_{del,0,t} e_{t,1} + \theta_{del,0,t} v_{t,i}$ $(i=1, \ldots, n_t)$ when $\rho_t$ is 0 or $s_{del,0,t} v_{t,i}$ $(i=1, \ldots, n_t)$ when $\rho_t$ is 1 as the coefficient of the basis vector $b^*_{t,i}$ $(i=1, \ldots, n_t)$ for each integer t of $t=1, \ldots, L$, and setting $s_{del,0,L+1} e_{\tau,1} + \psi e_{\tau,\iota}$ $(i=1, \ldots, n_\tau)$ as a coefficient of a basis vector $b^*_{\tau,i}$ $(i=1, \ldots, n_\tau)$ of a basis $B^*_\tau$;
generate the second delegation element $k^*_{L,del,(\tau,\iota,1)}$ by using a predetermined value $\theta_{del,1,t}$ for each integer t of $t=1, \ldots, L$ and a predetermined value $s_{del,1,t}$ for $t=0, \ldots, L+1$ such that $s_{del,1,0} = \Sigma_{t=1}^{L+1} s_{del,1,t}$, and by setting $-s_{del,1,0}$ as the coefficient of the basis vector $b^*_{0,1}$ of the basis $B^*_0$, setting $s_{del,1,t} e_{t,1} + \theta_{del,1,t} v_{t,i}$ $(i=1, \ldots, n_t)$ when $\rho_t$ is 0 or $s_{del,1,t} v_{t,i}$ $(i=1, \ldots, n_t)$ when $\rho_t$ is 1 as the coefficient of the basis vector $b^*_{t,i}$ $(i=1, \ldots, n_t)$ of the basis $B^*_t$ for each integer t of $t=1, \ldots, L$, and setting $s_{del,1,L+1} e_{\tau,1}$ $(i=1, \ldots, n_\tau)$ as the coefficient of the basis vector $b^*_{\tau,i}$ $(i=1, \ldots, n_\tau)$ of the basis $B^*_\tau$;
transmit to the key delegation device the decryption key $sk_L$ including the first delegation element $k^*_{L,del,(\tau,\iota,0)}$ and the second delegation element $k^*_{L,del,(\tau,\iota,1)}$ and the decryption element $k^*_{L,dec}$;

wherein the processor of the key delegation device further inputs predicate information $(v_{L+1} := (v_{L+1,i}))(i=1, \ldots, n_{L+1})$, $\rho_{L+1} \in \{0,1\}$); and
generates a lower-level decryption element $k^*_{L+1,dec}$ including a vector shown in Formula 11, using the predicate information $v_{L+1}$ and the decryption key $sk_L$ $$k^*_{L,dec} + \begin{cases} \left(\sigma_{dec}\left(\sum_{i=1}^{n_{L+1}} v_{L+1,i} k^*_{L,del,(L+1,i,0)}\right)\right) & \text{if } \rho_t = 0 \\ \left(\sigma_{dec}\left([k^*_{L,del,(L+1,i,1)}]^L + \sum_{i=1}^{n_{L+1}} v_{L+1,i} [k^*_{L,del,(L+1,i,1)}]_L\right)\right) & \text{if } \rho_t = 1 \end{cases}. \qquad \text{[Formula 11]}$$

9. The cryptographic processing system of claim 8,
wherein the cryptographic processing system performs the cryptographic process using the basis $B_0$ having at least a basis vector $b_{0,i}$ $(i=1, \ldots, 1+n_0, 1+n_0+1, \ldots, 1+n_0+1+u_0, \ldots, 1+n_0+1+u_0+w_0, \ldots, 1+n_0+1+u_0+w_0+z_0)(n_0, u_0, w_0,$ and $z_0$ respectively being an integer of 1 or more),
the basis $B^*_0$ having at least a basis vector $b^*_{0,i}$ $(i=1, \ldots, 1+n_0, 1+n_0+1, \ldots, 1+n_0+1+u_0, \ldots, 1+n_0+1+u_0+w_0, \ldots, 1+n_0+1+u_0+w_0+z_0)(n_0, u_0, w_0,$ and $z_0$ respectively being an integer of 1 or more),
the basis $B_t$ $(t=1, \ldots, L+1)$ having at least a basis vector $b_{t,i}$ $(i=1, \ldots, n_t, \ldots, n_t+u_t, \ldots, n_t+u_t+w_t, \ldots, n_t+u_t+w_t+z_t)$ $(u_t, w_t,$ and $z_t$ respectively being an integer of 1 or more), and
the basis $B^*_t$ $(t=1, \ldots, L+1)$ having at least a basis vector $b^*_{t,i}$ $(i=1, \ldots, n_t, \ldots, n_t+u_t, \ldots, n_t+u_t+w_t, \ldots, n_t+u_t+w_t+z_t)$,
wherein the processor of the key generation device further executes instructions to generate the decryption element $k^*_{L,dec}$ as shown in Formula 12, based on a random number $n_{dec,t} := (\eta_{dec,t,i})(i=1, \ldots, w_t)$ for each integer t of $t=0, \ldots, L$, and
wherein the processor of the encryption device further executes instructions to generate the ciphertext $c_1$ as shown in Formula 13, based on a random number $\phi_t := (\phi_{t,i})$ $(i=1, \ldots, z_t)$ for each integer t of $t=0, \ldots, L$ $$k^*_{L,dec} := \left( (-s_{dec,0}, 0^{u_0}, 1, \vec{\eta}_{dec,0}, 0^{z_0})_{B^*_0}, \right. \qquad \text{[Formula 12]}$$

$$\left. \begin{cases} (s_{dec,t}\vec{e}_{t,1} + \theta_{dec,t}\vec{v}_t, 0^{u_t}, \vec{\eta}_{dec,t}, 0^{z_t})_{B^*_t}, & \text{if } \rho_t = 0 \\ (s_{dec,t}\vec{v}_t, 0^{u_t}, \vec{\eta}_{dec,t}, 0^{z_t})_{B^*_t}, & \text{if } \rho_t = 1 \end{cases} : t = 1, \ldots, L \right)$$

$$c_1 := ((\omega, 0^{u_0}, \zeta, 0^{w_0}, \vec{\phi}_0)_{B_0}, (\omega\vec{x}_t, 0^{u_t}, 0^{w_t}, \vec{\phi}_t)_{B_t,0} : t = 1, \ldots, L). \qquad \text{[Formula 13]}$$

10. The cryptographic processing system of claim 9,
wherein the processor of the key generation device further executes instructions which:
generate a first randomizing element $k^*_{L,ran,j}$ for each integer j of $j=1, \ldots, 2L$, and generate a second randomizing element $k^*_{L,ran,(\tau,\iota,0)}$ for each integer $\tau$ of $\tau=L+1, \ldots, d$ (d being an integer of L+1 or more) and each integer $\iota$ of $\iota=1, \ldots, n_\tau$ with respect to each integer $\tau$, the generating of the first randomizing element k*$_{L,ran,j}$ as shown in Formula 14, based on a predetermined value θ$_{ran,j,t}$ for each integer t of t=1, ..., L, a predetermined value s$_{ran,j,t}$ for t=0, ..., L such that s$_{ran,j,0}$=Σ$_{t=1}^{L}$s$_{ran,j,t}$, and a random number η$_{ran,j,t}$:=(η$_{ran,j,t,i}$)(i=1, ..., w$_t$) for each integer t of t=0, ..., L, and generate the second randomizing element k*$_{L,ran,(τ,ι,0)}$ as shown in Formula 15, based on a predetermined value θ$_{ran,0,t}$ for each integer t of t=1, ..., L, a predetermined value s$_{ran,0,t}$ for t=0, ..., L=1 such that s$_{ran,0,0}$=Σ$_{t=1}^{L+1}$s$_{ran,0,t}$, a random number η$_{ran,0,t}$:=(η$_{ran,0,t,i}$) (i=1, ..., w$_t$) for each integer t of t=0, ..., L, and a random number η$_{ran,0,(τ,ι)}$:=(η$_{ran,0,(τ,ι),i}$)(i=1, ..., w$_t$), wherein the processor of the key generation device generates the first delegation element k*$_{L,del,(τ,ι,0)}$ as shown in Formula 16 for each integer τ of τ=L+1, ..., d and each integer ι of ι=1, ..., n$_τ$ with respect to each integer τ, based on a random number η$_{del,0,t}$:=(η$_{del,0,t,i}$)(i=1, ..., w$_t$) for each integer t of t=0, ..., L and a random number η$_{del,0,(τ,ι)}$:=(η$_{del,0,(τ,ι),i}$)(i=1, ..., w$_t$), and generates the second delegation element k*$_{L,del,(τ,ι,1)}$ as shown in Formula 17 for each integer τ of τ=L+1, ..., d and each integer ι of ι=1, ..., n$_τ$ with respect to each integer τ, based on a random number η$_{del,1,t}$:=(η$_{del,1,t,i}$)(i=1, ..., w$_t$) for each integer t of t=0, ... L and a random number η$_{del,1,(τ,ι)}$:=(η$_{del,1,(τ,ι),i}$)(i=1, ..., w$_t$), wherein the processor of the key generation device transmits to the key delegation device the decryption key sk$_L$ including the first randomizing element k*$_{L,ran,j}$ and the second randomizing element k*$_{L,ran,(τ,ι,0)}$, the first delegation element k*$_{L,del,(τ,ι,0)}$ and the second delegation element k*$_{L,del,(τ,ι,1)}$, and the decryption element k*$_{L,dec}$, and wherein the processor of the key delegation device generates the lower-level decryption element k*$_{L+1,dec}$ as shown in Formula 18, using the predicate information v$_{L+1}$, the decryption key sk$_L$, a random number α$_{dec,j}$ for each integer j of j=1, ... 2L, a random number τ$_{dec}$, and a random number η$_{dec,(t,i)}$ for each integer t of t=0, L+1 and each integer i of i=1, ..., w$_t$ $$k_{L,ran,j}^* := \left( (-s_{ran,j,0}, 0^{u_0}, 0, \vec{\eta}_{ran,j,0}, 0^{z_0})_{B_0^*}, \right. \quad \text{[Formula 14]}$$

$$\left\{ \begin{array}{ll} (s_{ran,j,t}\vec{e}_{t,1} + \theta_{ran,j,t}\vec{v}_t, 0^{u_t}, \vec{\eta}_{ran,j,t}, 0^{z_t})_{B_t^*}, & \text{if } \rho_t = 0 \\ (s_{ran,j,t}\vec{v}_t, 0^{u_t}, \vec{\eta}_{ran,j,t}, 0^{z_t})_{B_t^*}, & \text{if } \rho_t = 1 \end{array} \right\} :$$

$$\left. t = 1, \ldots, L \right)$$

$$k_{L,ran,(τ,ι,0)}^* := \left( (-s_{ran,0,0}, 0^{u_0}, 0, \vec{\eta}_{ran,0,0}, 0^{z_0})_{B_0^*}, \right. \quad \text{[Formula 15]}$$

$$\left\{ \begin{array}{ll} (s_{ran,0,t}\vec{e}_{t,1} + \theta_{ran,0,t}\vec{v}_t, 0^{u_t}, \vec{\eta}_{ran,0,t}, 0^{z_t})_{B_t^*}, & \text{if } \rho_t = 0 \\ (s_{ran,0,t}\vec{v}, 0^{u_t}, \vec{\eta}_{ran,0,t}, 0^{z_t})_{B_t^*}, & \text{if } \rho_t = 1 \end{array} \right\} :t =$$

$$\left. 1, \ldots, L \right),$$

$$(s_{ran,0,L+1}\vec{e}_{τ,1}, 0^{u_τ}, \vec{\eta}_{ran,0,(τ,ι)}, 0^{z_τ})_{B_τ^*})$$

$$k_{L,del,(τ,ι,0)}^* := \left( (-s_{del,0,0}, 0^{u_0}, 0, \vec{\eta}_{del,0,0}, 0^{z_0})_{B_0^*}, \right. \quad \text{[Formula 16]}$$

$$\left\{ \begin{array}{ll} (s_{del,0,t}\vec{e}_{t,1} + \theta_{del,0,t}\vec{v}_t, 0^{u_t}, \vec{\eta}_{del,0,t}, 0^{z_t})_{B_t^*}, & \text{if } \rho_t = 0 \\ (s_{del,0,t}\vec{v}_t, 0^{u_t}, \vec{\eta}_{del,0,t}, 0^{z_t})_{B_t^*}, & \text{if } \rho_t = 1 \end{array} \right\} :t =$$

$$\left. 1, \ldots, L \right),$$

$$(s_{del,0,L+1}\vec{e}_{τ,1}, +ψ\vec{e}_{τ,ι}, 0^{u_τ}, \vec{\eta}_{del,0,(τ,ι)}, 0^{z_τ})_{B_τ^*})$$

$$k_{L+1,del,(τ,ι,1)}^* := \left( (-s_{del,1,0}, 0^{u_0}, 0, \vec{\eta}_{del,1,0}, 0^{z_0})_{B_0^*}, \right. \quad \text{[Formula 17]}$$

$$\left\{ \begin{array}{ll} (s_{del,1,t}\vec{e}_{t,1} + \theta_{del,1,t}\vec{v}_t, 0^{u_t}, \vec{\eta}_{del,1,t}, 0^{z_t})_{B_t^*}, & \text{if } \rho_t = 0 \\ (s_{del,1,t}\vec{v}_t, 0^{u_t}, \vec{\eta}_{del,1,t}, 0^{z_t})_{B_t^*}, & \text{if } \rho_t = 1 \end{array} \right\} :t =$$

$$\left. 1, \ldots, L \right),$$

$$(s_{del,1,L+1}\vec{e}_{τ,l}, 0^{u_τ}, \vec{\eta}_{del,1,(τ,l)}, 0^{z_τ})_{B_τ^*})$$

$$k_{L+1,dec}^* := k_{L,dec}^* + \sum_{j=1}^{2L+1} \alpha_{dec,j} k_{L,ran,j}^* + \quad \text{[Formula 18]}$$

$$\left\{ \begin{array}{ll} \left( \sigma_{dec} \left( \sum_{j=1}^{n_{L+1}} v_{L+1,i} k_{L,del,(L+1,i,0)}^* \right) \right) & \text{if } \rho_t = 0 \\ \left( \sigma_{dec} \left[ k_{L,del,(L+1,i,1)}^* \right]^L + \right. & \text{if } \rho_t = 1 \\ \sum_{i=1}^{n_{L+1}} v_{L+1,i} [k_{L,del,(L+1,i,1)}^*]_L \end{array} \right\} +$$

$$\sum_{i=1}^{w_t} \eta_{dec,(0,i)} b_{0,1+u_0+1+i}^* + \sum_{t=1}^{L+1} \sum_{i=1}^{w_t} \eta_{dec,(t,i)} b_{t,n_t+u_t+i}^*.$$

11. The cryptographic processing system of claim 10, wherein the processor of the key delegation device further generates a first lower-level randomizing element k*$_{L+1,ran,j'}$, for each integer j' of j'=1, ..., 2(L+1), and generates a second lower-level randomizing element k*$_{L+1,ran,(τ,ι,0)}$ for each integer τ of τ=L+2, ... d (d being an integer of L+2 or more) and each integer ι of ι=1, ..., n$_τ$ with respect to each integer τ, the generating of the first lower-level randomizing element k*$_{L+1,ran,j'}$ being as shown in Formula 19, based on the predicate information v$_{L|1}$, the decryption key sk$_L$, a random number α$_{ran,j',j}$ for each integer j of j=1, ..., 2L and each integer j' of j'=1, ..., 2(L+1), a random number σ$_{ran,j'}$ for each integer j' of j'=1, ..., 2(L+1), and a random number η$_{ran,j',(t,i)}$ for each integer t of t=0, ..., L+1 and each integer i of i=1, ..., w$_t$, and the generating of the second lower-level randomizing element k*$_{L+1,ran,(τ,ι,0)}$ being as shown in Formula 20, based on the predicate information v$_{L+1}$, the decryption key sk$_L$, a random number α$_{ran,(τ,ι),j}$ for each integer j of j=1, ..., 2L, a random number σ$_{ran,(τ,ι,0)}$, a random number φ$_{ran,(τ,ι, 0)}$, and η$_{ran,(τ,ι,0),(t,i)}$ for each integer t of t=0, ..., L+1 and each integer i of i=1, ..., w$_t$; and generates a first lower-level delegation element $k^*_{L+1,del,(\tau,\iota,0)}$ and a second lower-level delegation element $k^*_{L+1,del,(\tau,\iota,1)}$ for each integer $\tau$ of $\tau=L+2,\ldots,d$ (d being an integer or $L+2$ or more) and each integer $\iota$ of $\iota=1,\ldots,n_\tau$ with respect to each integer $\tau$, the generating of the first lower-level delegation element $k^*_{L+1,del,(\tau,\iota,0)}$ as shown in Formula 21, based on the predicate information $v_{L+1}$, the decryption key $sk_L$, a random number $\alpha_{del,(\tau,\iota,0),j}$ for each integer j of $j=1,\ldots,2L$, a random number $\sigma_{del,(\tau,\iota,0)}$, a random number $\psi_0$, a random number $\phi_{del,(\tau,\iota,0)}$, and $\eta_{del,(\tau,\iota,0),(t,i)}$ for each integer t of $t=0,\ldots,L+1$ and each integer i of $i=1,\ldots,w_t$, and wherein the processor of the key delegation device further generates the second lower-level delegation element $k^*_{L+1,del,(\tau,\iota,1)}$ as shown in Formula 22, based on the predicate information $v_{L+1}$, the decryption key $sk_L$, a random number $\alpha_{del,(\tau,\iota,1),j}$ for each integer j of $j=1,\ldots,2L$, and a random number $\sigma_{del,(\tau,\iota,1)}$, a random number $\psi_1$, a random number $\phi_{del,(\tau,\iota,1)}$, and $\eta_{del,(\tau,\iota,1),(t,i)}$ for each integer t of $t=0,\ldots,L+1$ and each integer i of $i=1,\ldots,w_t$ each integer t of $t=1,\ldots,L$ (L being an integer of 1 or more), the decryption device comprising:

a processor to execute a program; and a memory to store the program which, when executed by the processor, results in performance of steps including:

receiving from the encryption device the ciphertext $c_1$ in which, using attribute information $x_t:=(x_{t,i})(i=1,\ldots,n_t)$ and predetermined values $\omega$ and $\zeta$, the $\omega$ is set as a coefficient of a basis vector $b_{0,p}$ (p being a predetermined value) of a basis $B_0$, the $\zeta$ is set as a coefficient of a basis vector $b_{0,q}$ (q being a predetermined value) of the basis $B_0$, and $\omega x_{t,i}$ ($i=1,\ldots,n_t$) is set as a coefficient of a basis vector $b_{t,i}$ ($i=1,\ldots,n_t$) of the basis $B_t$ for at least some integer t;

obtaining from a key generation device the decryption key $sk_L$ including a decryption element $k^*_{L,dec}$ in which, using predicate information $v_t:=(v_{t,i})$ ($i=1,\ldots,n_t$), a predetermined value $\Delta$, a predetermined value $\theta_{dec,t}$ for each integer t of $t=1,\ldots,L$, and a predetermined value $s_{dec,t}$ for each integer t of $t=0,\ldots,L$ such that $s_{dec,0}=\Sigma_{t=1}^{L}s_{dec,t}$, $-s_{dec,0}$ is set as a coefficient of a basis $$k^*_{L+1,ran,j'} :=$$ [Formula 19]

$$\sum_{j=1}^{2L+1}\alpha_{ran,j',j}k^*_{L,ran,j} + \begin{cases} \sigma_{ran,j'}\left(\sum_{i=1}^{n_{L+1}}v_{L+1,i}k^*_{L,del,(L+1,i,0)}\right) & \text{if } \rho_t = 0 \\ \sigma_{ran,j'}\left([k^*_{L,del,(L+1,1,1)}]^L + \sum_{i=1}^{n_{L+1}}v_{L+1,i}[k^*_{L,del,(L+1,i,1)}]_L\right) & \text{if } \rho_t = 1 \end{cases} + \sum_{i=1}^{w_t}\eta_{ran,j',(0,i)}b^*_{0,1+u_0+1+i} + \sum_{t=1}^{L+1}\sum_{i=1}^{w_t}\eta_{ran,j',(t,i)}b^*_{t,n_t+u_t+i}$$

$$k^*_{L+1,ran(\tau,\iota,0)} := \sum_{j=1}^{2L+1}\alpha_{ran,(\tau,\iota,0),j}k^*_{L,ran,j} + \phi_{ran,(\tau,\iota,0)}k^*_{L,ran,(\tau,\iota,0)} + \begin{cases} \sigma_{ran,(\tau,\iota,0)}\left(\sum_{i=1}^{n_{L+1}}v_{L+1,i}k^*_{L,del,(L+1,i,0)}\right) & \text{if } \rho_t = 0 \\ \sigma_{ran,(\tau,\iota,0)}\left([k^*_{L,del,(L+1,1,1)}]^L + \sum_{i=1}^{n_{L+1}}v_{L+1,i}[k^*_{L,del,(L+1,i,1)}]_L\right) & \text{if } \rho_t = 1 \end{cases} +$$ [Formula 20]

$$\sum_{i=1}^{w_t}\eta_{del,(\tau,\iota,0),(0,i)}b^*_{0,1+u_0+1+i} + \sum_{t=1}^{L+1}\sum_{i=1}^{w_t}\eta_{del,(\tau,\iota,0),(t,i)}b^*_{t,n_t+u_t+i} + \sum_{i=1}^{w_\tau}\eta_{del,(\tau,\iota,0),(\tau,i)}b^*_{\tau,n_\tau+u_\tau+i}$$

$$k^*_{L+1,del(\tau,\iota,0)} :=$$ [Formula 21]

$$\sum_{j=1}^{2L+1}\alpha_{del,(\tau,\iota,0),j}k^*_{L,ran,j} + \phi_{del,(\tau,\iota,0)}k^*_{L,ran(\tau,\iota,0)} + \psi_0 k^*_{L,del(\tau,\iota,0)} + \begin{cases} \sigma_{del,(\tau,\iota,0)}\left(\sum_{i=1}^{n_{L+1}}v_{L+1,i}k^*_{L,del,(L+1,i,0)}\right) & \text{if } \rho_t = 0 \\ \sigma_{del,(\tau,\iota,0)}\left([k^*_{L,del,(L+1,1,1)}]^L + \sum_{i=1}^{n_{L+1}}v_{L+1,i}[k^*_{L,del,(L+1,i,1)}]_L\right) & \text{if } \rho_t = 1 \end{cases} +$$

$$\sum_{i=1}^{w_t}\eta_{del,(\tau,\iota,0),(0,i)}b^*_{0,1+u_0+1+i} + \sum_{t=1}^{L+1}\sum_{i=1}^{w_t}\eta_{del,(\tau,\iota,0),(t,i)}b^*_{t,n_t+u_t+i} + \sum_{i=1}^{w_\tau}\eta_{del,(\tau,\iota,0),(\tau,i)}b^*_{\tau,n_\tau+u_\tau+i}$$

$$k^*_{L+1,del(\tau,\iota,1)} := \sum_{j=1}^{2L+1}\alpha_{del,(\tau,\iota,1),j}k^*_{L,ran,j} + \psi_1 k^*_{L,del(\tau,\iota,1)} + \begin{cases} \sigma_{del,(\tau,\iota,1)}\left(\sum_{i=1}^{n_{L+1}}v_{L+1,i}k^*_{L,del,(L+1,i,0)}\right) & \text{if } \rho_t = 0 \\ \sigma_{del,(\tau,\iota,1)}\left([k^*_{L,del,(L+1,1,1)}]^L + \sum_{i=1}^{n_{L+1}}v_{L+1,i}[k^*_{L,del,(L+1,i,1)}]_L\right) & \text{if } \rho_t = 1 \end{cases} +$$ [Formula 22]

$$\sum_{i=1}^{w_t}\eta_{del,(\tau,\iota,1),(0,i)}b^*_{0,1+u_0+1+i} + \sum_{t=1}^{L+1}\sum_{i=1}^{w_t}\eta_{del,(\tau,\iota,1),(t,i)}b^*_{t,n_t+u_t+i} + \sum_{i=1}^{w_\tau}\eta_{del,(\tau,\iota,1),(\tau,i)}b^*_{\tau,n_\tau+u_\tau+i}.$$

12. A cryptographic processing system, comprising:
an encryption device; and
a decryption device, separate from the encryption device, that decrypt a ciphertext $c_1$ by a decryption key $sk_L$ in a cryptographic processing system that performs a cryptographic process using a basis $B_t$ and a basis $B^*_t$ for vector $b^*_{0,p}$ (p being a predetermined value) of a basis $B^*_0$, the $\Delta$ is set as a coefficient of a basis vector $b^*_{0,q}$ (q being a predetermined value) of the basis $B^*_0$, and $s_{dec,t}e_{t,1}+\theta_{dec,t}v_{t,i}$ ($i=1,\ldots,n_t$) is set as a coefficient of a basis vector $b^*_{t,i}$ ($i=1,\ldots,n_t$) of the basis $B^*_t$ for each integer t of $t=1,\ldots,L$; and performing a pairing operation $e(c_1, k^*_{L,dec})$ on the ciphertext $c_1$ and the decryption element $k^*_{L,dec}$ included in the decryption key $k_L$, and decrypts the ciphertext $c_1$.

* * * * *